(12) United States Patent
Ohta

(10) Patent No.: US 11,683,074 B2
(45) Date of Patent: Jun. 20, 2023

(54) TRANSMISSION/RECEPTION METHOD AND TRANSMISSION/RECEPTION SYSTEM

(71) Applicant: Genichiro Ohta, Kanagawa (JP)

(72) Inventor: Genichiro Ohta, Kanagawa (JP)

(*) Notice: Subject to any disclaimer, the term of this patent is extended or adjusted under 35 U.S.C. 154(b) by 0 days.

(21) Appl. No.: 17/621,659

(22) PCT Filed: Jun. 18, 2020

(86) PCT No.: PCT/JP2020/023937
§ 371 (c)(1),
(2) Date: Dec. 21, 2021

(87) PCT Pub. No.: WO2020/256061
PCT Pub. Date: Dec. 24, 2020

(65) Prior Publication Data
US 2022/0360299 A1  Nov. 10, 2022

(30) Foreign Application Priority Data

Jun. 21, 2019 (JP) .............................. JP2019-115472
Oct. 16, 2019 (JP) .............................. JP2019-189558

(51) Int. Cl.
*H04B 7/0413* (2017.01)
*H04B 7/06* (2006.01)

(52) U.S. Cl.
CPC ......... *H04B 7/0413* (2013.01); *H04B 7/0617* (2013.01)

(58) Field of Classification Search
CPC .......................... H04B 7/0413; H04B 7/0617
See application file for complete search history.

(56) References Cited

U.S. PATENT DOCUMENTS

| 4,370,745 A | 1/1983 | Miller |
| 6,078,412 A | 6/2000 | Fuse et al. |

(Continued)

FOREIGN PATENT DOCUMENTS

| JP | S57112150 A | 7/1982 |
| JP | H0998155 A | 4/1997 |

(Continued)

OTHER PUBLICATIONS

3GPP Technical Specification; 3GPP TS 36.101V8.5.0 (Mar. 2009), "3rd Generation Partnership Project; Technical Specification Group Radio Access Network; Evolved Universal Terrestrial Radio Access (E-UTRA); User Equipment (UE) radio transmission and reception (Release 8)", Mar. 2009.

(Continued)

*Primary Examiner* — Janice N Tieu
(74) *Attorney, Agent, or Firm* — McCormick, Paulding & Huber PLLC

(57) ABSTRACT

A technique capable of realizing improvement of utilization efficiency of resources such as frequency with respect to MIMO, beam forming, and the like is provided. A transmission/reception method according to an embodiment is a transmission/reception method of transmitting and receiving data between a transmission device 1 with a plurality of transmitting antennas and a reception device 2 with a receiving antenna, and includes: a generating step of generating, by the transmission device 1 or the reception device 2, characteristics of a plurality of pseudo propagation channels on a basis of characteristics of a plurality of actual propagation channels between the plurality of transmitting antennas and the receiving antenna, the characteristics of the plurality of pseudo propagation channels being characteristics similar to frequency characteristics to an extent that the frequency characteristic can be approximated with respect to (Continued)

the characteristics of the plurality of actual propagation channels; a transmitting step of creating, by the transmission device 1, one or more data to be transmitted by reflecting the characteristics of the plurality of pseudo propagation channels to a plurality of parallel and independent data, and transmitting the one or more data from the plurality of transmitting antennas as radio waves; and a receiving step of extracting, by the reception device 2, the plurality of parallel and independent data from one or more received data received as the radio waves by the receiving antenna on a basis of the characteristics of the plurality of pseudo propagation channels.

14 Claims, 23 Drawing Sheets

(56) References Cited

U.S. PATENT DOCUMENTS

| | | | |
|---|---|---|---|
| 2004/0136341 | A1 | 7/2004 | Turney et al. |
| 2009/0232244 | A1 | 9/2009 | Kawasaki |
| 2011/0116581 | A1* | 5/2011 | Yamada ............ H04L 25/03968 455/101 |
| 2014/0105057 | A1 | 4/2014 | Liu |
| 2014/0126618 | A1* | 5/2014 | Kobayashi ............ H04B 7/0456 375/224 |
| 2014/0376535 | A1* | 12/2014 | Murakami ............ H04W 88/08 370/338 |
| 2021/0273839 | A1 | 9/2021 | Takigawa et al. |
| 2021/0314075 | A1* | 10/2021 | Qi ......................... H04B 17/29 |

FOREIGN PATENT DOCUMENTS

| | | |
|---|---|---|
| JP | 2009225147 A | 10/2009 |
| JP | 2016027686 A | 2/2016 |
| JP | 6497472 B1 | 4/2019 |
| RU | 2 395 163 C2 | 7/2010 |
| RU | 2 518 405 C2 | 6/2014 |
| WO | 2004/002011 A1 | 12/2003 |
| WO | 2013/000411 A1 | 1/2013 |
| WO | 2016/030394 A2 | 3/2016 |
| WO | 2018/231141 A1 | 12/2018 |

OTHER PUBLICATIONS

3GPP Technical Specification; 3GPP TS 36.211V8.5.0 (Dec. 2008), "3rd Generation Partnership Project; Technical Specification Group Radio Access Network; Evolved Universal Terrestrial Radio Access (E-UTRA); Physical Channels and Modulation (Release 8)", Dec. 2008.

Higuchi, Taoka, "Multi-antenna wireless transmission technology", NTT DoCoMo Technical Journal vol. 14, No. 1 Apr. 2006 with a brief description in English.

3GPP Technical Report; 3GPP TR 36.873 V12.7.0 (Dec. 2017), 3rd Generation Partnership Project; Technical Specification Group Radio Access Network; Study on 3D channel model for LTE (Release 12) (Dec. 2017).

Hara, Keisuke et al., "A study on new modulation/demodulation method for 6G Mobile (Part II)—Development of new communication method using MARIA (MIMO Applied Resource-block Interleaving Access) method", IEICE technical report, Feb. 27, 2019 Feb. 27, 2019, vol. 118, No. 474, pp. 49-54, ISSN 2432-6380.

Takigawa, Maria et al., "A study on new modulation/demodulation method for 6G Mobile—a proposal of MARIA (MIMO Applied Resource-block Interleaving Access) method", IEICE technical report, Oct. 11, 2018, vol. 118, No. 254, pp. 83-88, ISSN 2432-6380.

Iida, Ayano et al., "A study of new modulation method for providing solutions to Issues of 5G system—Proposal of basic extension method of beamforming function and MIMO function", IEICE technical report, Oct. 17, 2019, vol. 119, No. 244, pp. 13-18, ISSN 2432-6380.

Ohta, Genichiro et al., "[Invited Talk] a proposal on new modulation/demodulation method for 6G Mobile—a commentary of MARIA (MIMO Applied Resource-block Interleaving Access) method", IEICE technical report, Oct. 25, 2018, vol. 118, No. 275, pp. 67-72, ISSN 2432-6380.

International Search Report for PCT Serial No. PCT/JP2020/023937dated Aug. 28, 2020.

* cited by examiner (a) SRS SIGNAL - TRANSMITTING SIDE
RADIO WAVES TO BE TRANSMITTED (b) SRS SIGNAL - RECEIVING SIDE ⇩ RADIO WAVE PROPAGATION CHANNEL
RADIO WAVES TO BE RECEIVED

ACTUAL PROPAGATION CHANNEL CHARACTERISTIC

⇕

(c) PHASE CHARACTERISTIC

⇩ CONVERT FROM FREQUENCY DOMAIN INTO TIME DOMAIN (d) DELAY PROFILE CHARACTERISTIC - AMPLITUDE

⇕

(e) DELAY PROFILE CHARACTERISTIC - PHASE

⇓ Z-TRANSFORM AT BOTH SIDES
(MODELING)

(f) PSEUDO DELAY PROFILE MODEL – INTENSITY

NEGATIVE ← | → POSITIVE (g) PSEUDO DELAY PROFILE MODEL – PHASE

NEGATIVE ← | → POSITIVE (A)

(B)

Table 1: OFDM parameters in size of 5 MHz of LTE

| Transmission bandwidth | 5 MHz |
|---|---|
| Occupied frequency bandwidth | 3.84 MHz |
| Subframe time interval | 1.0 ms |
| Subcarrier frequency interval | 15 kHz |
| FFT size | 512 |
| CP length ($\mu$s) — Short | (4.69) × 6  (5.21) × 1 |
| CP length ($\mu$s) — Long | (16.67) |

TRANSMISSION/RECEPTION METHOD AND TRANSMISSION/RECEPTION SYSTEM

CROSS-REFERENCE TO RELATED APPLICATIONS

This application is a National Stage application of International Patent Application No. PCT/JP2020/023937, filed on Jun. 18, 2020, which claims priority to Japanese Patent Application No. 2019-115472 filed on Jun. 21, 2019, and No. 2019-189558 filed on Oct. 16, 2019, each of which is hereby incorporated by reference in its entirety.

TECHNICAL FIELD

The present invention relates to a communication technique using electromagnetic waves, such as mobile communication, wireless communication, and optical communication. More particularly, the present invention relates to a technique of data transmission/reception and a multiplexing method using resources such as frequency.

BACKGROUND

Existing communication systems are required to improve utilization efficiency of resources such as frequency. As multiplexing methods in the existing communication system, there are time division multiple access (TDMA), frequency division multiple access (FDMA), orthogonal frequency division multiple access (OFDMA), and the like. The OFDMA is a method in which by providing frequency and time division blocks, that is, resource blocks in a group of subcarriers generated by an OFDM method (OFDM: orthogonal wave frequency division multiplexing modulation), a plurality of subscribers is assigned in accordance with user-specific frequency selective fading, a plurality of users can access them at the same time.

Further, as an existing technique related to fifth-generation mobile communication and the like, there are techniques of MIMO (Multiple Input Multiple Output), beam forming, and the like. The MIMO is a technique in which in wireless communication, multiple to multiple information transmission is executed by using differences of propagation channel characteristics in a plurality of radio wave propagation channels between a plurality of antennas of a transmitting station and a plurality of antennas of a receiving station. The beam forming is a technique for increasing directivity of electromagnetic waves in a predetermined direction, and there are a phased array antenna and the like as corresponding antenna techniques. Conventional beam forming has been a parabolic antenna or a multiantenna by hardware, but in recent years, it becomes possible to execute an amplitude control and a phase control for each antenna element by using the MIMO by means of software.

For example, Non-Patent Documents 1 and 2 disclose a basic technique of a MIMO system for fourth-generation mobile communication. Non-Patent Document 3 discloses multiantenna wireless transmission technology. Non-Patent Document 4 discloses a basic technique of a beam forming method.

Patent Document 1: Japanese Patent No. 6497472
Non-Patent Document 1: 3GPP Technical Specification; 3GPP TS 36.101V8.5.0 (2009-03), 3rd Generation Partnership Project; Technical Specification Group Radio Access Network; Evolved Universal Terrestrial Radio Access (E-ULTRA); User Equipment (UE) radio transmission and reception (Release 8), March 2009
Non-Patent Document 2: 3GPP Technical Specification; 3GPP TS 36.211V8.5.0 (2008-12), 3rd Generation Partnership Project; Technical Specification Group Radio Access Network; Evolved Universal Terrestrial Radio Access (E-ULTRA); Physical channels and modulation (Release 8), December 2008
Non-Patent Document 3: Higuchi and Taoka, "multiantenna wireless transmission technology", NTT DoCoMo technical journal, Vol. 14, No. 1 (April, 2006).
Non-Patent Document 4: 3GPP Technical Report; 3GPP TR 36.873 V12.7.0 (2017-12), 3rd Generation Partnership Project; Technical Specification Group Radio Access Network; Study on 3D channel model for LTE (December, 2017)

SUMMARY

A transmission/reception method and a system thereof such as the conventional MIMO or the conventional beam forming have room for improvement in utilization efficiency of resources such as frequency. It is an object of the present invention to provide a technique capable of realizing the improvement in utilization efficiency of resources such as frequency with respect to the MIMO, the beam forming, and the like.

A representative embodiment of the present invention has a configuration mentioned below. A transmission/reception method according to one embodiment is a transmission/reception method of transmitting and receiving data between a transmission device with a plurality of transmitting antennas and a reception device with a receiving antenna. The transmission/reception method includes: a generating step of generating, by the transmission device or the reception device, characteristics of a plurality of pseudo propagation channels on a basis of characteristics of a plurality of actual propagation channels between the plurality of transmitting antennas and the receiving antenna, the characteristics of the plurality of pseudo propagation channels being characteristics similar to frequency characteristics to an extent that the frequency characteristic can be approximated with respect to the characteristics of the plurality of actual propagation channels; a transmitting step of creating, by the transmission device, one or more data to be transmitted by reflecting the characteristics of the plurality of pseudo propagation channels to a plurality of parallel and independent data, and transmitting the one or more data from the plurality of transmitting antennas as radio waves; and a receiving step of extracting, by the reception device, the plurality of parallel and independent data from one or more received data received as the radio waves by the receiving antenna on a basis of the characteristics of the plurality of pseudo propagation channels. In this case, the transmission device has a MIMO transmission function. The reception device includes a plurality of receiving antennas as the receiving antenna, and has a MIMO reception function. The generating step is a step of generating, the transmission device or the reception device, the characteristics of the plurality of pseudo propagation channels on the basis of the characteristics of the plurality of actual propagation channels including propagation channels on diagonal lines between the plurality of transmitting antennas and the plurality of receiving antennas. The propagation channels on the diagonal lines are propagation channels other than propagation channels each of which faces one-to-one between the plurality of transmitting antennas and the plurality of receiving antennas.

The transmitting step is a step of creating, by the transmission device, a plurality of parallel and independent data to be transmitted by reflecting the characteristics of the plurality of pseudo propagation channels to the plurality of data, and transmitting the plurality of parallel and independent data from the plurality of transmitting antennas as radio waves by using the MIMO transmission function. The receiving step is a step of creating, the reception device, a plurality of received data from signals received as the radio waves by the plurality of receiving antennas by using the MIMO reception function, and extracting the plurality of data on the basis of the characteristics of the plurality of pseudo propagation channels from the plurality of received data.

According to the representative embodiment of the present invention, it is possible to realize improvement of utilization efficiency of resources such as frequency with respect to MIMO or beam forming.

BRIEF DESCRIPTIONS OF THE DRAWINGS

DETAILED DESCRIPTION

Figure 1:
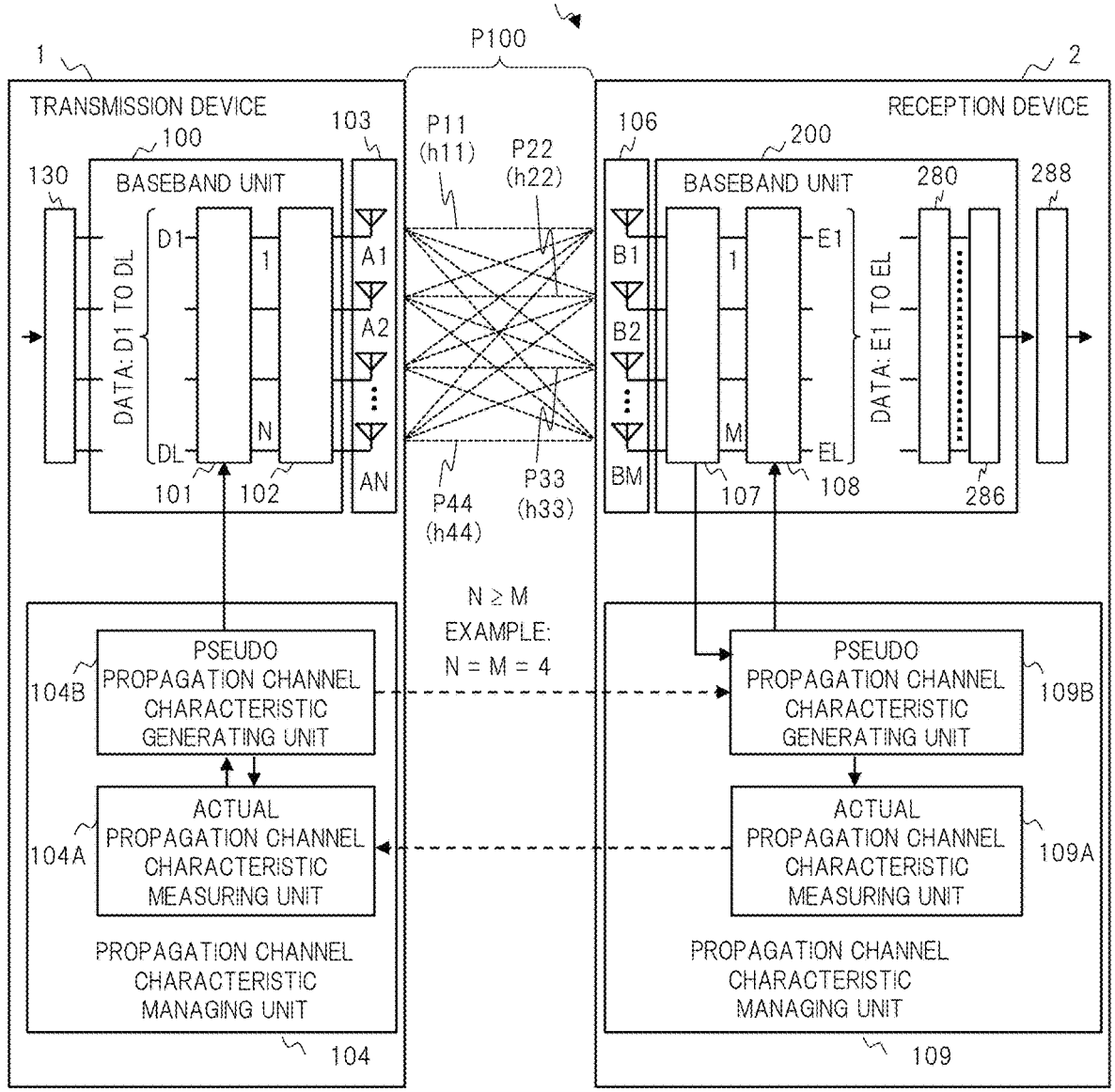
FIG. 1 is a view illustrating a configuration of a transmission/reception method and a system thereof according to a first embodiment of the present invention.

Hereinafter, embodiments of the present invention will be described in detail with reference to the drawings. Note that in all of the drawings, in principle, the same reference numeral is assigned to the same component, and repeated explanation thereof will be omitted.

[Problems and the Like (1)]

Problems and the like will be described supplementarily. As main technology that supports speeding up of fifth-generation mobile communication, MIMO technology, which was born in the latter half of third generation, can be cited.

Figure 21:
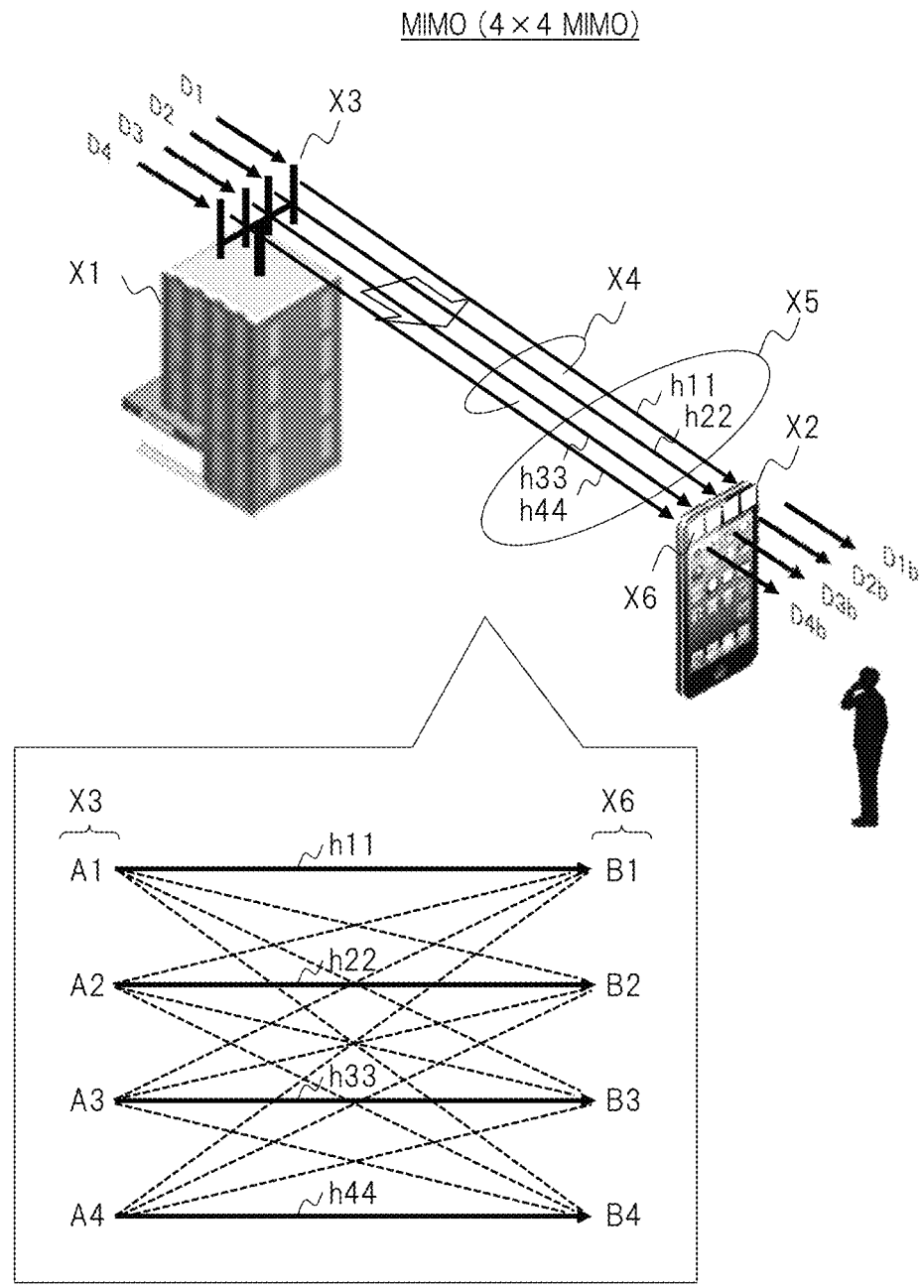
FIG. 21 is a view illustrating a configuration of a transmission/reception method and a system thereof in MIMO of a prior art example.

FIG. 21 illustrates a configuration of basic functions of MIMO communication. FIG. 21 illustrates an example of 4×4 MIMO. A system illustrated in FIG. 21 includes a transmitting station X1 such as a wireless base station and a receiving station X2 such as a user terminal, and transmits and receives data from the transmitting station X1 to the receiving station X2 by the MIMO. Four input data at a side of the transmitting station X1 are data D1, D2, D3, and D4. In the transmitting station X1, the four input data are transmitted from four antenna elements of an antenna X3, which is an antenna for 4×4 MIMO communication, to the receiving station X2 as four radio waves X4 after MIMO modulation. The four radio waves X4 respectively have characteristics h11, h22, h33, and h44 as characteristics X5 of propagation channels. The four radio waves X4 respectively propagate through the propagation channels of the characteristics X5, and reach the receiving station X2, which is a user terminal of a subscriber. The receiving station X2 executes MIMO reception for the four radio waves X4 through an antenna X6, which is an antenna for 4×4 MIMO communication. Four output data of the respective propagation channels are data D1$b$, D2$b$, D3$b$, and D4$b$. The receiving station X2 analyzes and extracts these four data from received signals. These data contain some noise components, but are equal to the four input data sent by a transmitting side. In this way, a 4×4 MIMO system can transmit four data on the same frequency band. Namely, the 4×4 MIMO system can achieve a transmission speed four times faster than that of an SISO system, which has one transmitting/receiving antenna.

However, as illustrated in a lower side of FIG. 21, 16 propagation channels obtained by "4×4=16" essentially exist between four transmitting antennas and four receiving antennas. Characteristics of the 16 propagation channels have correlation with each other, in other words, have high cross-correlation, that is, independence is low. For that reason, in an actual existing MIMO system, propagation channels on diagonal lines are not used. The propagation channels on the diagonal lines are propagation channels other than propagation channels that faces one-to-one in accordance with each of the data. For example, assuming that a propagation channel from an antenna A1 to an antenna B1 is a facing propagation channel, a propagation channel from the antenna A1 to an antenna B2 and the like is a propagation channel on a diagonal line.

On the other hand, in the fifth-generation mobile communication, the MIMO system is also used, but a new function is added to its usage, which is called beam forming.

[Problems and the Like (2)]

Figure 22:
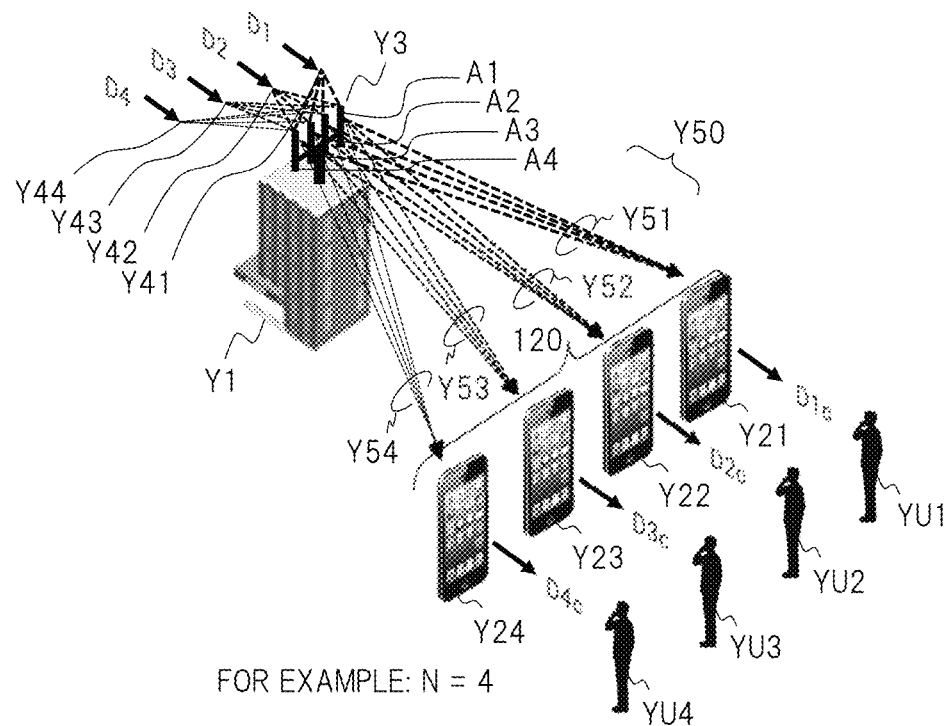
FIG. 22 is a view illustrating a configuration of a transmission/reception method and a system thereof in beam forming of a prior art example.

FIG. 22 illustrates an outline of a MIMO system using beam forming, in other words, a beam forming system. FIG. 22 illustrates an example of a communication outline by a beam forming function in 4×N MIMO system.

Here, a numeral N denotes the number of receiving stations at a receiving side, and N≥1. In the present embodiment, N is 4. In FIG. 22, a plurality of subscribers denotes subscribers YU1 to YU4. Receiving stations, which are user terminals respectively possessed by the subscribers denote receiving stations Y21 to Y24. There are data D1 to D4 as data to be transmitted of a transmitting station Y1 side. In the example of FIG. 22, a case where the data D1 is transmitted to the subscriber YU1, the data D2 is transmitted to the subscriber YU2, the data D3 is transmitted to the subscriber YU3, and the data D4 is transmitted to the subscriber YU4 is illustrated.

In the transmitting station Y1, a signal of the data D1 is fed to all of a plurality of antennas A1 to A4 in an antenna Y3, which is a MIMO antenna. At that time, the signal is subjected to delay of amplitude and a phase for each antenna and is fed thereto. Feeding signals for the respective subscribers, which has been subjected to this delay of the amplitude and the phase, denotes feeding signals Y41, Y42, Y43, and Y44. Radio waves, which are transmitted from the respective antennas on the basis of these feeding signals and reach the receiving stations of the respective subscribers, denote radio waves Y51, Y52, Y53, and Y54. A group of radio waves Y50 includes these radio waves. At this time, the radio wave for each subscriber becomes a beam that travels to a different location for each receiving station of the corresponding subscriber. The beam to each receiving station is considered so that the received power at the other receiving stations becomes low. This makes it possible for each receiving station to receive the radio wave transmitted thereto with high quality while sharing the same frequency band. Each receiving station decodes the transmitted signal carried by the corresponding radio wave, and extracts data that are the received signal. The extracted data denote data D1c, D2c, D3c, and D4c. In this way, the terminals of the four subscribers can receive the data transmitted individually.

However, the MIMO system illustrated in FIG. 21 can acquire the data four times faster than the SISO. On the other hand, in the beam forming system illustrated in FIG. 22, instead of being able to respectively transmit data to the four subscribers, it is inevitable that the data to be fed to the four transmitting antennas are the same data and only one times as much as the data are received per subscriber. This is because amplitude and the phase of each of the radio waves emitted from the four transmitting antennas are controlled for each subscriber to form a single radio wave beam. For this reason, in the fifth-generation mobile communication, and means for increasing the number of modulation multi-values is adopted as means of increasing a communication speed while the number of beams in the beam forming function is set to one. This means that a mode with a high error rate such as 64-QAM or 256-QAM is used, while the number of modulation multi-values up to the fourth generation was 16-QAM (QAM: Quadrature Amplitude Modulation).

[Problems and the Like (3)]

Figure 23:
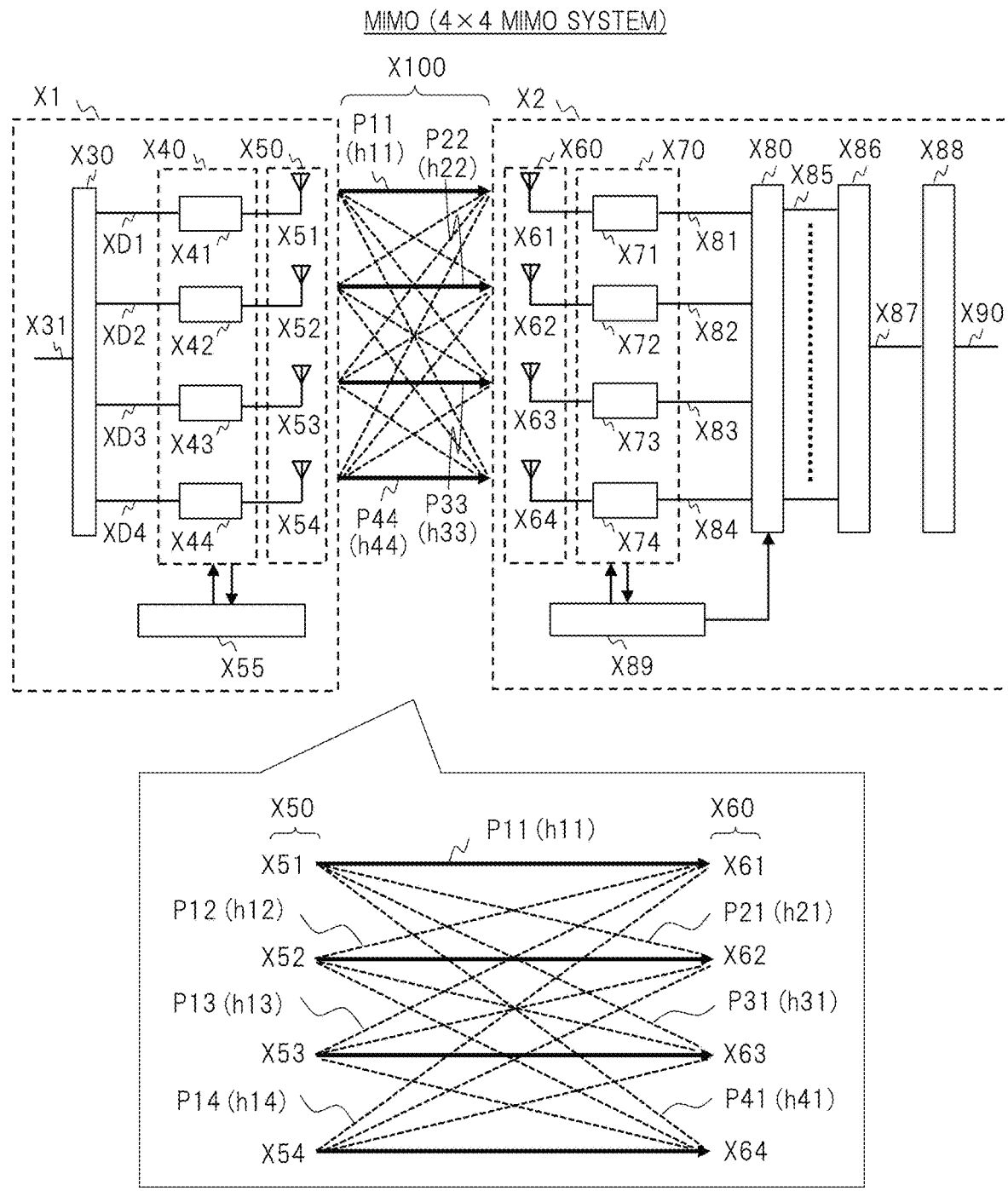
FIG. 23 is a view illustrating a detailed configuration example in the MIMO of a prior art example.

FIG. 23 illustrates a configuration of the inside of a device and propagation channels in a MIMO system corresponding to the MIMO illustrated in FIG. 21. A transmitting station X1 is a transmission device such as a wireless base station, and a receiving station X2 is a reception device such as a user terminal. In the present embodiment, a transmitting antenna unit X50 of the transmitting station X1 is a transmitting side MIMO antenna unit, and includes transmitting antennas X51, X52, X53, and X54 as individual MIMO antennas, which are a plurality of transmitting antennas. Further, in the present embodiment, a receiving antenna unit X60 of the receiving station X2 is a receiving side MIMO antenna unit, and includes receiving antennas X61, X62, X63, and X64 as individual MIMO antennas, which are a plurality of receiving antennas.

The transmitting station X1 includes a transmission data processing unit X30, a transmitting side MIMO processing unit X40, the transmitting antenna unit X50, a MIMO control unit X55, and the like. The receiving station X2 includes the receiving antenna unit X60, a receiving side MIMO processing unit X70, an error correcting unit X80, a parallel/serial converter X86, a code decoder X88, a propagation channel characteristic estimating unit X89, and the like. Note that FIG. 21 and FIG. 23 illustrates a case of transmission/reception of a downlink from the transmitting station to the receiving station. In case of an uplink, it may be considered so that positions of the transmitting station and the receiving station may be exchanged.

On the downlink, the transmitting station X1 encodes data X31 for transmission by the transmission data processing unit X30. The transmission data processing unit X30 has a function of an encoder and a multiplexer. The encoded data are distributed to the transmitting side MIMO processing unit X40 provided at the next stage. In the present embodiment, they are distributed as four data XD1, XD2, XD3, and XD4. Transmitted data signals from individual MIMO processing units X41, X42, X43, and X44 of the transmitting side MIMO processing unit X40 are respectively transmitted from the transmitting antennas X51 to X54 of the transmitting side MIMO antenna unit X50 to a free space as radio waves.

In the receiving side MIMO antenna unit X60 of the receiving station X2, the radio waves from the transmitting antennas X51 to X54 are respectively received by the receiving antennas X61 to X64. Then, the receiving side MIMO processing unit X70 extracts radio wave information in each of individual MIMO processing units X71, X72, X73, and X74. For example, the individual MIMO processing unit X71 extracts radio wave information from the transmitting antenna X51 based on the propagation channel characteristic h11. The individual MIMO processing unit X72 extracts radio wave information the transmitting antenna X52 based on the propagation channel characteristic h22. The individual MIMO processing unit X73 extracts radio wave information from the transmitting antenna X53 based on the propagation channel characteristic h33. The individual MIMO processing unit X74 extracts radio wave information from the transmitting antenna X54 based on the propagation channel characteristic h44. Respective outputs of the receiving side MIMO processing unit X70 are supplied to the error correcting unit X80 as outputs X81, X82, X83, and X84 to revise more correct information. An output X85 of the error correcting unit X80 becomes original time-series data X87 by the parallel/serial converter X86. The time-series data X87 become received data X90, which are data corresponding to the data X31 at the transmitting side, by the code decoder X88.

In the example illustrated in FIG. 23, 16 propagation channels including propagation channels on diagonal lines in 4×4 MIMO are illustrated as an actual propagation channel X100. Four propagation channels of facing pairs in the actual propagation channel X100 denote propagation channels P11, P22, P33, and P44, and corresponding characteristic are respectively the characteristics h11, h22, h33, and h44. These characteristics can be grasped by the propagation channel characteristic estimating unit X89 on the basis of the received signals. The grasped propagation channel characteristics are supplied to the receiving side MIMO processing unit X70 and the error correcting unit X80. As a result, this MIMO system can achieve a transmission speed faster than that in the SISO system for times in accordance with the number of radio wave propagation channels of the transmitting/receiving antenna air, that is, four in the present embodiment.

[Problems and the Like (4)]

As illustrated in FIG. 21 and FIG. 23, the conventional MIMO system uses the propagation channels on which the transmitting/receiving antenna pair faces to each other between the transmission device and the reception device. In fact, as illustrated in FIG. 21 and FIG. 23, a large number of propagation channels exist on the diagonal lines. For example, in view of the first transmitting antenna X51 at the transmitting side, there are a propagation channel P21 to the second receiving antenna X62, a propagation channel P31 to the third receiving antenna X63, and a propagation channel P41 to the fourth receiving antenna X64. Further, in the first receiving antenna X61 at the receiving side, there are a propagation channel P12 from the second transmitting antenna X52, a propagation channel P13 from the third transmitting antenna X53, and a propagation channel P14 from the fourth transmitting antenna X54. The same applies to the other propagation channels.

The reason why such propagation channels on the diagonal lines are not used in the conventional MIMO system is that each propagation channel cannot be handled independently because cross-correlation of characteristics between the propagation channels. Therefore, a transmission/reception method according to the first embodiment uses pseudo propagation channel characteristics so that cross-correlation between the propagation channels including such propagation channels on the diagonal lines becomes low. For example, in a case where there are 16 propagation channels in the 4×4 MIMO as described above and cross-correlation between characteristics of any two propagation channels is sufficiently low, 16 types of data can be transmitted in parallel at the same time. In the first embodiment, pseudo propagation channel characteristics are generated to realize multiple transmissions in such a plurality of propagation channels including propagation channels on diagonal lines between a plurality of transmitting antennas and a plurality of receiving antennas.

The present invention provides a new transmission/reception method at the time of communication using MIMO or beam forming regarding the fifth-generation mobile communication. As a technique related to the present invention, there is a transmission/reception method of Japanese Patent Application No. 2018-118353 (corresponding Japanese Patent No. 6497472) by the inventor of the present application. This technique is a technique in which a transmission device generates a pseudo propagation channel characteristic on the basis of a propagation channel characteristic; the pseudo propagation channel characteristic is superimposed and synthesized on a plurality of data; and radio waves corresponding to a transmitted signal thus generated are transmitted from an antenna. According to this technique, it is possible to solve a problem that the number of antennas in a MIMO system is increased due to an increase in communication speed in an OFDM system by means of one antenna.

The present invention has been made by applying the invention disclosed in Japanese Patent Application No. 2018-118353 to solve a main problem of an existing MIMO method and a problem of beam forming, which is a main function of the fifth-generation mobile communication. The present invention addresses the limitation of the MIMO in which usage environment thereof is restricted. In addition, the present invention realizes a communication capacity comparable to the total number of branches of n×m (n and m are plural, but n≥m) in n×m MIMO of the original MIMO. The present invention solves problems of function by plurality of antennas in a MIMO system having the plurality of antennas while maintaining the function.

First Embodiment

A transmission/reception method and a system thereof according to the first embodiment of the present invention will be described with reference to FIG. 1 to FIG. 6. A transmission/reception system according to the first embodiment is an example of a system that implements the transmission/reception method according to the first embodiment.

[Outline]

A transmission/reception method according to the first embodiment is a transmission/reception method in which MIMO communication is executed between a transmission device provided with a plurality (N) of transmitting antennas and having a MIMO transmission function and a reception device provided with a plurality (M, N≤M) of receiving antennas and having a MIMO reception function. This transmission/reception method includes: a measuring step of measuring, by the transmission device or the reception device, characteristics of a plurality (N×M) of actual propagation channels between the plurality (N) of transmitting antennas and the plurality (M) of receiving antennas; a generating step of generating, by the transmission device or the reception device, a plurality (N×M) of pseudo propagation channel characteristics, which are characteristics similar to frequency characteristics to an extent that the frequency characteristic can be approximated, on the basis of characteristics of a plurality (N×M) of actual propagation channels; a transmitting step of creating, by the transmission device, a plurality (N) of transmitted signals obtained by reflecting the characteristics of the plurality (N×M) of pseudo propagation channels to a plurality (L) of parallel and independent data, and transmitting the plurality (N) of transmitted signals from the plurality (N) of transmitting antennas as radio waves; and a receiving step of extracting, by the reception device, the plurality (L) of parallel and independent data on the basis of the characteristics of a plurality (the maximum N×M) of pseudo propagation channels from a plurality (M) of received signals receives as the radio waves by the plurality (M) of receiving antennas.

The transmission/reception system according to the first embodiment implements a function for transmission/reception using characteristics of the pseudo propagation channels in each baseband unit of the transmission device and the reception device. In the measuring step of the transmission/reception method according to the first embodiment, the transmission device or the reception device measures characteristics of propagation channels (referred to also as "actual propagation channels") between the transmitting/receiving antennas. Note that an existing mechanism can be used, and thus this measurement can be omitted. In the generating step of the transmission/reception method according to the first embodiment, the transmission device or the reception device generates a plurality of pseudo propagation channel characteristics similar to the actual propagation channel characteristics acquired by the measurement. The plurality of pseudo propagation channel characteristics has lower cross-correlation than cross-correlation of the plurality of actual propagation channel characteristics. In the transmitting step of the transmission/reception method according to the first embodiment, the transmission device creates a plurality of parallel and independent transmission data groups for transmission target data in the baseband unit by using the plurality of pseudo propagation channel characteristics, and transmits them from the plurality of transmitting antennas. In the receiving step of the transmission/reception method according to the first embodiment, the reception device extracts the plurality of parallel and independent transmission data groups from the signal groups received by the receiving antennas in the baseband unit by using the plurality of pseudo propagation channel characteristics. Information on the plurality of pseudo propagation channel characteristics to be used at a receiving side is a replica that is the same as information on the pseudo propagation channel characteristics used at a transmitting side.

The transmission/reception method according to the first embodiment uses propagation channels on diagonal lines between the transmitting/receiving antennas as described above, which have not been used in a conventional MIMO communication system. For this purpose, this transmission/reception method generates and uses a plurality of pseudo propagation channel characteristics (corresponding models and the like) each of whose cross-correlation is low. In this transmission/reception system, the transmission device includes a managing unit for generating and managing the pseudo propagation channel characteristics inside or outside the baseband unit, and includes a pseudo propagation channel characteristic device for reflecting (for example, superimposing and synthesizing) the pseudo propagation channel characteristics to the transmission target data in the baseband unit. This transmission/reception method reinforces cross-correlation between the respective propagation channels in other words, independence for MIMO propagation channels including the propagation channels on the diagonal lines by using their pseudo propagation channel characteristics. As a result, this transmission/reception method realizes the maximum N×M times faster information transmission and improvement of resource utilization efficiency by using N×M propagation channels of the MIMO.

[Transmission/Reception Method and System (1)]

Figure 2:
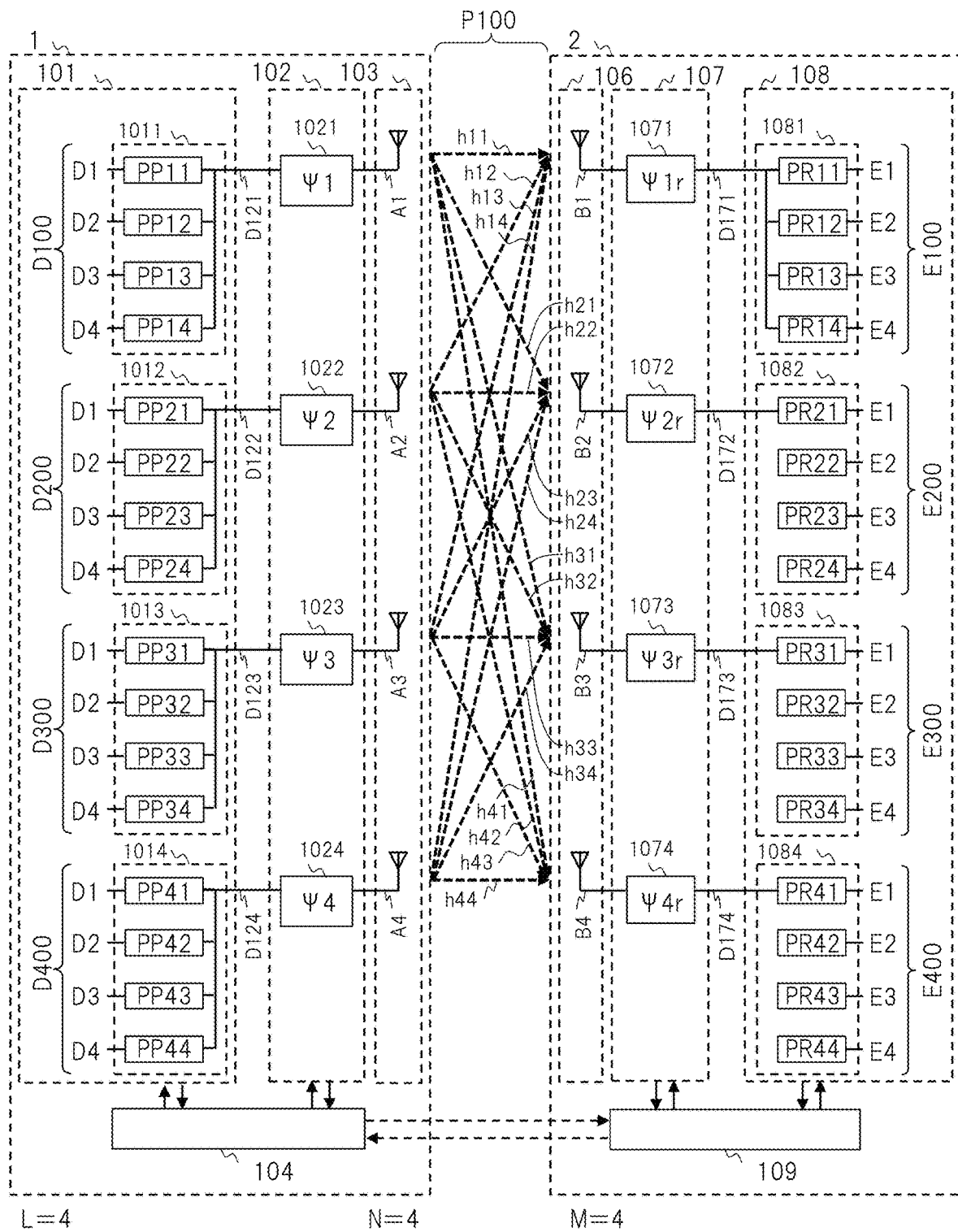
FIG. 2 is a view illustrating a detailed configuration example of key parts of the transmission/reception method and the system thereof according to the first embodiment.

FIG. 1 illustrates a configuration of the transmission/reception system according to the first embodiment, which implements the transmission/reception method according to the first embodiment. FIG. 1 illustrates an outline thereof, and FIG. 2 illustrates a detailed configuration example of key parts. The transmission/reception system according to the first embodiment includes a transmission device 1 that is a transmitting station and a reception device 2 that is a receiving station, and is a system that executes transmission/reception of data by wireless from the transmission device 1 to the reception device 2 through an actual propagation channel P100.

The transmission device 1 includes a baseband unit 100, a transmitting antenna unit 103, a propagation channel characteristic managing unit 104, a transmission data processing unit 130, and the like. The baseband unit 100 includes a pseudo propagation channel characteristic device 101 and a MIMO transmission device 102. The transmitting antenna unit 103 includes transmitting antennas A1, A2, . . . , and AN as the plurality (N) of transmitting antennas. The propagation channel characteristic managing unit 104 includes an actual propagation channel characteristic measuring unit 104A and a pseudo propagation channel characteristic generating unit 104B.

The reception device 2 includes a baseband unit 200, a receiving antenna unit 106, a propagation channel characteristic managing unit 109, a code decoder 288, and the like. The baseband unit 200 includes a MIMO reception device 107, a pseudo propagation channel characteristic analyzing/extracting device 108, an error correcting unit 280, and a parallel/serial converter 286. The receiving antenna unit 106 includes receiving antennas B1, B2, . . . , and BM as a plurality (M) of receiving antennas. The propagation channel characteristic managing unit 109 includes an actual propagation channel characteristic measuring unit 109A and a pseudo propagation channel characteristic generating unit 109B. Each of the number of antennas N and M is plural, and N≤M. In the present embodiment, N=M=4, that is, a case of a 4×4 MIMO system is illustrated.

The actual propagation channel P100 is similar to the example illustrated in FIG. 23. The actual propagation channel P100 includes 16 propagation channels obtained by a formula "4×4", and has characteristics respectively corresponding to them. For example, the propagation channel P12 on the diagonal line illustrated in FIG. 23 denotes a propagation channel from the second transmitting antenna A2 to the first receiving antenna B1. A subscript on the front side of the code denotes the receiving antenna, and a subscript on the rear side of the code denotes the transmitting antenna. For example, a characteristic h12 is an actual propagation channel characteristic corresponding to a propagation channel P12.

In the transmission/reception system according to the first embodiment, the actual propagation channel characteristic measuring unit 104A of the transmission device 1 or the actual propagation channel characteristic measuring unit 109A of the reception device 2 measures characteristics of a plurality (N×M) of propagation channels in the actual propagation channel P100 by using an existing mechanism such as an SRS signal (Sounding Reference Signal). For example, the actual propagation channel characteristic measuring unit 104A of the transmission device 1 may measure the characteristics by the SRS signal received from the reception device 2. Alternatively, the actual propagation channel characteristic measuring unit 109A of the reception device 2 may measure the characteristics by the SRS signal received from the transmission device 1, and transmit information on the measured characteristics to the transmission device 1. Note that for the measurement of the actual propagation channel characteristics, either the actual propagation channel characteristic measuring unit 104A or the actual propagation channel characteristic measuring unit 109A may be used. Further, depending upon a method, the measurement of the actual propagation channel characteristics may be omitted. Further, one actual propagation channel characteristic measuring unit may acquire information on the characteristics measured by the other actual propagation channel characteristic measuring unit by communication.

Such communication may appropriately be executed between the transmission device 1 and the reception device 2. For example, the transmission device 1 may acquire, by communication, information on the actual propagation channel characteristics measured by the actual propagation channel characteristic measuring unit 109A of the reception device 2.

Next, the pseudo propagation channel characteristic generating unit 104B of the transmission device 1 or the pseudo propagation channel characteristic generating unit 109B of the reception device 2 generates a plurality (N×M) of pseudo propagation channel characteristics, which are characteristics similar to frequency characteristics to an extent that the frequency characteristic can be approximated on the basis of a plurality (N×M) of actual propagation channel characteristics. For example, the pseudo propagation channel characteristic generating unit 104B of the transmission device 1 creates a basic model of the pseudo propagation channel characteristics on the basis of the characteristics measured by the actual propagation channel characteristic measuring unit 104A, and further creates another model from the basic model by operating a predetermined calculation. These multiple models are created assuming that cross-correlation between the models is low. The transmission device 1 or the reception device 2 confirms that the cross-correlation between the plurality of models is sufficiently low, that is, it is at least lower than cross-correlation of a plurality of actual propagation channels. The transmission device 1 or the reception device 2 regenerates another model for a model that does not satisfy such a cross-correlation condition, that is, a model whose cross-correlation is high.

In the first embodiment, the pseudo propagation channel characteristic generating unit 104B holds all of a plurality of pseudo propagation channel characteristics (that is, corresponding pseudo delay profile models), which are candidates for use, in a DB (database) of a storage in advance. The pseudo propagation channel characteristic generating unit 104B selects a plurality of pseudo propagation channel characteristics (that is, corresponding multiple models) suitable for data transmission on the basis of the actual propagation channel characteristics. The pseudo propagation channel characteristic generating unit 104B gives and sets information on the plurality of pseudo propagation channel characteristics to be used to the pseudo propagation channel characteristic device 101. Specifically, the pseudo propagation channel characteristic device 101 can be implemented by an FIR filter circuit (will be described later), and the pseudo propagation channel characteristics can be set as parameters of the filter circuit.

Note that either the pseudo propagation channel characteristic generating unit 104B or the pseudo propagation channel characteristic generating unit 109B may be used for generation of the pseudo propagation channel characteristics. For example, the pseudo propagation channel characteristic generating unit 104B at a transmitting side may generate pseudo propagation channel characteristics, and the pseudo propagation channel characteristic generating unit 109B at a receiving side may similarly generate the pseudo propagation channel characteristics. Alternatively, the pseudo propagation channel characteristic generating unit 104B at the transmitting side may generate pseudo propagation channel characteristics, and give information on the pseudo propagation channel characteristics to be used for data transmission to a receiving station 2 by describing it in a frame or a guard interval of data to be transmitted. The pseudo propagation channel characteristic generating unit 109B at the receiving side refers to and uses characteristic information from the information received from a transmitting station 1. Note that the transmission device 1 or the reception device 2 may execute calculation for generating the information on the pseudo propagation channel characteristics in real time, but the speed thereof can be increased by configuring so as to select a model from the models generated and held in the DB in advance.

The transmission data processing unit 130 has functions of an encode and a multiplexer with respect to transmission target data. The transmission data processing unit 130 encodes the transmission target data to distribute the encoded transmission target data to the pseudo propagation channel characteristic device 101 as a plurality of data D1 to DL. The pseudo propagation channel characteristic device 101 reflects a plurality of pseudo propagation channel characteristics to the plurality (L) of data that are the transmission target data to create a plurality (N) of data to be transmitted.

The pseudo propagation channel characteristic device 101 superimposes the pseudo propagation channel characteristics on the respective data, and synthesizes signals after the superimposition.

The MIMO transmission device 102 subjects the plurality (N) of transmitted data from the pseudo propagation channel characteristic device 101 to a MIMO transmitting process, and causes them to be transmitted from a plurality (N) of antennas of the transmitting antenna unit 103. A group of radio waves from the plurality (N) of antennas reaches the receiving antenna unit 106 through the plurality (N×M) of propagation channels.

The reception device 2 receives a plurality of radio waves by a plurality (M) of antennas of the receiving antenna unit 106. The MIMO reception device 107 obtains a plurality (M) of received signals from signals received by the plurality (M) of antennas by a MIMO receiving process. The pseudo propagation channel characteristic analyzing/extracting device 108 analyzes the plurality (M) of received signals by using a plurality of pseudo propagation channel characteristics that are same as the characteristics used at the transmitting side, and extracts the plurality (L) of data. Data E1 to EL outputted from the pseudo propagation channel characteristic analyzing/extracting device 108 are supplied to the error correcting unit 280.

Functions of the error correcting unit 280, the parallel/serial converter 286, and the code decoder 288 are similar to those in FIG. 23. In the error correcting unit 280, the output data are corrected to more correct information by an error correcting process. An output of the error correcting unit 280 becomes the original time-series data by the parallel/serial converter 286. The time-series data become received data corresponding to the data at the transmitting side by the code decoder 288. A processor and the like of the reception device 2 obtain the received data.

The pseudo propagation channel characteristic generating unit 109B at the receiving side generates a plurality of pseudo propagation channel characteristics (the same replica as those at the transmitting side) on the basis of the actual propagation channel characteristics in the similar manner to the pseudo propagation channel characteristic generating unit 109B at the transmitting side. Alternatively, the pseudo propagation channel characteristic generating unit 109B at the receiving side may acquire information on the plurality of pseudo propagation channel characteristics thus used from the transmission device 1. The pseudo propagation channel characteristic generating unit 109B sets the information on the plurality of pseudo propagation channel characteristics to the pseudo propagation channel characteristic analyzing/extracting device 108. Further, between the propagation channel characteristic managing unit 104 of the transmission device 1 and the propagation channel characteristic managing unit 109 of the reception device 2, connection for control communication may be set separately from connection of the plurality of propagation channels for data transmission/reception, and the connection may be used for communication related to measurement of the actual propagation channel characteristics and exchange of the information on the pseudo propagation channel characteristics.

As illustrated in FIG. 1, this transmission/reception system realizes multiplexed transmission by reflecting the pseudo propagation channel characteristics to the data so that the propagation channels on the diagonal lines in the actual propagation channel P100 can also be used. This makes it possible to improve spectral efficiency in the N×M MIMO transmission/reception. Note that it may be configured so that the actual propagation channel characteristic measuring unit or the pseudo propagation channel characteristic generating unit is provided in only one of the transmission device 1 and the reception device 2.

[Transmission/Reception Method and System (2)]

FIG. 2 illustrates a detailed configuration example of the transmission/reception method and the system thereof according to the first embodiment. Note that in FIG. 2, a receiving unit at a transmitting station 1 side and a transmitting unit at a receiving station 2 side are omitted. The present embodiment illustrates a case of a 4×4 MIMO system. Improvement of a transmission speed according to the present embodiment becomes 16 times obtained by a formula "4×4=4$^2$" to the maximum.

It cannot generally be said that characteristics of four propagation channels from one antenna at a transmitting side toward four antennas at a receiving side are independent of each other in a 4×4 MIMO system. In particular, in a case where an antenna train at the transmitting side and an antenna train at the receiving side face each other, propagation delay times of the propagation channels become substantially equal to each other. In a case where there are few reflectors in the vicinity of them, a propagation delay effect of a reflected wave becomes low, whereby cross-correlation approaches one.

For this reason, for example, in a N×N MIMO system, communication is executed using only the number of antennas facing each other, that is, only propagation channels corresponding to N even though N$^2$ propagation channels exist originally. In case of N=4, the number of propagation channels is 16, but only four propagation channels are practically used. In case of N=16, the number of propagation channels is 256, but only 16 propagation channels are practically used.

The transmission/reception method and the system thereof according to the first embodiment illustrated in FIG. 2 also uses such propagation channels on diagonal lines. For that reason, this transmission/reception system is provided with 16 pseudo propagation channels. A pseudo propagation channel characteristic device 101 and a pseudo propagation channel characteristic analyzing/extracting device 108 illustrated in FIG. 2 respectively include 16 pseudo propagation channels.

This transmission/reception system uses these pseudo propagation channels to multiply radio waves (that is, corresponding data signals) of the respective actual propagation channels by the pseudo propagation channel characteristic, which is a reinforcing characteristic for lowering the cross-correlation.

In FIG. 2, the transmitting station 1 is a transmission device such as a wireless base station, and the receiving station 2 is a reception device such as a user terminal. FIG. 2 illustrates, as main components, a configuration of a baseband unit in the transmitting station 1 and a configuration of a baseband unit in the receiving station 2, but illustration of the other existing components is omitted. Note that in a case where the receiving station 2 is a user terminal, a controller, a memory, a storage, a communication device of the other communication interface, a display device, an input device, and a battery are cited as examples of the other components.

As well as that in FIG. 1, the transmitting station 1 includes the pseudo propagation channel characteristic device 101, a MIMO transmission device 102, a transmitting antenna unit 103 that is a MIMO antenna unit at the transmitting side, and a propagation channel characteristic managing unit 104. Note that in the first embodiment, the propagation channel characteristic managing unit 104 is provided in the baseband unit of the transmitting station 1, but may be provided outside the baseband unit as another embodiment.

The receiving station 2 includes a receiving antenna unit 106 that is a receiving side MIMO antenna unit, a MIMO reception device 107, a pseudo propagation channel characteristic analyzing/extracting device 108, and a propagation channel characteristic managing unit 109. Note that in the first embodiment, the propagation channel characteristic managing unit 109 is provided in the baseband unit of the receiving station 2, but may be provided outside the baseband unit as another embodiment. In a case where the whole communication system is FDD (frequency division duplex), in the propagation channel characteristic managing unit 104 of the transmitting station 1, a partner station, that is, the receiving station 2 in FIG. 1 can measure a frequency propagation channel characteristic of a propagation channel due to transmission frequency only at the partner station side.

Therefore, a report is obtained from the propagation channel characteristic managing unit 109 of the receiving station 2. At that time, an SRS reference signal required for measurement is transmitted from the transmitting station 1 side in accordance with communication rules. Further, in a case where the whole communication system is TDD (Time division duplex), communication is executed at the same frequency each other.

Therefore, the receiving station 2 side is caused to transmit the SRS reference signal, the transmitting station 1 side executes the measurement, and the propagation channel characteristic managing unit 104 executes a measurement control and management of a measurement result. Two-way broken lines between the propagation channel characteristic managing unit 104 and the propagation channel characteristic managing unit 109 illustrated in FIG. 1 indicate the above process. Note that in a case where cross-correlation between the generated pseudo propagation channel characteristics is high, the propagation channel characteristic managing unit 104 or the propagation channel characteristic managing unit 109 discards the latest one and generates new one.

The transmitting antenna unit 103 includes the transmitting antennas A1, A2, A3, and A4 that are a plurality (in the present embodiment, N=4) of individual MIMO antennas at the transmitting side. Radio waves are emitted from each transmitting antenna of the transmitting side MIMO antenna unit 103 toward a free space. The receiving antenna unit 106 has the receiving antenna B1, B2, B3, and B4 that are a plurality (in the present embodiment, M=4) of receiving side individual MIMO antennas. Each receiving antenna of the receiving side MIMO antenna unit 106 receives the radio waves from the free space.

The pseudo propagation channel characteristic device 101 of the transmitting station 1 receives transmission data groups D100, D200, D300, and D400 from an upper layer such as a processor for controls as a plurality of data that are transmission targets. Each of the transmission data groups consists of four data. For example, the transmission data group D100 consists of the data D1, D2, D3, and D4 as the four data. The transmission data groups are a plurality of parallel and independent data groups. If the number of data in one transmission data group is L, the L is 4 in the present embodiment.

The pseudo propagation channel characteristic device 101 at the transmitting side roughly includes a plurality (in the present embodiment, four in accordance with the number of antennas of N) of pseudo propagation channel device units 1011, 1012, 1013, and 1014. Each of the pseudo propagation channel device units further includes individual pseudo propagation channels that are a plurality (in the present embodiment, four in accordance with the number of data of L) pseudo propagation channels. Namely, the pseudo propagation channel characteristic device 101 includes total 16 pseudo propagation channels obtained by a formula "4×4". For example, the pseudo propagation channel device unit 1011 includes pseudo propagation channels PP11, PP12, PP13, and PP14. The pseudo propagation channel device unit 1012 includes pseudo propagation channels PP21, PP22, PP23, and PP24. For example, the pseudo propagation channel PP11 is a circuit configured to superimpose a first pseudo propagation channel characteristic on the data D1 as an input. The pseudo propagation channel PP12 is a circuit configured to superimpose a second pseudo propagation channel characteristic on the data D2 as an input. The pseudo propagation channel PP13 is a circuit configured to superimpose a third pseudo propagation channel characteristic on the data D3 as an input. The pseudo propagation channel PP14 is a circuit configured to superimpose a fourth pseudo propagation channel characteristic on the data D4 as an input. For example, the pseudo propagation channel device unit 1011 synthesizes four outputs of the four pseudo propagation channels PP11 to PP14 by addition or the like, and outputs them. An output D121 after synthesis is supplied to an individual MIMO processing unit 1021. Four outputs of the four pseudo propagation channel device units are indicated by outputs D121, D122, D123, and D124.

The MIMO transmission device 102 includes a plurality (in the present embodiment, four in accordance with the number of antennas of N) of individual MIMO processing units, which are indicated by individual MIMO processing units 1021, 1022, 1023, and 1024. The outputs from the pseudo propagation channel characteristic device 101 are respectively inputted into the corresponding individual MIMO processing units 1021, 1022, 1023, and 1024 to be subjected to MIMO processes. In FIG. 2, the respective MIMO processes of the four individual MIMO processing units are denotes by $\Psi 1$ to $\Psi 4$. $\Psi$ is a function, and has ($\omega$, a, $\theta$, t) as variables. The $\omega$ indicates angular frequency, the a indicates amplitude, the $\theta$ indicates a phase, and the t indicates a time.

Respective signals after the MIMO processes in the individual MIMO processing units are sent to the corresponding transmitting antennas of the transmitting antenna unit 103, and are transmitted as radio waves. For example, the signal after the MIMO process in the individual MIMO processing unit 1021 is sent to the transmitting antenna A1. These radio waves transmitted from the transmitting antennas are propagated through the propagation channel P100, which is propagation channels in a real space, and are received by the plurality (in the present embodiment, M=4) of receiving antennas of the receiving antenna unit 106 in the receiving station 2. As illustrated in FIGS. 1 and 2, the propagation channel P100 between the plurality of transmitting antennas and the plurality of receiving antennas has a plurality (N×M=4×4=16) of propagation channels including propagation channels on diagonal lines. Characteristics of the respective propagation channels denote characteristics h11, h12, h13, h14, h21, h22, h23, h24, h31, h32, h33, h34, h41, h42, h43, and h44. The characteristics of the propagation channels of the facing antenna pairs (the propagation channels P11, P22, P33, and P44 described above) are the characteristics h11, h22, h33, and h44, and the other characteristics are characteristics of the propagation channels on the diagonal lines.

The four individual MIMO processing units of the MIMO transmission device 102 respectively execute MIMO processes corresponding to the characteristics h11, h22, h33, and h44 of the four facing propagation channels. The 16 pseudo propagation channels of the pseudo propagation channel characteristic device 101 correspond to the characteristics among a plurality (4×4=16) of propagation channels from the characteristic h11 to the characteristic h44 in the propagation channel P100 of the real space, and a plurality (4×4=16) of udo propagation channel characteristics for lowering cross-correlation among the propagation channels is provided.

These pseudo propagation channel characteristics of the plurality of pseudo propagation channels denotes $\Phi 11$, $\Phi 12$, $\Phi 13$, $\Phi 14$, $\Phi 21$, $\Phi 22$, $\Phi 23$, $\Phi 24$, $\Phi 31$, $\Phi 32$, $\Phi 33$, $\Phi 34$, $\Phi 41$, $\Phi 42$, $\Phi 43$, and $\Phi 44$ in order from the pseudo propagation channel PP11 to the pseudo propagation channel PP44. Generation of these characteristics of the plurality of pseudo propagation channels will be described later.

The plurality of individual pseudo propagation channels of the respective pseudo propagation channel device units in the pseudo propagation channel characteristic device 101 obtains pseudo delay profile model information (in other words, pseudo propagation channel characteristic information) from the propagation channel characteristic managing unit 104.

The transmission data groups are respectively characterized by transfer functions of the plurality of pseudo propagation channels of the four pseudo propagation channel device units in the pseudo propagation channel characteristic device 101. The four outputs (that is, signals of corresponding data to be transmitted) of the pseudo propagation channel characteristic device 101 are respectively supplied to the four MIMO processing units. The MIMO processing units respectively add a MIMO function to the signals of the outputs (in other words, they become MIMO frame signals). Then, the respective signals are fed to the four transmitting antennas, and are transmitted as radio waves. The four receiving antennas in the receiving station 2 respectively receive these group of radio waves.

The receiving antenna B1 receives the radio waves from the four transmitting antennas through the characteristics h11, h12, h13, and h14 of the four propagation channels. The receiving antenna B2 receives the radio waves from the four transmitting antennas through the characteristics h21, h22, h23, and h24 of the four propagation channels. The receiving antenna B3 receives the radio waves from the four transmitting antennas through the characteristics h31, h32, h33, and h34 of the four propagation channels. The receiving antenna B4 receives the radio waves from the four transmitting antennas through the characteristics h41, h42, h43, and h44 of the four propagation channels.

Received signals by the four receiving antennas are respectively inputted into four corresponding MIMO receiving units in the MIMO reception device 107. Each of MIMO receiving units 1071, 1072, 1073, and 1074 executes a MIMO analyzing process, and the MIMO receiving units 1071, 1072, 1073, and 1074 respectively generate processing outputs D171, D172, D173, and D174. The respective MIMO analyzing processes of the four MIMO receiving units denote receiving side propagation channel analysis functions $\Psi 1r$ to $\Psi 4r$. correspondence among the receiving side propagation channel analysis function $\Psi 1r$ to $\Psi 4r$, the propagation channel characteristics h11 to h44 and the pseudo propagation channel characteristics $\Phi 11$ to $\Phi 44$ at the transmitting side is indicated in the following Formulas A.

Formulas A:

$\Psi 1r = D100D1 \times \Phi 11 * h11 + D200D1 \times \Phi 12 * h12 + D300D1 \times \Phi 13 * h13 + D400D1 \times \Phi 14 * h14$ $\Psi 2r = D100D2 \times \Phi 21 * h21 + D200D2 \times \Phi 22 * h22 + D300D2 \times \Phi 23 * h23 + D400D2 \times \Phi 24 * h24$ $\Psi 3r = D100D3 \times \Phi 31 * h31 + D200D3 \times \Phi 32 * h32 + D300D3 \times \Phi 33 * h33 + D400D3 \times \Phi 34 * h34$ $\Psi 4r = D100D4 \times \Phi 41 * h41 + D200D4 \times \Phi 42 * h42 + D300D4 \times \Phi 43 * h43 + D400D4 \times \Phi 44 * h44$ In the above formulas, a mathematical symbol "×" indicates multiplication, and a mathematical symbol "*" indicates convolution integral in a case where calculation is executed in a frequency domain, or indicates that multiplication is executed in a case where the calculation is executed in a time domain. Further, for example, the data D100D1 corresponds to the data D1 in the transmission data group D100 illustrated in FIG. 2. The MIMO receiving units 1071, 1072, 1073, and 1074 respectively execute measurement of the propagation channel characteristics on the basis of the SRS reference signal described in FIG. 1, acquire and manage characteristic data of the functions $\Psi 1r$, $\Psi 2r$, $\Psi 3r$, and $\Psi 4r$, and use them for subsequent signal extraction during an actual data transmission period. In the above formula, when the SRS reference signal is generated, a data group D100D1 to D400D4 is set to constant value based on the communication rules. Namely, in a case where values of the data group D100D1 to D400D4 are the same as each other, the MIMO receiving units 1071, 1072, 1073, and 1074 can measure propagation channel characteristics of the following Formulas B.

$\Psi 1r\text{-}srs = <\Phi 11*h11, \Phi 12*h12, \Phi 13*h13, \Phi 14*h14>$ $\Psi 2r\text{-}srs = <\Phi 21*h21, \Phi 22*h22, \Phi 23*h23, \Phi 24*h24>$ $\Psi 3r\text{-}srs = <\Phi 31*h31, \Phi 32*h32, \Phi 33*h33, \Phi 34*h34>$ $\Psi 4r\text{-}srs = <\Phi 41*h41, \Phi 42*h42, \Phi 43*h43, \Phi 44*h44>$    Formula B:

Here, when the SRS reference signal is measured, each antenna at the transmitting side is operated at intervals. Therefore, the propagation channel characteristic can be measured for each branch at the receiving side. For that reason, in the above formulas, it is expressed as a set of each propagation channel characteristic information. Measurement results of these 16 propagation channel characteristics are managed so as to have low correlation with each other. Namely, in the conventional 4×4 MIMO, when the SRS reference signals received by the respective antennas are expressed by adding p to a suffix thereof, the following Formulas C are obtained.

$\Psi 1r\text{-}srs\text{-}p = <h11, h12, h13, h14>$ $\Psi 2r\text{-}srs\text{-}p = <h21, h22, h23, h24>$ $\Psi 3r\text{-}srs\text{-}p = <h31, h32, h33, h34>$ $\Psi 4r\text{-}srs\text{-}p = <h41, h42, h43, h44>$    Formulas C:

Although these signals have a problem in cross-correlation, each of the pseudo propagation channel characteristics $\Phi 11$ to $\Phi 44$ is superimposed in Formulas B described above in the first embodiment. Therefore, it becomes possible to lower the cross-correlation due to the superimposing action of the pseudo propagation channel characteristics.

Note that a control of these SRS reference signals and management of the measured propagation channel characteristic information are executed in the propagation channel characteristic managing unit 104 and the propagation channel characteristic managing unit 109 illustrated in FIG. 1.

These four processing outputs are respectively inputted into four pseudo propagation channel analysis/extraction blocks of the pseudo propagation channel characteristic analyzing/extracting device 108. The four pseudo propagation channel analysis/extraction blocks are pseudo propagation channel analysis/extraction blocks 1081, 1082, 1083, and 1084.

Each of the pseudo propagation channel analysis/extraction blocks further includes four pseudo propagation channel analyzing/extracting units. For example, the pseudo propagation channel analysis/extraction block 1081 includes pseudo propagation channel analyzing/extracting units PR11, PR12, PR13, and PR14. The pseudo propagation channel analysis/extraction block 1082 includes pseudo propagation channel analyzing/extracting units PR21, PR22, PR23, and PR24.

For example, the four pseudo propagation channel analyzing/extracting units of the pseudo propagation channel analysis/extraction block 1081 respectively analyze the processing output D171 using the corresponding pseudo propagation channel characteristics to extract signals. The pseudo propagation channel characteristics (and corresponding pseudo delay profile models) used by the pseudo propagation channel characteristic analyzing/extracting device 108 at the receiving side are replicas that are the same as the pseudo propagation channel characteristics used by the pseudo propagation channel characteristic device 101 at the transmitting side. For example, the pseudo propagation channel PP11 and the pseudo propagation channel analyzing/extracting unit PR11 use the same pseudo propagation channel characteristic $\Phi 11$.

For example, in the pseudo propagation channel analysis/extraction block 1081, the four pseudo propagation channel analyzing/extracting units execute cross-correlation calculations with the pseudo delay profile models configured to reinforce the characteristics h11, h12, h13, and h14 of the actual propagation channels. In the pseudo propagation channel analysis/extraction block 1082, the four pseudo propagation channel analyzing/extracting units execute cross-correlation calculations with the pseudo delay profile models configured to reinforce the characteristics h21, h22, h23, and h24 of the actual propagation channels. In the pseudo propagation channel analysis/extraction block 1083, the four pseudo propagation channel analyzing/extracting units execute cross-correlation calculations with the pseudo delay profile models configured to reinforce the characteristics h31, h32, h33, and h34 of the propagation channels. In the pseudo propagation channel analysis/extraction block 1084, the four pseudo propagation channel analyzing/extracting units execute cross-correlation calculations with the pseudo delay profile models configured to reinforce the characteristics h41, h42, h43, and h44 of the propagation channels. As a result, the pseudo propagation channel characteristic analyzing/extracting device 108 obtains 16 data from a formula "4×4" as outputs. The pseudo propagation channel characteristic analyzing/extracting device 108 obtains received data groups E100, E200, E300, and E400 as four received data groups. For example, the pseudo propagation channel analysis/extraction block 1081 extracts the data E1 to E4 to become the corresponding received data group E100. These data E1 to E4 correspond to the data D1 to D4 of the transmission data group D100 at the transmitting station 1 side.

The above will be explained by mathematical formulas. The cross-correlation of the propagation channel characteristics among the received signals received from the respective branches becomes sufficiently low due to the superimposition of the corresponding pseudo propagation channel characteristic. It is assumed that the signal groups transmitted in this manner are represented by Formulas A. For example, the MIMO receiving unit 1071 executes correlation extraction using the acquired four propagation channel characteristics <Φ11*h11, Φ12*h12, Φ13*h13, Φ14*h14> to obtain a data group of the following Formula D.

<D100D1×Φ11*h11,D200D1×Φ12*h12,D300D1× Φ13*h13,D400D1×Φ14*h14>  Formula D:

This data group becomes the output D171 of the MIMO receiving unit 1071, and is supplied to the pseudo propagation channel analysis/extraction block 1081 provided at the next stage. In the pseudo propagation channel analysis/extraction block 1081, the four pseudo propagation channel analyzing/extracting units PR11, PR12, PR13, and PR14 receive the output D171 in parallel. At this time, the measurement results of the SRS reference signal Φ11*h11, Φ12*h12, Φ13*h13, and Φ14*h14 are respectively provided from the propagation channel characteristic managing unit 109 to the four pseudo propagation channel analyzing/extracting units PR11, PR12, PR13, and PR14 described above. Each of pseudo propagation channel characteristic analyzing/extracting units executes a correlation extraction calculation between data on the corresponding measurement result of the SRS reference signal and the data group indicated in Formula D. For example, the pseudo propagation channel analyzing/extracting unit PR11 uses data on the measurement result of the SRS reference signal Φ11*h11 to execute a correlation calculation with the data group indicated in Formula D as in the following Formula E.

$$E1 = \int_F \left\{ \begin{pmatrix} D100D1 \times \Phi 11*h11 + \\ D200D1 \times \Phi 12*h12 + \\ D300D1 \times \Phi 13*h13 + \\ D400D1 \times \Phi 14*h14 \end{pmatrix} (\Phi 11*h11) \right\} dt =$$

$$D100D1 + \Delta(D200D1 + D300D1 + D400D1)$$

Formula E

The "Δ" in Formula E becomes almost zero if the pseudo propagation channel characteristics work well in results of the cross-correlation calculations with the signals from the other branches h12, h13, and h14 each of whose cross-correlation is low. As described above, if the pseudo propagation channel analyzing/extracting unit PR11 is taken as an example, the data D1 obtained by the corresponding branch h11 can be extracted as the data E1.

[Pseudo Propagation channel Characteristics]

Figure 3:
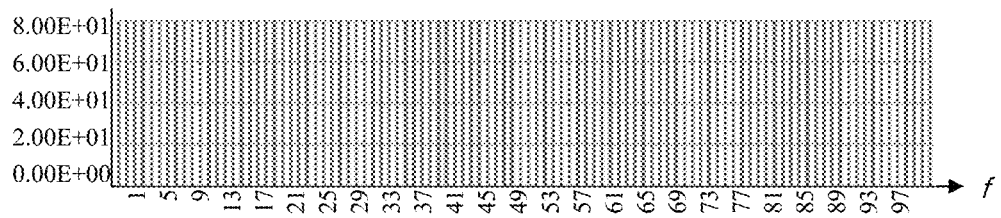
FIG. 3 is a view illustrating a method of measuring actual propagation channel characteristics according to the first embodiment.
Figure 3:
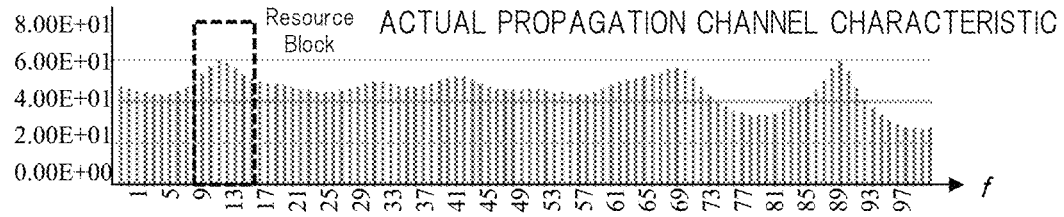
Figure 3:
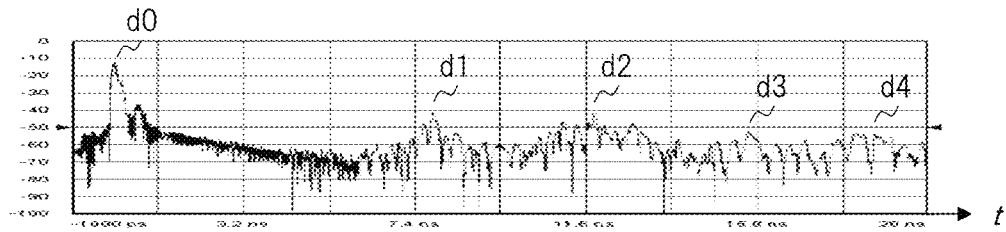
Figure 3:
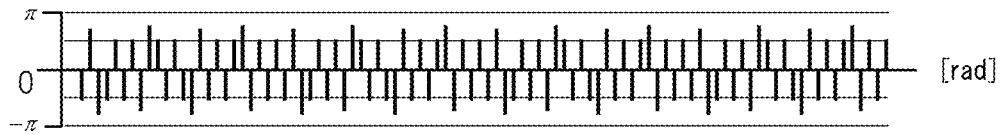
Figure 4:
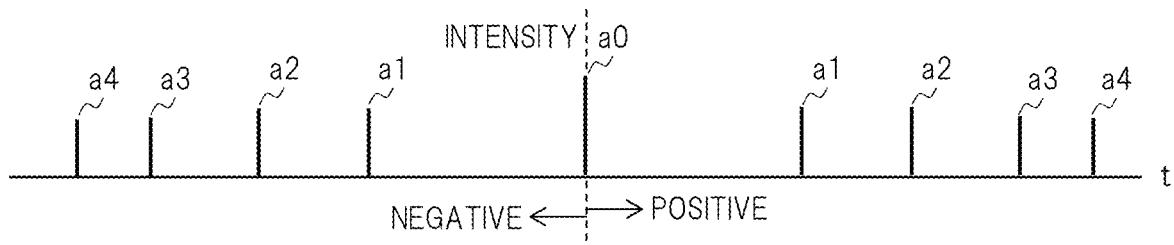
FIG. 4 is a view illustrating a method of generating pseudo propagation channel characteristics according to the first embodiment.
Figure 4:
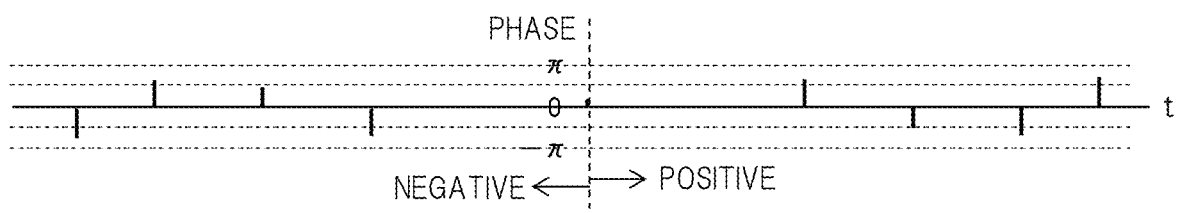

FIG. 3 and FIG. 4 illustrate a method of generating a pseudo delay profile model that is a pseudo propagation channel characteristic. FIG. 3 illustrates, as Part 1 thereof, a method of measuring an actual propagation channel characteristic, measured wireless propagation channel characteristics, and pseudo propagation channel models based on delay profiles that are derived on the basis of them. FIG. 4 illustrates, as Part 2 thereof, a method of generating pseudo propagation channel characteristics, and generated pseudo delay profile models. In the first embodiment and a second embodiment (will be described later), as characteristics of a plurality of pseudo propagation channels, characteristic portions are modeled using measurement results of a plurality of actual propagation channel characteristics, and characteristics subjected to modification to lower cross-correlation between models is used.

(a) of FIG. 3 illustrates an SRS signal to be transmitted from one device (for example, the receiving station 2). A horizontal axis of a graph denotes frequency (f) [Hz], and a vertical axis thereof denotes intensity of radio waves to be transmitted. The SRS signal is a signal for measuring a frequency characteristic of a radio wave propagation channel, and has the same amplitude and the same a phase within a used frequency band. One vertical line corresponds to a subcarrier.

(b) of FIG. 3 illustrates radio waves to which frequency characteristics of actual propagation channels are added as the radio waves that reach the other device configured to receive the SRS signal illustrated in (a) (for example, the transmitting station 1). A frame indicated by a broken line corresponds to a resource block that bundles a plurality of subcarriers.

In the example of FIG. 23 described above, in case of a FDD method (FDD: frequency division duplexing), the frequency is different between the downlink and the uplink. For that reason, for example, the transmitting station 1 causes the receiving station 2 at the other side to transmit the SRS signal therefrom immediately before data transmission. In case of a TDD method (TDD: time division duplexing), the frequency is the same between the downlink and the uplink. For that reason, for example, the transmitting station 1 measures actual propagation channel characteristics on the basis of the SRS signal from the receiving station 2 at the other side, or causes the other side to send a result of measuring characteristics of actual radio wave propagation channels as a report.

(c) of FIG. 3 illustrates phase characteristics of the propagation channel characteristics that is paired with the frequency characteristics illustrated in (b). A horizontal axis of a graph denotes a phase [rad]. A vertical axis thereof denotes a range from −π to π centered on 0.

Next, by converting information of (b) and (c) of FIG. 3 from a frequency domain to a time domain (frequency-time conversion), delay profile characteristics illustrated in (d) and (e) of FIG. 3 are obtained. This frequency-time conversion can be realized by an inverse FFT process (FFT: fast Fourier transform). (d) illustrates amplitude of the delay profile characteristics. A horizontal axis of a graph denotes a time (t). In particular, a direct wave d0, a first reflected wave d1, a second reflected wave d2, a third reflected wave d3, are a fourth reflected wave d4 indicated. (e) illustrates phases of the delay profile characteristic.

Next, (f) and (g) of FIG. 4 illustrate ones in which remarkable components in the delay profiles illustrated in (d) and (e) of FIG. 3 are taken out and simplified, that is, modeled ones as pseudo delay profile models. By subjecting the delay profiles illustrated in (d) and (e) of FIG. 3 to Z-transform to both sides, models illustrated in (f) and (g) of FIG. 4 are obtained.

The models illustrated in (f) and (g) of FIG. 4 are caused to have positive and negative components on a time axis by the Z-transform to both sides. This conversion, in other words, modeling is necessary to correctly reflect inversion of a polarization plane generated by propagation of the radio waves, for example, wall surface reflection on a phase axis. In (f) and (g), a horizontal axis thereof denotes a time (t). In (f), a vertical axis thereof denotes intensity of the radio waves. In (g), a vertical axis thereof denotes a phase, and has a range from $-\pi$ to $\pi$ centered on 0. In (f), what are visible as vertical lines indicate a direct wave a0, a first reflected wave a1, a second reflected wave a2, a third reflected wave a3, and a fourth reflected wave a4.

In a graph of (g), phases can be viewed at time positions respectively corresponding to time positions of the vertical lines of (f).

[Method of Reducing Cross-Correlation]

Figure 5:
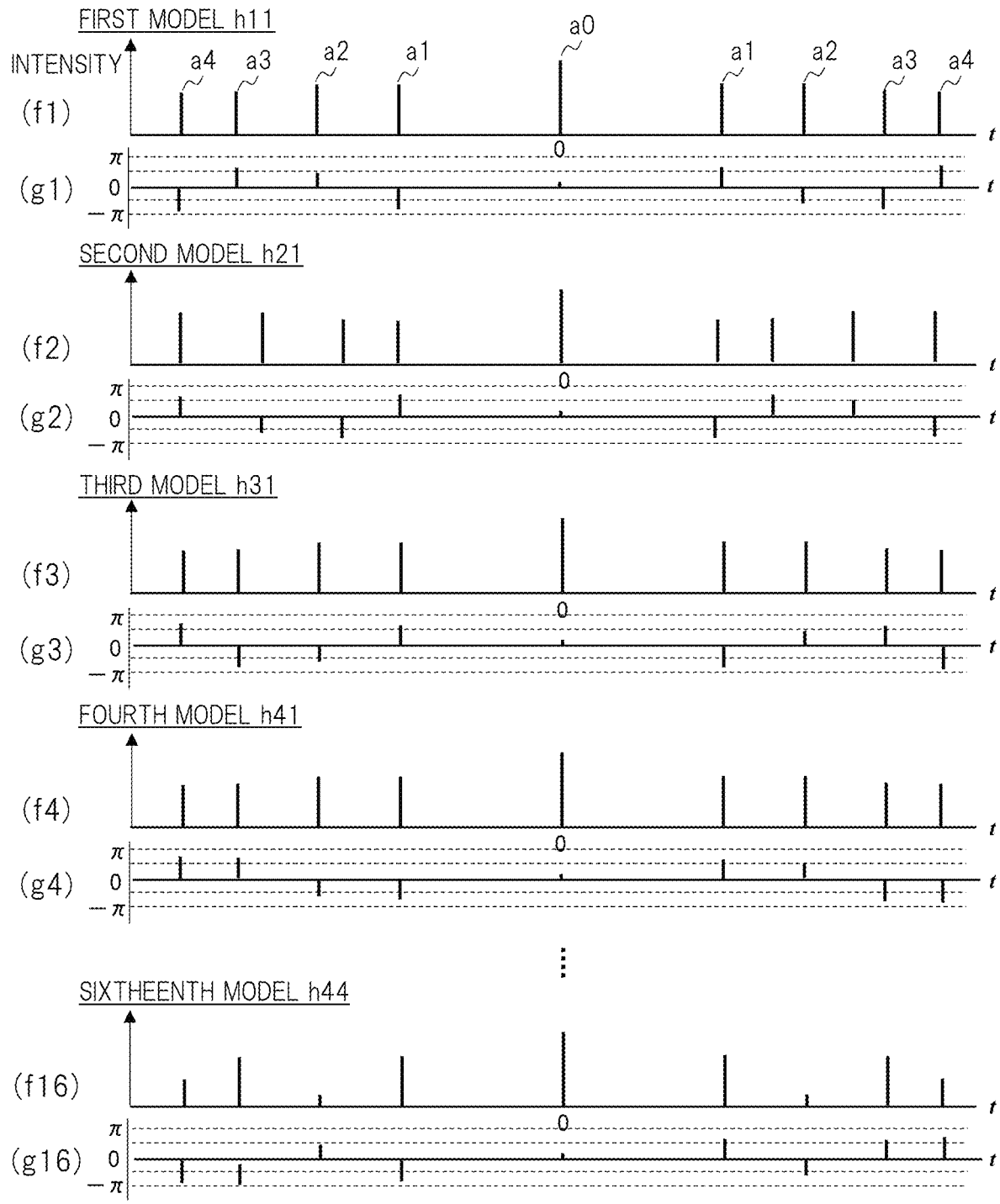
FIG. 5 is a view illustrating a method of reducing cross-correlation of propagation channels on diagonal lines in MIMO according to the first embodiment.

The pseudo delay profile models are generated for all the 16 propagation channels illustrated in FIG. 23. Namely, for example, 16 types of pseudo delay profile models each of whose cross-correlation is low are used. FIG. 5 illustrates a method of reducing cross-correlation of propagation channels on diagonal lines in MIMO. FIG. 5 illustrates pseudo delay profile models corresponding to 16 radio wave propagation channels of the 4×4 MIMO system illustrated in FIG. 2. (f1) and (g1) of FIG. 5 indicate a first model, (f2) and (g2) thereof indicates a second model, (f3) and (g3) thereof indicates a third model, and (f4) and (g4) thereof indicates a fourth model. Although they are omitted, there are respective models similarly, and (f16) and (g16) thereof indicates a sixteenth model.

In each of graphs of (f1), (f2), (f3), (f4), and (f16) of FIG. 5, a horizontal axis denotes a time, and a vertical axis denotes intensity in the similar manner to (f) of FIG. 4. In each of graphs of (g1), (g2), (g3), (g4), and (g16) of FIG. 5, a horizontal axis denotes a time, and a vertical axis denotes a phase in the similar manner to (g) of FIG. 4. These 16 models correspond to the amplitude and the phase of the respective characteristics of the 16 propagation channels illustrated in FIG. 2. (f1) and (g1) respectively correspond to the amplitude and the phase of the characteristic h11. (f2) and (g2) correspond to those of the characteristic h21. (f3) and (g3) correspond to those of the characteristic h31. (f4) and (g4) correspond to those of the characteristic h41. Similarly, (f16) and (g16) correspond to those of the characteristic h44.

A state of a delay wave of each model is different slightly on the time, and the phase is further different slightly. In order to reduce the cross-correlation, it is effective to strengthen a delay wave component. Here, it is not preferable to make a large adjustment because this causes a change in the frequency characteristic. In a case where the delay wave interval is considered as a sampling time, the frequency characteristic of the delay profile characteristic is most affected by the delay wave interval.

Therefore, in the configuration illustrated in FIG. 2, the pseudo delay profile models illustrated in FIG. 5 are sent to the pseudo propagation channels (the pseudo propagation channel characteristic device 101 and the pseudo propagation channel characteristic analyzing/extracting device 108) as they are. As a result, in the delay profile characteristic of the actual propagation channel, action of reducing components such as a large number of side lobe existing around the time of a model wave can be obtained, and this causes the cross-correlation to become low.

[Comparison of Capability of Cross-Correlation]

Figure 6:
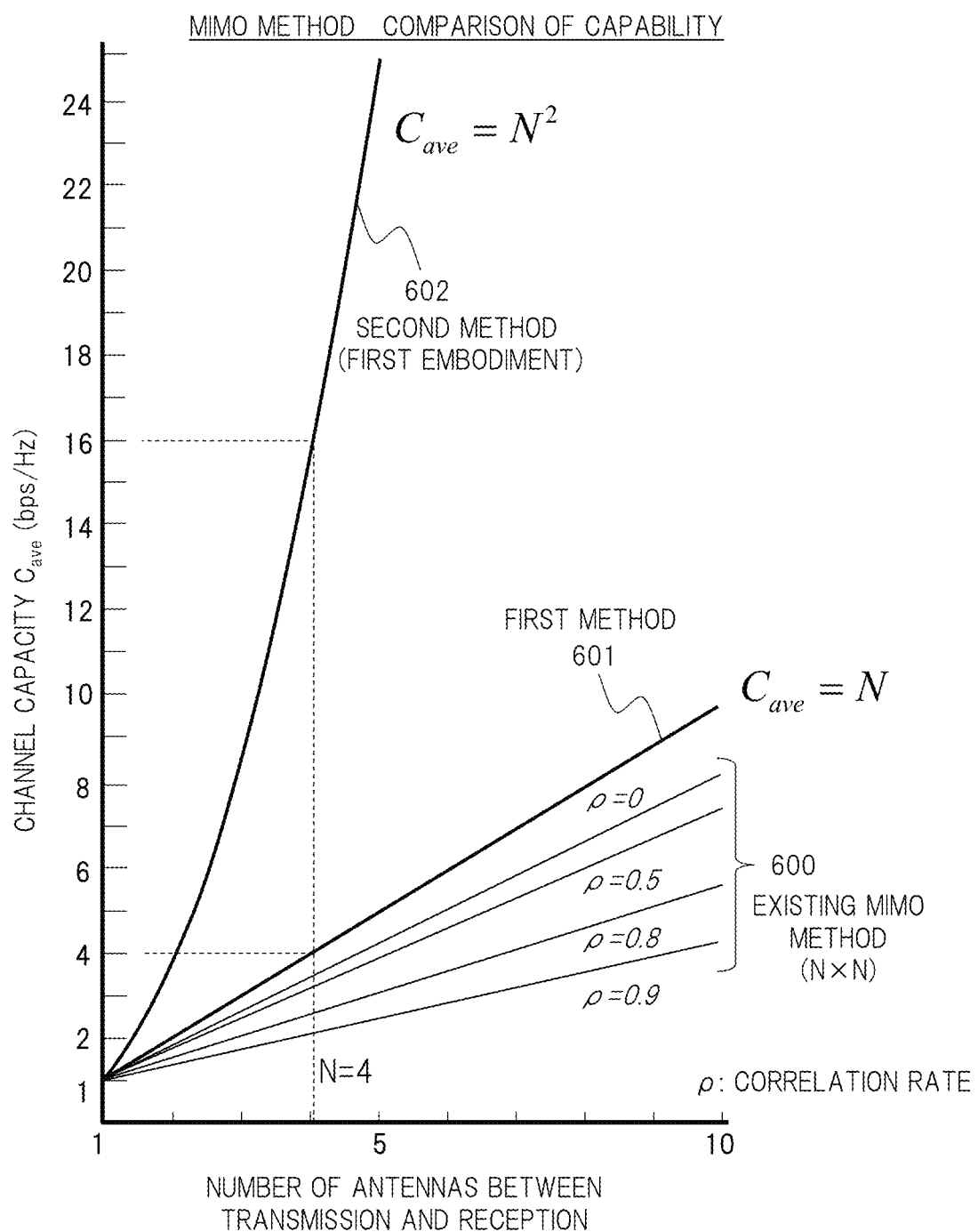
FIG. 6 is a view illustrating comparison of capability of the cross-correlation related to expansion using the pseudo propagation channel characteristics according to the first embodiment.

FIG. 6 illustrates comparison of capability of cross-correlation regarding expansion using the plurality of pseudo propagation channel characteristics described above (and the corresponding pseudo delay profile models). In a graph illustrated in FIG. 6, a horizontal axis denotes the number of antennas between transmission and reception, and a vertical axis denotes channel capacity $C_{ave}$ (bps/Hz). Straight lines 600 indicate capability of the existing N×N MIMO method. Each case of p={0, 0.5, 0.8, 0.9} is indicated using a correlation rate p. A straight line 601 indicates an improvement effect in case of a first method as the expansion described above.

The first method is a method described in Japanese Patent Application No. 2018-118353. A curved line 602 indicates an improvement effect in case of a second method corresponding to the first embodiment. In the case of the MIMO method of the straight lines 600 and the case of the first method of the straight line 601, the channel capacity increases in proportion to the number of antennas between transmission and reception. On the other hand, in the case of the second method of the curved line 602, the channel capacity increases in proportion to the square of the number of antennas between transmission and reception. As illustrated in FIG. 6, as an effect regarding the expansion described above, in the case of the method according to the first embodiment, it is possible to ideally realize a significantly higher capacity than the existing MIMO method.

[Influence of SRS Signal]

Note that since the propagation channel characteristics are measured and estimated by the SRS signal described above in the MIMO method, a transmission speed of user data may strictly be lowered due to an influence of the SRS signal. This will supplementarily be explained while comparing an example of 2×2 MIMO with an example of 16×16 MIMO. Since the SRS signal is required for each antenna at the transmitting side, SRS slots (that is, slots configured to transmit an SRS signal) are required for twice for the 2×2 MIMO and 16 times for the 16×16 MIMO. In the second method, the transmission speed is 4 obtained by a formula "$2^2$" in case of the 2×2 MIMO, and the transmission speed is 256 obtained by a formula "$16^2$" in case of the 16×16 MIMO. When a time of one frame is T and an SRS period (that is, a period for an SRS signal) within one frame is $\tau$, the efficiency $\eta$ in each case is as follows. In case of the 2×2 MIMO, it becomes "$\eta_{2\times2}=4/(T-2\tau)$". In case of the 16×16 MIMO, it becomes "$\eta_{16\times16}=256/(T-16\tau)$". Therefore, a ratio thereof becomes "$\eta_{16\times16}/\eta_{2\times2}=256/4\times(T-2\tau)/(T-16\tau)\approx256/4=64$". Therefore, it can be seen that the more the number of antennas between transmission and reception is, the lower the influence of the SRS period is.

[Effects and the Like (1)]

As described above, according to the first embodiment, it is possible to realize improvement of resource utilization efficiency such as frequency with respect to the MIMO. In the transmission/reception system according to the first embodiment, independence of characteristics of MIMO propagation channels is reinforced using the circuit for generating and reflecting the pseudo propagation channel characteristics of the baseband units with respect to the propagation channels on the diagonal lines between the transmitting/receiving antennas, which has not been utilized in the conventional MIMO system. As a result, according to the first embodiment, it is possible to realize an increase in information transmission speed up to N×M times in the N×M MIMO system. Further, it should be specially mentioned that in the conventional MIMO, there is a limitation of N≤M between the number of transmitting/receiving antennas, but it is clear that it is possible to provide a new MIMO method, which is not subject to this limitation in the usage of the pseudo propagation channel characteristics according to the present invention. Further, according to the first embodiment, even in a case where it is difficult to increase the number of transmitting/receiving antennas (for example, 16×16, 256×256, or the like) and the number of transmitting/receiving antennas is thus small (for example, 2×2), it is possible to improve the spectral efficiency and the information transmission speed by multiplexing using the pseudo propagation channels.

Second Embodiment

A transmission/reception method and a system thereof according to a second embodiment of the present invention will be described with reference to FIG. 7 to FIG. 10. Hereinafter, components different from those of the first embodiment in the second embodiment will be described. The transmission/reception method according to the second embodiment corresponds to a modification example of the transmission/reception method according to the first embodiment.

[Problem of Frequency Band]

There is room for improvement in characteristics such as transmission speed in the MIMO system illustrated in FIG. 6 described above from the viewpoint of spectral efficiency and the like. A transmitted signal has a predetermined wide frequency band. As illustrated in (b) of FIG. 3, a wide band signal propagated in an actual propagation channel is not flat due to frequency selective fading. In an extreme case, even though any is adopted, frequency portions that are insufficient for communication exist in each of the 16 propagation channels of the 4×4 MIMO illustrated in FIG. 2. For that reason, the expected value of the communication speed in the MIMO obtained by using the entire frequency band cannot be obtained if this goes on. In numeral terms, in a case where a frequency bandwidth is 20 MHz, the quadrature modulation is QPSK, and a MIMO level is 2×2 MIMO, a transmission speed R is a formula as follows by ignoring a frequency selective fading effect.

$$R = BW \times \text{eff}_{DSB} \times \text{eff}_{16\text{-}QAM\text{-}spectrum} \times n_{MIMO} = 20 \text{ MHz} \times \frac{1}{2} \times 4 \text{ bit/sec} \cdot \text{Hz} \times 2 = 80 \text{ Mbit/sec.}$$

Here, BW denotes a bandwidth, $\text{eff}_{DSB}$ denotes spectral efficiency by SSB modulation at both sides, $\text{eff}_{16\text{-}QAM\text{-}spectrum}$ denotes transmission rate efficiency in 16-value QAM modulation, and $n_{MIMO}$ denotes transmission rate magnification in n×n MIMO. However, as described above, the wider the bandwidth is, the more an influence of the frequency selective fading is received. Therefore, it becomes difficult to use all band of 20 MHz in the above formula. The second embodiment also solves such a problem.

[Transmission/Reception System]

Figure 7:
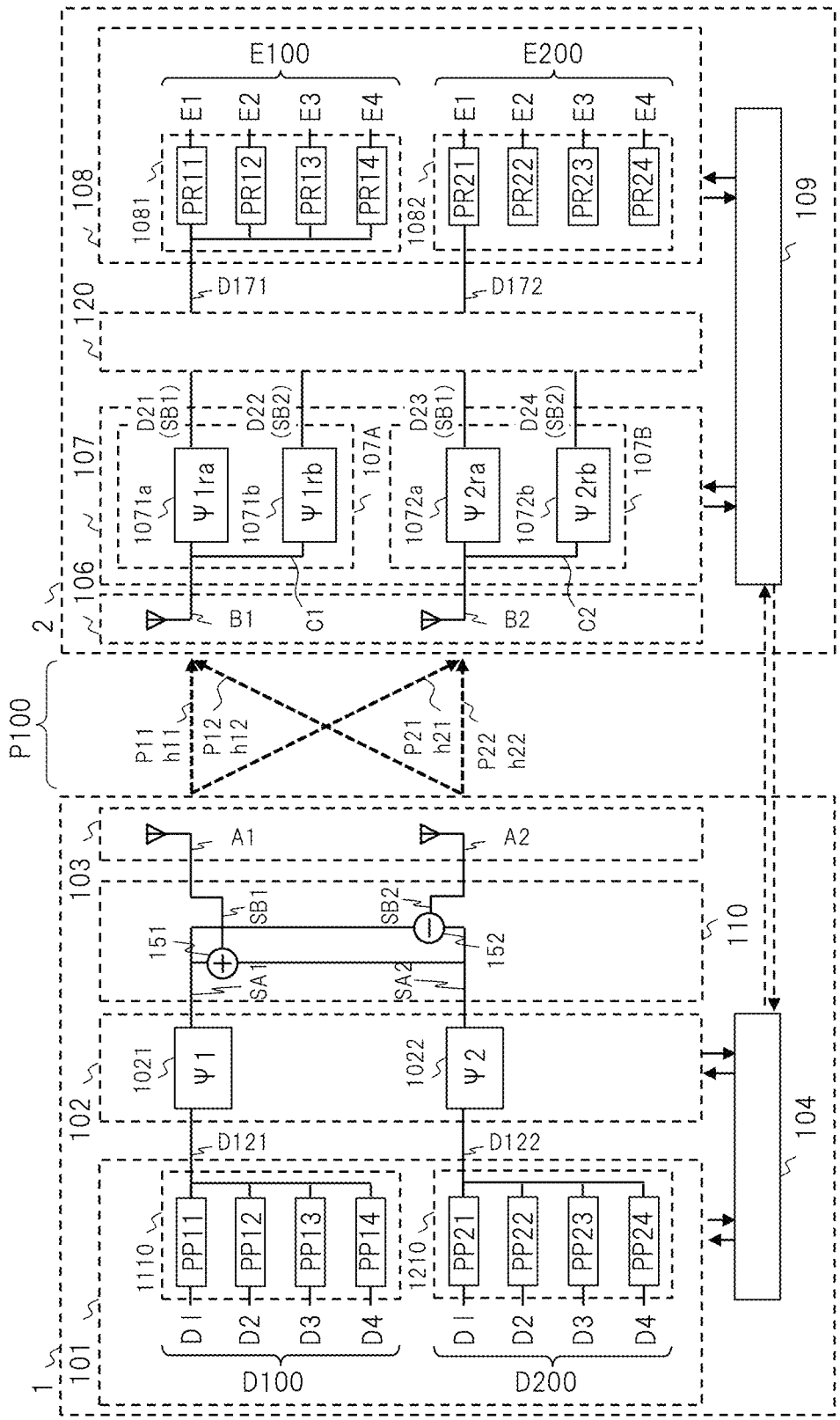
FIG. 7 is a view illustrating a configuration example of a MIMO system as a transmission/reception method and a system thereof according to a second embodiment of the present invention.

FIG. 7 illustrates a configuration example of a MIMO system as the transmission/reception system according to the second embodiment. FIG. 7 is one in which an element peculiar to the second embodiment is added to the 2×2 MIMO portion in the MIMO system illustrated in FIG. 2 according to the first embodiment. A diversity mechanism 110 is added between a MIMO processing unit 102 and a transmitting antenna unit 103 in a transmitting station 1. A receiving station 2 is different from that of the first embodiment in a configuration of a MIMO reception device 107, Further, a receiving side diversity processing unit 120 is added between the MIMO reception device 107 and a pseudo propagation channel characteristic analyzing/extracting device 108.

Two outputs of individual MIMO processing units 1021 and 1022 at the transmitting station 1 side are outputs SA1 and SA2. The two outputs SA1 and SA2 enter the diversity mechanism 110, and are supplied to an adder 151 configured to generate a sum of the two outputs SA1 and SA2 (hereinafter, referred to as a "sum signal SB1") and an adder 152 configured to generate a difference of the two outputs SA1 and SA2 (hereinafter, referred to as a "difference signal SB2"). The sum signal SB1 is transmitted from a transmitting antenna A1, and the difference signal SB2 is transmitted from a transmitting antenna A2. Each of the transmitted radio waves is received by receiving antennas B1 and B2 of a receiving antenna unit 106 via four propagation channels P11, P21, P12, and P22 (and corresponding characteristics h11, h21, h12, and h22) between 2×2 antennas in an actual propagation channel P100.

Signals C1 and C2 received by the receiving antenna unit 106 enter the MIMO reception device 107, and respectively enter MIMO processing units 107A and 107B roughly. The MIMO processing unit 107A includes individual MIMO processing units 1071a and 1071b, and the MIMO processing unit 107B includes individual MIMO processing units 1072a and 1072b. The received signal C1 is inputted into the two individual MIMO processing units 1071a and 1071b, and the received signal C2 is inputted into the two individual MIMO processing units 1072a and 1072b.

The characteristics h11, h12, h21, and h22 of the corresponding actual propagation channels are transmitted from receiving side MIMO control units in a propagation channel characteristic managing unit 109 to the four individual MIMO processing units of the MIMO reception device 107. On the basis of this, the respective individual MIMO processing units extract the sum signal SB1 and the difference signal SB2 at a transmitting side from signals of the received radio waves in accordance with the respective characteristics. For example, the sum signal SB1 characterized by the characteristic h11 of the propagation channel P11 reaches the first receiving antenna B1 from the transmitting antenna A1, and the difference signal SB2 characterized by the characteristic h12 of the propagation channel P12 reaches the first receiving antenna B1 from the transmitting antenna A2. Similarly, the sum signal SB1 characterized by the characteristic h21 and the difference signal SB2 characterized by the characteristic h22 respectively reach the second receiving antenna B2 from the transmitting antennas A1 and A2.

The individual MIMO processing unit 1071a can extract the sum signal SB1 from the first transmitting antenna A1 on the basis of the characteristic h11 from the received signal C1. The individual MIMO processing unit 1071b can extract the difference signal SB2 from the second transmitting antenna A2 on the basis of the characteristic h12 from the received signal C1. The individual MIMO processing unit 1072a can extract the sum signal SB1 from the first transmitting antenna A1 on the basis of the characteristic h21 from the received signal C2. The individual MIMO processing unit 1072*b* can extract the difference signal SB2 from the second transmitting antenna A2 on the basis of the characteristic h22 from the received signal C2.

From the above, in four outputs D21, D22, D23, and D24 of the MIMO reception device 107, the two sum signals SB1 and the two difference signals SB2 can be obtained. However, these two corresponding signals are not the same as each other. this is because they are transmitted and received through the different propagation channels, and the action of the frequency selective fading is different from each other.

Note that FIG. 7 illustrates only the transmitting/receiving antennas and the 2×2 portions as the propagation channels, but the other transmitting/receiving antennas and the other portions of the MIMO can have the similar configuration.

[Frequency Selective Fading]

Figure 8:
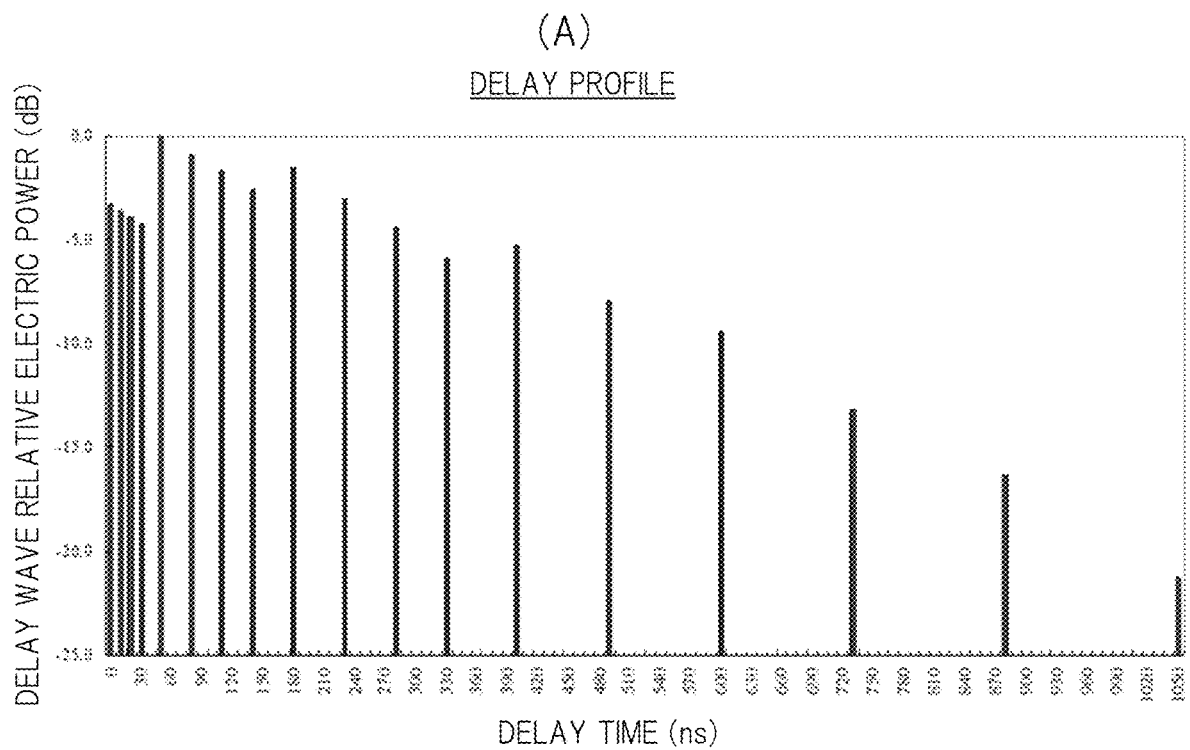
FIG. 8 is a view illustrating a simulation example of frequency selective fading according to the second embodiment.
Figure 8:
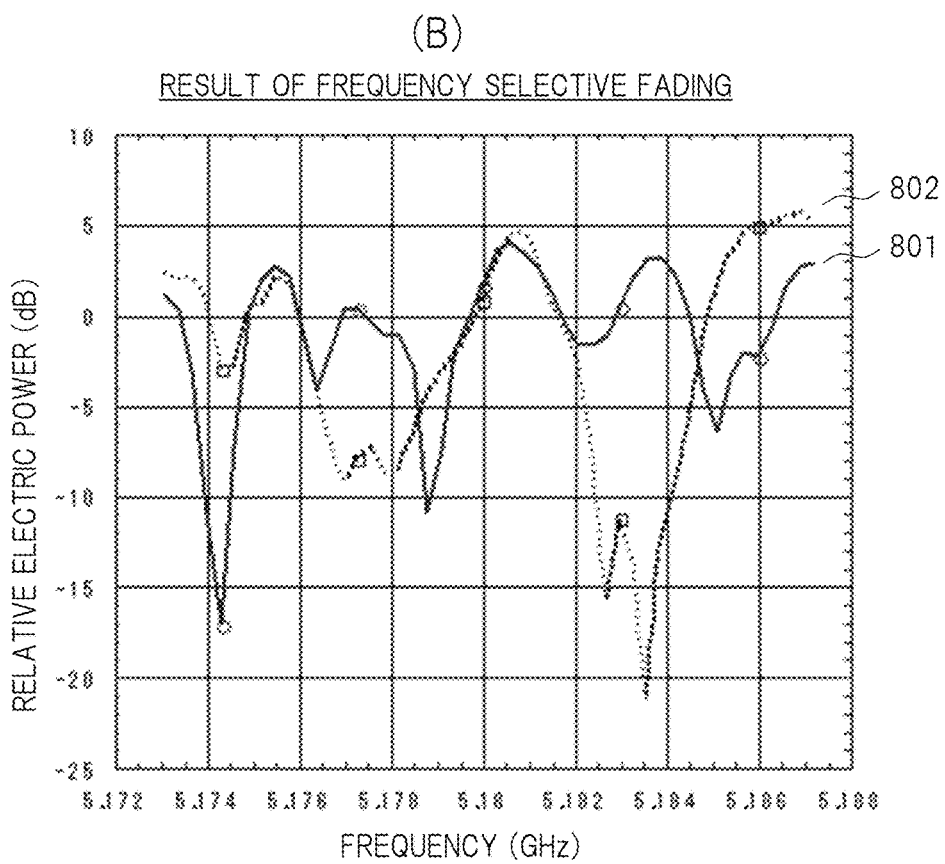

FIG. 8 illustrates a simulation example of frequency selective fading by multipath fading in a width of 15 MHz of a 5 GHz band. (A) of FIG. 8 illustrates a delay profile using simulation. A horizontal axis of a graph indicates a delay time [ns], and a vertical axis thereof indicates delay wave relative electric power (dB). (B) of FIG. 8 illustrates a simulation result of the frequency selective fading at position of two different spots by the multipath fading in the 5 GHz band. A horizontal axis of a graph indicates frequency (GHz), and a vertical axis thereof indicates relative electric power (dB). A spectrum 801 indicates a case of a first spot, and a spectrum 802 indicates a case of a second spot. A frequency width is about 15 MHz, and an interval between each peak and an adjacent valley of fading is about 2 MHz. Moreover, it can be seen that attenuation of intensity appears at about every 5 MHz. In FIG. 8, images of the action affected by the frequency selective fading of the four radio wave propagation channels as illustrated in FIG. 7 are drawn for each propagation channel, and an image of frequency spectrums in a case where signals passing through the four propagation channels are synthesized is illustrated.

[Effect of Removing Frequency Selective Fading]

Figure 9:
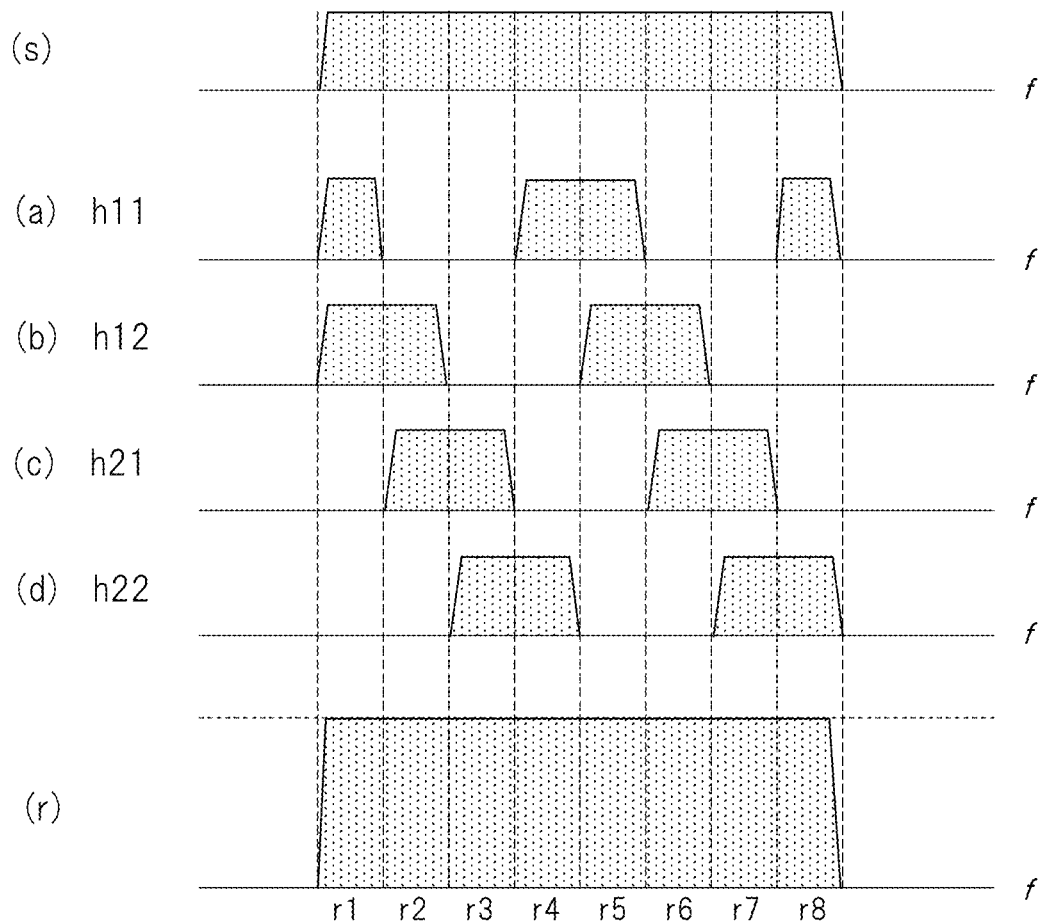
FIG. 9 is a view illustrating an effect of removing the frequency selective fading according to the second embodiment.

FIG. 9 illustrates an effect of removing the frequency selective fading in the 2×2 MIMO, which is the diversity according to the second embodiment. A horizontal axis of each graph illustrated in FIG. 9 is frequency (f). In FIG. 9, (s) indicates a frequency band characteristic at the transmitting side. (a) to (d) respectively indicate frequency spectrums affected by the action of frequency selective fading on characteristics of the four propagation channels described above. (a) indicates one by the characteristic h11 of the propagation channel P11, (b) indicates one by the characteristic h12 of the propagation channel P12, (c) indicates one by the characteristic h21 of the propagation channel P21, and (d) indicates one by the characteristic h22 of the propagation channel P22. For example, when the spectrum of (a) is viewed, each of frequency domains r1, r4, r5, and r8 has a peak, but each of frequency domains r2, r3, r6, and r7 has a valley due to attenuation.

In a case where the propagation channels are independent of each other, in other words, in a case where cross-correlation is low, the action of the frequency selective fading also becomes independent of each other as illustrated in FIG. 9, and a diversity effect can be expected. Namely, when these spectrums of (a) to (d) are synthesized, it becomes a spectrum illustrated in (r) of FIG. 9, and this makes it possible to complement the mutually attenuated frequency domains.

In FIG. 7, the receiving side diversity processing unit 120 obtains signals D171 and D172, which correspond to the outputs D121 and D122 in which the eight individual pseudo propagation channels of the pseudo propagation channel characteristic device 101 at the transmitting side are added, from the four outputs (the outputs D21 to D24) received from the MIMO reception device 107. These signals D171 and D172 are supplied to the pseudo propagation channel characteristic analyzing/extracting device 108, and the similar processing to that of the first embodiment is executed.

The pseudo propagation channel characteristic analyzing/extracting device 108 includes pseudo propagation channel characteristic analyzing/extracting units 1081 and 1082. For example, the pseudo propagation channel characteristic analyzing/extracting unit 1081 includes four pseudo propagation channel analyzing/extracting units PR11 to PR14.

Each of the pseudo propagation channel characteristic analyzing/extracting units extracts a signal by analysis based on the corresponding pseudo propagation channel characteristic. For example, the pseudo propagation channel characteristic analyzing/extracting unit 1081 acquires four data E1 to E4, and these become outputs (a received data group) E100.

[Signal Conversion]

Figure 10:
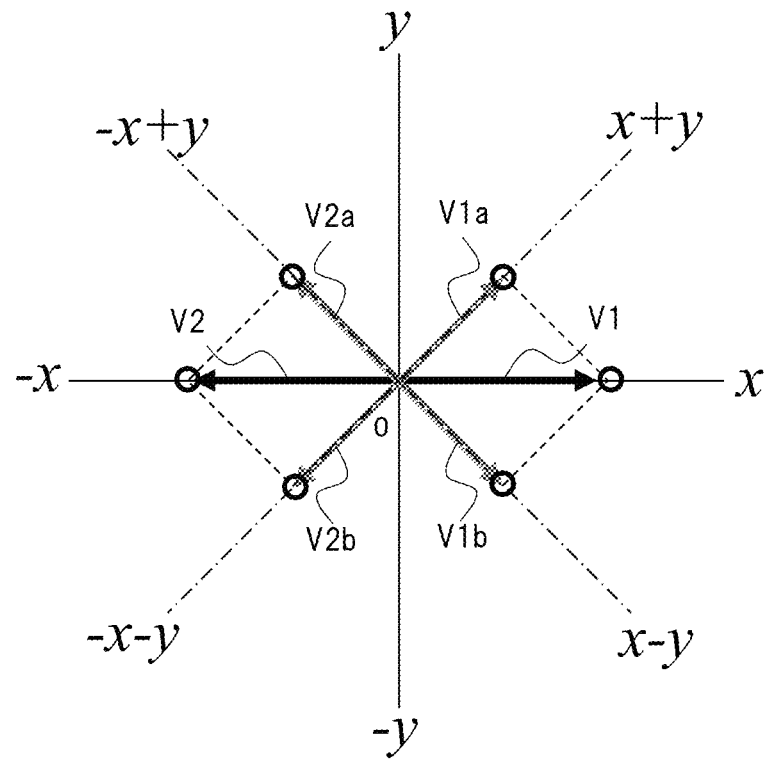
FIG. 10 is a view illustrating signal conversion for reducing the frequency selective fading according to the second embodiment.
Figure 10:
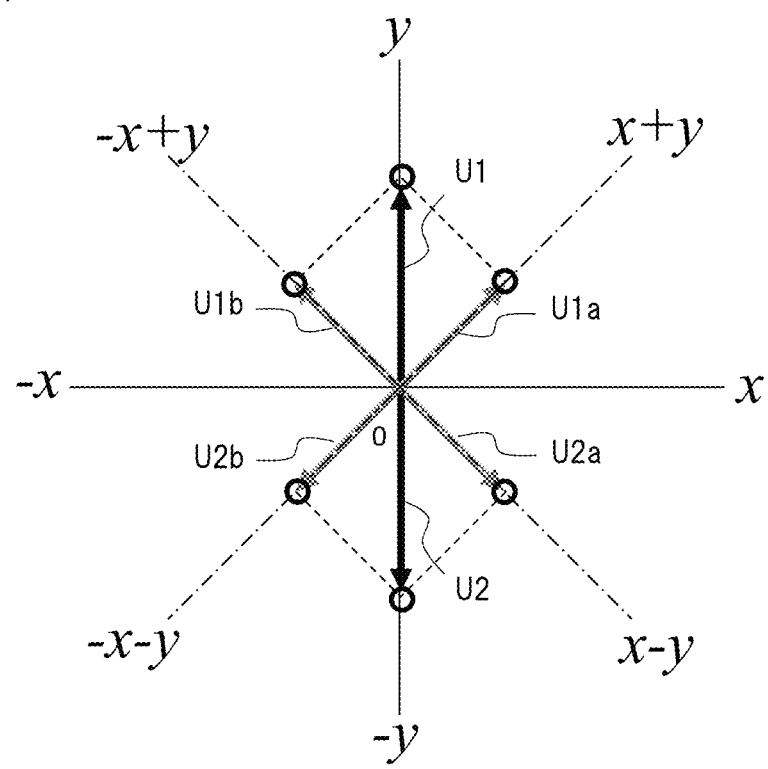

Signal conversion executed by the two adders 151 and 152 of the diversity mechanism 110 illustrated in FIG. 7 will be described with reference to FIG. 10. FIG. 10 illustrates signal conversion for reducing frequency selective fading in the MIMO system, and illustrates a method of synthesizing two orthogonal signals. Here, the two orthogonal signals are considered on an x axis and a y axis. (A) of FIG. 10 illustrates how a vector signal V1 and a vector signal V2 on the x axis are viewed from a (x+y, −x−y)/(x−y, −x+y) plane, which is at π/4 rotation positions on an x-y plane. (B) of FIG. 10 illustrates how a vector signal U1 and a vector signal U2 on the y axis are also viewed from the (x+y, −x−y)/(x−y, −x+y) plane. Each of the vector signals is as follows. V1=V1*a*+V1*b*, V2=V2*a*+V2*b*, U1=U1*a*+U1*b*, and U2=U2*a*+U2*b*.

Here, addition of the vector signal V1 and the vector signal U1 becomes V1+U1=V1*a*+V1*b*+U1*a*+U1*b*=2U1*a*, and a difference between the vector signal V1 and the vector signal U1 becomes V1−U1=V1*a*+V1*b*−(U1*a*+U1*b*)=2U2*a*. In each case, the vector moves onto a coordinate axis rotated by π/4.

On the other hand, since V1*a*=U1*a*, V1*b*=U2*a*, V2*a*=U1*b*, V2*b*=U2*b*, it becomes V1*a*+U2*a*=V1, V1*a*−U2*a*=U1. Namely, when the addition or difference of two signals is created at the receiving station 2 side, it returns to the original vector signal on the x-y plane. The receiving side diversity processing unit 120 executes the process of returning to the original in this manner.

[Effects and the Like (2)]

As described above, according to the second embodiment, the following effects are provided in addition to the effects according to the first embodiment. With respect to lowering of transmission efficiency due to the frequency selective fading, which is inherent in each propagation channel in the conventional MIMO system, by using a circuit for generating and reflecting the characteristics of the pseudo propagation channels in a baseband unit in the transmission/reception system according to the second embodiment, generation and transmission of the sum signal and the difference signal between the transmitted signals are executed. A circuit for restoring those signals is provided at the receiving station side. As a result, according to the second embodiment, it is possible to realize a complementary effect of the frequency selective fading that is comparable to the number of antennas, and this makes it possible to further improve the transmission speed.

Third Embodiment

A transmission/reception method and a system thereof according to a third embodiment of the present invention will be described with reference to FIG. 11 to FIG. 16. In the third embodiment and a fourth embodiment (will be described later), a case where they are applied to beam forming will be described. In these embodiments, a configuration in which signals of a plurality of pseudo propagation channels can be distributed in accordance with communication applications at the time of transmission/reception using a beam forming function is illustrated. In the third and fourth embodiments according to the present invention, pseudo propagation channel characteristics in beam forming can be freely generated (free generation within a range of cross-correlation requirements) without the need for measurement of actual propagation channel characteristics.

[Outline]

In the third embodiment, problems and solutions of the beam forming function, which is the main role of fifth-generation mobile communication, will be described. The beam forming function is a function of generating a focus of a radio wave beam at a desired spot (or a reception point) by controlling amplitude and/or a phase of a radio signal from each antenna using a plurality of antennas. However, it is necessary to distribute the same signal to all the antennas as a condition of an input. For that reason, a plurality of data can be transmitted at the same time during a MIMO operation in which the plurality of antennas can be used individually, but only a single datum can be transmitted at the same time during the beam forming.

On the other hand, in the fifth-generation mobile communication, it is essential to separate and parallelize communication paths in order to achieve standardization goals such as speed up of communication, securement of low delay, or securement of high reliability. As main one of separation and parallelization of communication paths, there is separation and parallelization between a control signal system (C: Control signal/data) and a user data system (U: User signal/data), which is called CU splitting. In addition, there is separation and parallelization between an SRS signal used for measurement of propagation channel characteristics and the user data system. Further, in addition, there is separation and parallelization between a notification signal (BCCH: Broadcast Control CHannel) or a random access signal (RACH: Random Access CHannel), which are indispensable for initial connection processing of a terminal, and a communication signal after connection PDSCH (Physical Downlink Shared Channel) or PDCCH (Physical Downlink Control Channel).

However, in a case where a plurality of antennas is used as the beam forming function, a beam transmission path becomes single. Therefore, the signals required for the fifth-generation mobile communication described above cannot be separated and parallelized. In the third embodiment, a method capable of solving such a problem is presented.

The transmission/reception method according to the third embodiment is a transmission/reception method of transmitting and receiving data between a transmission device with a plurality (N) of transmitting antennas and a reception device with one or more receiving antennas. Here, the transmission device has a beam forming transmission function including the plurality (N) of transmitting antennas, a beam forming transmission circuit, and a beam control unit. The reception device has a beam forming reception function including the receiving antennas and a beam forming reception circuit. This method is a method of transmitting and receiving data between the transmission device and the reception device by beam forming.

The beam forming transmission function is a function of transmitting a group of radio waves constituting a beam from the plurality (N) of transmitting antennas on the basis of one piece of data. Functions of the beam control unit include a function of executing a propagation control for focusing the beam at a desired reception point on the basis of a plurality of actual propagation channel characteristics between the plurality (N) of transmitting antennas and the receiving antennas. The beam forming reception function is a function of receiving a group of signals corresponding to one piece of data at a transmitting side from the group of radio waves of the beam received by the receiving antennas.

This transmission/reception method includes a generating step, a creating step, a transmitting step, a receiving step, and an extracting step as follows. The generating step is a step of generating characteristics of a plurality of pseudo propagation channels between the plurality (N) of transmitting antennas and the receiving antennas by the transmission device or the reception device. Next, the creating step is a step of creating, by the transmission device, one piece of data or one signal to be transmitted by synthesizing or aggregating each data in a plurality (for example, I+J) of parallel and independent data, which are transmission targets and at least contain a first data group (for example, I pieces of data) and a second data group (for example, J pieces of data) as a plurality of data groups whose types are different from each other, from a plurality (I+J) of outputs (a group of modulation outputs). The plurality (I+J) of outputs is respectively obtained by characterizing the plurality (for example, I+J) of parallel and independent data by the characteristics of the plurality (I+J) of pseudo propagation channels. Next, the transmitting step is a step of transmitting, by the transmission device, a group of radio waves constituting a beam from the plurality (N) of transmitting antennas in which propagation characteristics are controlled so as to focus on a desired reception point by the beam forming transmission function on the basis of the one piece of data or one signal to be transmitted. Next, the receiving step is a step of receiving, by the reception device, a signal from the group of radio waves arriving in a state of the beam by the beam forming reception function including the receiving antenna. Next, the extracting step is a step of extracting, by the reception device, a plurality of data corresponding to the plurality (I+J) of parallel and independent data from the received signal on the basis of analysis of the characteristics of the plurality (I+J) of pseudo propagation channels corresponding to those at the transmitting side. The plurality (I+J) of parallel and independent data characterized by the characteristics of the plurality (I+J) of pseudo propagation channels contains a plurality of data groups whose types are different from each other. Note that existing beam forming techniques can be applied to the transmitting step and the receiving step described above. The plurality of data groups whose types are different from each other described above is a data group in one selected from different planes on a protocol stack, different bearers, different channels, different slices, different bandwidth control service types, or communication with different degrees of urgency, or is a data group of a control/management signal and an application signal. As the different bandwidth control service types, a bandwidth control or a service type such as a GBR (guaranteed bit rate), a CBR (constant bit rate), a VBR (variable bit rate), a ABR (Available bit rate), and a UBR (unspecified bit rate) is cited.

[Transmission/Reception Method and System Thereof]

Figure 11:
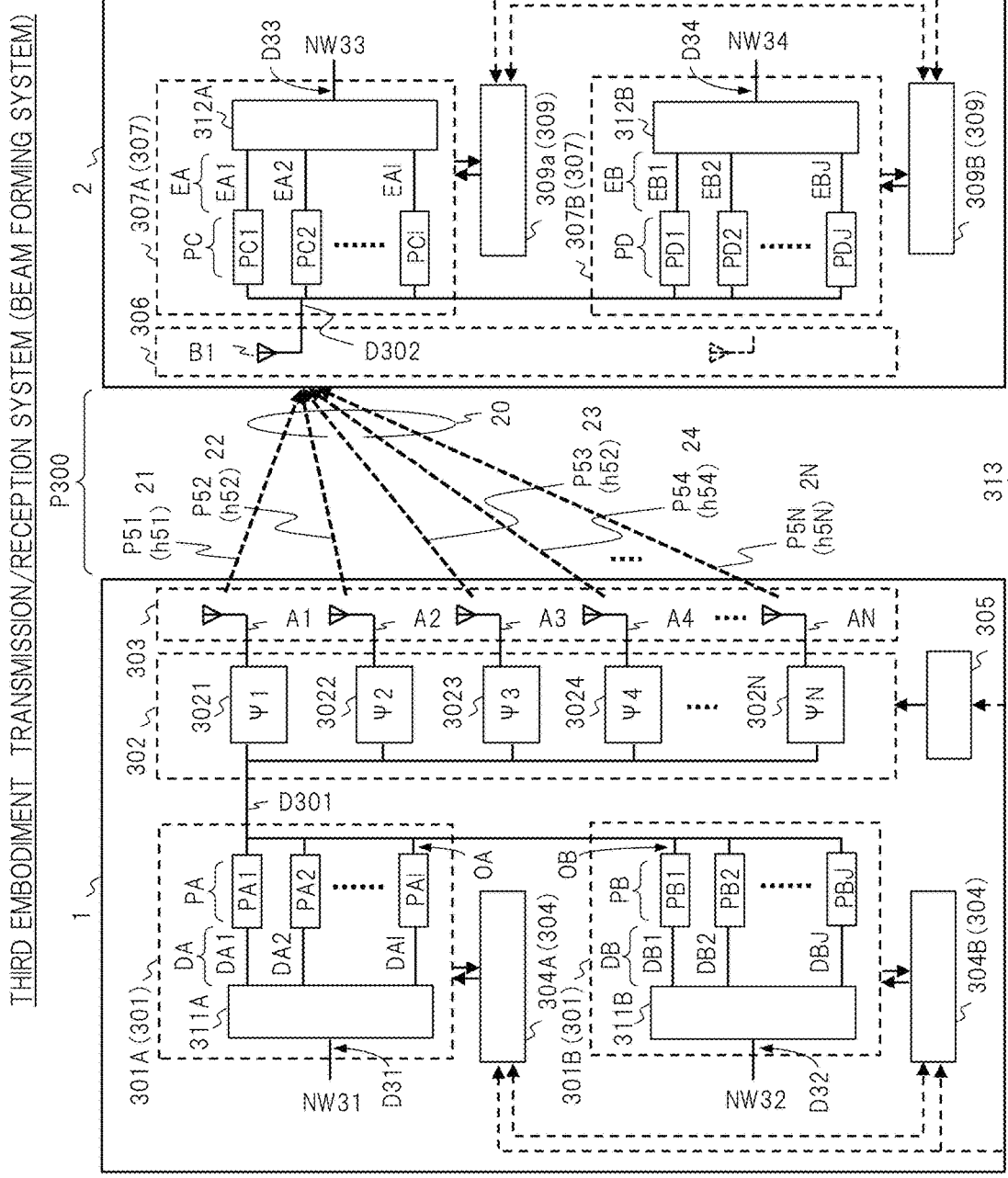
FIG. 11 is a view illustrating a configuration example of a beam forming system as a transmission/reception method and a system thereof according to a third embodiment of the present invention.

FIG. 11 illustrates a configuration of a beam forming system as the transmission/reception method and the system thereof according to the third embodiment. For example, a transmitting station 1 is a transmission device such as a wireless base station, and a receiving station 2 is a reception device such as a user terminal. The transmitting station 1 includes a plurality of pseudo propagation channel characteristics devices 301, a beam forming control circuit 302, a transmitting antenna unit 303, one or more propagation channel characteristic managing units 304, and a beam control unit 305, and the like in a baseband unit (whose illustration will be omitted) at the transmitting side. A beam forming control function is configured by the beam forming control circuit 302, the transmitting antenna unit 303, and the beam control unit 305. For example, the plurality of the pseudo propagation channel characteristic devices 301 includes, as two pseudo propagation channel characteristic devices, a pseudo propagation channel characteristic device 301A and a pseudo propagation channel characteristic device 301B.

For example, the one or more propagation channel characteristic managing units 304 includes, as two propagation channel characteristic managing units, a propagation channel characteristic managing unit 304A and a propagation channel characteristic managing unit 304B. The present embodiment is configured so as to include two pseudo propagation channel characteristic devices in the baseband unit at the transmitting side in the one transmitting station 1, but it is not limited to this. The present embodiment may be configured so as to include three or more pseudo propagation channel characteristic devices and corresponding propagation channel characteristic managing units.

The pseudo propagation channel characteristic device 301A includes a distributor 311A configured to supply data DA1, DA2, . . . , and DAI as a plurality (I) of data, which are a data group of a transmission target (for example, a first transmission data group), and a plurality (I) of pseudo propagation channels PA1, PA2, . . . , and PAI corresponding to the plurality (I) of data. Similarly, the pseudo propagation channel characteristic device 301B includes a distributor 311B configured to supply data DB1, DB2, . . . , and DBJ as a plurality (J) of data, which is a data group of a transmission target (for example, a second transmission data group), and a plurality (J) of pseudo propagation channels PB1 to PBJ corresponding to the plurality (J) of data. Note that "I" and "J" may be the same number, or may be different from each other. A signal/data D31 is inputted into the distributor 311A from the communication path NW31. A signal/data D32 is inputted into the distributor 311B from the communication path NW32. The communication paths NW31 and NW32 are communication paths or network in the transmitting station 1, and include optical fibers as an implementation example. Note that the at least two communication paths NW31 and NW32 are provided, but it is not limited to this. Three or more communication paths may be connected to the pseudo propagation channel characteristic device 301.

The receiving station 2 includes a receiving antenna unit 306, one or more pseudo propagation channel characteristic analyzing/extracting devices 307, and a propagation channel characteristic managing unit 309 in a baseband unit (whose illustration will be omitted). For example, the pseudo propagation channel characteristic analyzing/extracting devices 307 includes a pseudo propagation channel characteristic analyzing/extracting device 307A and a pseudo propagation channel characteristic analyzing/extracting device 307B as two pseudo propagation channel characteristic analyzing/extracting devices. Further, the propagation channel characteristic managing unit 309 includes a propagation channel characteristic managing unit 309A and a propagation channel characteristic managing unit 309B as two propagation channel characteristic managing units. The pseudo propagation channel characteristic analyzing/extracting device 307A includes a plurality (I) of pseudo propagation channel characteristic analyzing/extracting circuits (PC1 to PCI) connected to the receiving antenna unit 306 (a receiving antenna B1), and an aggregator 312A connected to them.

The pseudo propagation channel characteristic analyzing/extracting device 307B includes a plurality (J) of pseudo propagation channel characteristic analyzing/extracting circuits (PD1 to PDJ), and an aggregator 312B connected to them.

In the example illustrated in FIG. 11, as paths/communication lines for transmitting and receiving signal/data via beam forming, there are roughly two paths/communication lines. One is a first communication line, and the other is a second communication line. The first communication line is a path using the communication path NW31, the pseudo propagation channel characteristic device 301A, the pseudo propagation channel characteristic analyzing/extracting device 307A, and a communication path NW33. The second communication line is a path using the communication path NW32, the pseudo propagation channel characteristic device 301B, the pseudo propagation channel characteristic analyzing/extracting device 307B, and a communication path NW34. In the third embodiment, the plurality (two) of paths is used for transmitting plural types of data (the first data group and the second data group) in accordance with use applications of separation and parallelization of signals such as the CU splitting. For example, in the CU splitting, the first data group can be used as control plane data, and the second data group can be used as user plane data.

The transmitted data (the first data D31 and the second data D32) at the transmitting station 1 side are respectively supplied from the communication path NW31 and the communication path NW32 to the distributor 311A and the distributor 311B, and become a plurality of parallel and independent data groups by distribution. For example, the control plane data are supplied from the communication path NW31 as the first data D31, and the user plane data are supplied from the communication path NW32 as the second data D32. A first transmission data group DA outputted from the distributor 311A on the basis of the first data D31 is configured by the plurality (I) of data (the data DA1, DA2, . . . , and DAI). A second transmission data group DB outputted from the distributor 311B on the basis of the second data D32 are configured by the plurality (J) of data (the data DB1, DB2, . . . , and DBJ).

Pseudo propagation channel characteristics are respectively reflected to the first transmission data group DA (DA1 to the DAI) and the second transmission data group DB (DB1 to DBJ) in the pseudo propagation channel characteristic devices 301A and 301B. The first transmission data group DA (DA1 to the DAI) are respectively characterized by transfer functions of the plurality (I) of pseudo propagation channels PA (PA1 to PAI) whose number corresponds to the number (I) of data. The second transmission data group DB (DB1 to DBJ) are respectively characterized by transfer functions of the plurality (J) of pseudo propagation channels PB (PB1 to PBJ) whose number corresponds to the number (J) of data.

In the third embodiment, the characteristics of the plurality (for example, I+J) of pseudo propagation channels are generated and set independently of a characteristic of an actual propagation channel P300 so that their cross-correlation is sufficiently low. The plurality (I) of pseudo propagation channels PA is referred to as a first group, and the plurality (J) of pseudo propagation channels PB is referred to as a second group. A plurality (I) of pseudo delay profile models whose cross-correlation is low is set to the plurality (I) of pseudo propagation channels PA of the first group from the propagation channel characteristic managing unit 304A. Similarly, a plurality (J) of pseudo delay profile models whose cross-correlation is low is set to the plurality of pseudo propagation channels PB of the second group from the propagation channel characteristic managing unit 304B. Even when viewed as the whole plurality (I+J) of pseudo propagation channels obtained by adding the plurality (I) of pseudo propagation channels PA and the plurality (J) of pseudo propagation channels PB, a plurality (I+J) of pseudo delay profile models is set so that their cross-correlation becomes low. Note that the two propagation channel characteristic managing units 304A and 304B may be configured to be combined into one.

A plurality (I+J) of outputs, which is obtained by adding a plurality (I) of outputs (output signals) OA from the plurality of pseudo propagation channels PA of the pseudo propagation channel characteristic device 301A and a plurality (J) of outputs (output signals) OB from the plurality (J) of pseudo propagation channels PB of the pseudo propagation channel characteristic device 301B, is synthesized into one output (one output signal) D301. This synthesis can be realized by digital processing such as addition or modulation, for example. In other words, the output signal D301 is a signal in which a plurality of types (for example, two types) of data (for example, the first data group and the second data group) is superimposed in the CU splitting or the like. Then, the output signal D301 is supplied to each of a plurality (N) of beam forming circuits (circuits 3031 to 303N) in the beam forming control circuit 302. The beam forming control circuit 302 includes circuits 3021, 3022, . . . , and 302N as a plurality (N) of beam forming circuits corresponding to the plurality (N) of transmitting antennas of the transmitting antenna unit 303.

The beam forming control circuit 302 executes a control, such as amplitude phase adjustment, for the one output signal D301 on the basis of a control from the beam control unit 305 for each antenna element of the transmitting antenna unit 303, and respectively supplies signals after control to the antenna elements (the antenna A1 to AN). Control processes such as the amplitude phase adjustment in the beam forming circuits respectively denote functions Ψ1 to ΨN. The beam control unit 305 is a part that has a function of controlling propagation characteristics on the basis of the characteristic of the actual propagation channel P300 between the plurality of transmitting antennas and the receiving antenna so as to focus on a desired reception point by the beam forming. At least one of the transmitting station 1 or the receiving station 2 measures the characteristic of the actual propagation channel P300. The beam control unit 305 acquires measurement information of the characteristic of the actual propagation channel P300 (containing information on characteristics of frequency and a phase) through a radio line 313, and executes arithmetic processing (precoding in an existing technique) for flattening and focusing the characteristic of the frequency of the actual propagation channel P300 for beam forming control on the basis of the measurement information. The beam control unit 305 sets and controls each circuit of the beam forming control circuit 302 on the basis of an arithmetic result. The beam forming control circuit 302 controls amplitude and a phase of the output signal D301 as an input in accordance with the control.

The transmitting antenna unit 303 includes the antennas A1, A2, A3, . . . , and AN as the plurality (N) of transmitting antennas (and the corresponding antenna elements) compatible with the beam forming function.

The actual propagation channel P300 includes a plurality of propagation channels P51, P52, . . . , and P5N between the plurality (N) of antennas at the transmitting side and the one or more antennas at the receiving side. Characteristics of the respective propagation channels are characteristics h51, h52, . . . , and h5N. Radio waves corresponding to the respective propagation channels are radio waves 21, 22, 23, 24, . . . , and 2N, and these are referred to as a group of radio waves 20. As a result of the beam forming control, the group of radio waves 20 from the transmitting antenna unit 303 forms a predetermined beam, and a main beam reaches the antenna B1 of the receiving antenna unit 306 in the receiving station 2 to focus as a reception point.

The receiving antenna unit 306 includes at least one the antenna B1, but may include a plurality of antennas. The one antenna B1 receives the group of radio waves 20 from the plurality (N) of antennas. A received signal D302 by the antenna B1 enters the plurality of pseudo propagation channel characteristic analyzing/extracting device 307 (307A and 307B). For example, the plurality of pseudo propagation channel characteristic analyzing/extracting device 307 includes the pseudo propagation channel characteristic analyzing/extracting device 307A and the pseudo propagation channel characteristic analyzing/extracting device 307B as the two pseudo propagation channel characteristic analyzing/extracting devices. The pseudo propagation channel characteristic analyzing/extracting device 307A includes extracting circuits PC1, PC2, . . . , and PCI as a plurality (I) of pseudo propagation channel characteristic analyzing/extracting units (hereinafter, referred to also as the "extracting circuits") PC, which correspond to the number (I) of data in the first communication line, and the aggregator 312A. The pseudo propagation channel characteristic analyzing/extracting device 307B includes extracting circuits PD1, PD2, . . . , and PDJ as a plurality (J) of pseudo propagation channel characteristic analyzing/extracting units (hereinafter, referred to also as "extracting circuits") PD, which correspond to the number (J) of data in the second communication line, and the aggregator 312B. The numbers (I, J) of the extracting circuits PC and PD correspond to the numbers (I, J) of pseudo propagation channels (the corresponding models) of the data groups and the pseudo propagation channel characteristic devices 301 at the transmitting side.

A plurality (I) of pseudo delay profile models whose cross-correlation is low is set to the plurality (I) of extracting circuits PC of the pseudo propagation channel characteristic analyzing/extracting device 307A from the propagation channel characteristic managing unit 309A. The plurality (I) of pseudo delay profile models is a replica that is the same as the plurality (I) of pseudo propagation channel characteristics (and the corresponding models) used in the pseudo propagation channel characteristic device 301A at the transmitting side. Similarly, a plurality (J) of pseudo delay profile models whose cross-correlation is low is set to the plurality (J) of extracting circuits PD of the pseudo propagation channel characteristic analyzing/extracting device 307B from the propagation channel characteristic managing unit 309B. The plurality (J) of pseudo delay profile models is a replica that is the same as the plurality (J) of pseudo propagation channel characteristics (and the corresponding model) used in the pseudo propagation channel characteristic device 301B at the transmitting side. Even when viewed as the whole obtained by adding the pseudo propagation channel characteristic analyzing/extracting devices 307A and 307B, the plurality (I+J) of pseudo delay profile models is set so that cross-correlation becomes low. Note that the two propagation channel characteristic managing units 309A and 309B may be integrated into one.

Each of the extracting circuits of the pseudo propagation channel characteristic analyzing/extracting devices 307A and 307B executes a cross-correlation calculation between the received signal D302 and the corresponding pseudo delay profile model thereof. As a result, each of the extracting circuits extracts data characterized by the corresponding pseudo propagation channel. For example, the extracting circuit PC1 executes an analyzing and extracting process for the received signal D302 by using a first model of the plurality (I) of models, thereby extracting data EA1. Similarly, data EA2, . . . , and EAI are respectively extracted from the extracting circuits PC2, . . . , and PCI. A data group extracted from the plurality of extracting circuits PC (PC1 to PCI) of the pseudo propagation channel characteristic analyzing/extracting device 307A is referred to as a first received data group EA (EA1 to EAI). The first received data group EA is a data group that have the content corresponding to the first transmission data group DA (DA1 to the DAI). Similarly, a data group extracted from the plurality (J) of extracting circuits PD (PD1 to PDJ) of the pseudo propagation channel characteristic analyzing/extracting device 307B is referred to as a second received data group EB (EB1 to EBJ). The second received data group EB is a data group that have the content corresponding to the second transmission data group DB (DB1 to DBJ). The first received data group EA (EA1 to EAI) from the plurality (I) of extracting circuits PC of the pseudo propagation channel characteristic analyzing/extracting device 307A is aggregated into one received data D33 by the aggregator 312A to be connected and outputted to the communication path NW33. The second received data group EB (EB1 to EBJ) from the plurality (J) of extracting circuits PD of the pseudo propagation channel characteristic analyzing/extracting device 307B is aggregated into one received data D34 by the aggregator 312B to be connected and outputted to the communication path NW34.

For example, in a case where the third embodiment is used as the CU splitting, the communication paths can be used as follows. For example, the communication path NW31 and the communication path NW33 described above are used as a user data communication line. In the receiving station 2 that is a terminal, the communication path NW33 is terminated at a user plane receiving end, a user plane bearer for audio (dedicated bearer) and a user plane bearer for video that accompany an 8K high quality image providing service is connected to an 8K high quality image decoder, for example, to provide a user an 8K high quality image service. Further, the communication path NW32 and the communication path NW34 are used as control signal communication lines. In the receiving station 2, the communication path NW34 is terminated at a control plane receiving end of a bearer for control plane, for example, a default bearer and a control plane such as bandwidth guarantee (GBR: guaranteed bit rate) control, thereby executing a communication control for the terminal.

The propagation channel characteristic managing units 304 (304A and 304B) at the transmitting station 1 side obtain measurement information (that is, information on frequency characteristics or delay profiles) of the characteristics of the actual propagation channel P300, which is obtained by the plurality of propagation channels characteristic managing units 309 (309A and 309B) at the receiving station 2 side by means of the SRS signal, through the radio line 313. The radio line 313 is a communication line in which a signal is sent from the receiving station 2 (for example, user terminal) side to the transmitting station 1 (for example, the base station) through the actual propagation channel P300. However, the radio line 313 is illustrated in FIG. 11 as a communication path that is intentionally separated from the actual propagation channel P300 because communication of a downlink from the transmitting station 1 to the receiving station 2 is discussed for the purpose of explaining the features of the third embodiment.

The radio line 313 corresponds to the communication path for control between the propagation channel characteristic managing units 104 and 109, which has been described in the first embodiment (see FIG. 1), and is used for exchanging the measurement information on the actual characteristics described above, or exchanging which model is set for each of the pseudo propagation channel characteristic devices 301 and the pseudo propagation channel characteristic analyzing/extracting devices 307. In the third embodiment, the propagation channel characteristic managing unit 304 uses a model generated independently of the characteristics of the actual propagation channel P300 (measured values) for setting the pseudo propagation channels of the pseudo propagation channel characteristic devices 301 and the like.

The beam forming control circuit 302 specifies a position of the receiving station 2 in accordance with a pilot signal or the SRS signal from the receiving station 2. The beam forming control circuit 302 gives control information on amplitude and a phase to the plurality (N) of beam forming circuits (the circuits 3021 to 302N) on the basis of a control from the beam control unit 305 so that the main beam focuses on the receiving station 2.

The propagation channel characteristic managing units 304 (304A and 304B) stores a plurality of model (pseudo delay profile model) obtained by a method of generating pseudo propagation channel models (will be described later) in a DB as a storage. For example, the pseudo propagation channel characteristic device 301A refers to the models stored in the DB of the propagation channel characteristic managing unit 304A to respectively set the models to the pseudo propagation channels (PA1 to PAI). Note that the models in the DB of the propagation channel characteristic managing unit 304A and the models in the DB of the propagation channel characteristic managing unit 304B are managed so that the same model is not included in both of them and a plurality of models obtained by adding them does not have high cross-correlation.

As described above, in the pseudo propagation channel characteristic devices 301 (301A and 301B) of the transmitting station 1, by using the plurality (I, J) of models for the pseudo propagation channels whose cross-correlation is low, the outputs (OA and OB) of the pseudo propagation channels by which the respective data (the first transmission data group DA and the second transmission data group DB) are characterized are synthesized into the one output signal D301. This one output signal D301 coincides with an input condition for the beam forming function that is possible if it is one transmitted signal. The transmitting station 1 emits the group of radio waves 20 from the plurality (N) of transmitting antennas on the basis of the output signal D301 after the propagation characteristics are controlled so as to focus on the desired reception point by the beam forming function, and causes the group of radio waves 20 to reach the antenna B1 of the receiving station 2, which is targeted as the reception point. In the pseudo propagation channel characteristic analyzing/extracting devices 307 at the receiving station 2 side, even with respect to such one output signal D301, it is possible to separate and extract each data of the plurality (I, J) of data by using the plurality (I, J) of models for the pseudo propagation channels that are the same as those at the transmitting side.

Note that in a case where the receiving station 2 is configured so as to have a reception diversity effect by causing the receiving antenna unit 306 of the receiving station 2 to include two or more antennas, it is possible to further improve reliability of the communication easily.

Usage Example

Figure 12:
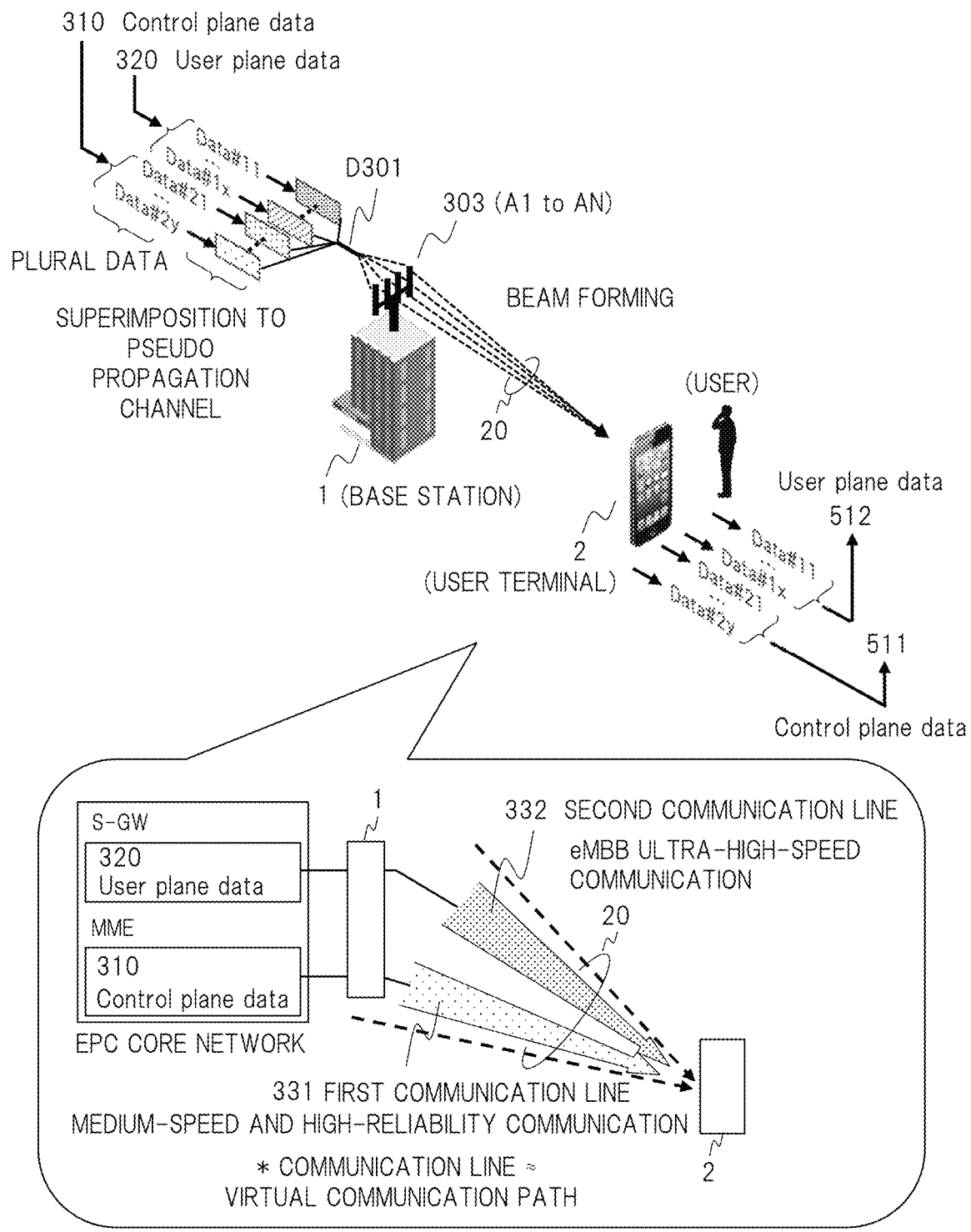
FIG. 12 is a view illustrating a usage example according to the third embodiment.

A concrete usage example and effects thereof using the transmission/reception method and the system thereof according to the third embodiment will be described with reference to FIG. 12. FIG. 12 illustrates implementation of the CU splitting as a usage example of the beam forming function in the transmission/reception method and the system thereof according to the third embodiment. CU splitting by beam forming is illustrated in an upper side of FIG. 12, and a communication line state is illustrated in a lower side thereof as an image of the concept. In FIG. 12, the transmitting station 1 is a base station, and the receiving station 2 is a user terminal. At the transmitting station 1 side, in the mechanism described above, a plurality of data (for example, x pieces of data Data #11 to Data #1x, and y piece of data Data #21 to Data #2Y) respectively characterized by a plurality (x+y) of pseudo propagation channels is superimposed and synthesized into one output signal D301, and a group of radio waves 20 by beam forming is transmitted from the plurality of the antennas A1 to AN of the transmitting antenna unit 303. Note that the number (I, J) of data in the first transmission data group DA and the second transmission data group DB illustrated in FIG. 11 described above is not limited to multiple, and can be set to one. For example, control plane data 310 may be one piece. Depending upon the use application, for example, it is supposed that the number (x) of parallel data of user plane data 320 becomes larger than the number (y) of parallel data of the control plane data 310.

In the present embodiment, there are the first communication line and the second communication line as a plurality of communication lines to be superimposed by beam forming (in other words, virtual communication paths). The first communication line is used for transmission of the control plane data (Control plane data) 310 that requires communication with medium speed and high reliability, and the second communication line is used for transmission of the user plane data (User plane data) 320 that requires communication with ultra-high speed. Namely, it is possible to realize the CU splitting by using the plurality of pseudo propagation channels at the time of the beam forming. When a beam at a certain time is viewed, the control plane data of the first communication line and the user plane data of the second communication line are superimposed onto the beam. Depending upon a transmission status, only one of the control plane data and the user plane data may be contained at each time point.

FIG. 12 illustrates a service state of an eMBB (enhanced Mobile Broadband) in which the user terminal (that is, the receiving station 2) requires communication with ultra-high speed of the order of Gbps as an example. For the eMBB, control signals (the control plane data) scattered in an OFDM frame may greatly hinder pursuit of ultra-high speed. On the other hand, the control signals require communication with high reliability while maintaining medium speed. For that purpose, high multi-level modulation, that is, 16-QAM, 64-QAM, or the like is used in the eMBB, and highly reliable modulation, that is, QPSK is used for the control signals.

Transmission speeds and signal error rates of the eMBB (the user plane data) and the control signals (the control plane data) are contradictory, and mixing of them in the same frame is not desirable for the both. Further, paths thereof are different from each other due to a network structure. The user plane data are connected by a switching network, that is, a network from an S-GW (Serving gateway) of a core network, while the control signals are connected by a network from MME (Mobile Management Entity). Therefore, it is desirable to separate them on radio lines as well in fifth generation. In case of MIMO in which there are a large number of propagation channels, it is possible to provide different communication frames by allocating communication propagation channels, and this makes it possible to realize an optimum communication form for each of them. On the other hand, in case of a conventional beam forming function, there is a condition that the same one signal is to be inputted. Therefore, it is impossible to mix or superimpose different types of communication frames on the same beam.

On the other hand, in the third embodiment, as illustrated in FIG. 12, it is clear that a state of a plurality of communication lines in which different types of communication frames including the control plane data 310 and the user plane data 320 are mixed and superimposed on the same beam can be provided even at the time of the beam forming operation, for example.

In the third embodiment, it is possible to provide the state of the plurality of lines similar to that at the time of the MIMO operation even during the beam forming, and this makes it possible to realize a network operation based on the CU splitting as illustrated in FIG. 12, for example. In the lower side of FIG. 12, a concept image of a case where in one beam forming (the group of radio waves 20), communication with medium speed and high reliability is executed by characterizing the control plane data 310 from MME of an EPC core network by a first communication line 331, and communication with ultra-high-speed of the eMBB is executed by characterizing the user plane data 320 from the S-GW by a second communication line 332 is illustrated. Note that the EPC (evolved Packet Core) is a fourth-generation innovative core network focusing on IP (Internet Protocol). The MME is a network for managing a location and movement of the user terminal. The S-GW is a network that handles voice and data of the user.

Further, provision of the state of the plurality of communication lines at the time of the beam forming according to the third embodiment can not only address the CU splitting, but also address the following examples of various use applications and applications. Namely, as the other examples of the use application, provision of different types of bearers, network slicing, SRS signal separation, ETWS separation, parallel transmission of control/management signals at the time of microwave power transmission, separation of automatic operation control signals, and the like can be cited.

In the provision of different types of bearers, a plurality of different types of bearers (virtual propagation channels) can be provided. In the network slicing, a plurality of different types of slices in a front hall of a network can be provided. In the SRS signal separation, an SRS signal and the like can be arranged so as to be separated into specific pseudo propagation channels. In the ETWS separation, normal communication can be maintained at the time of emergency communication, that is, at the time of activation of an ETWS (Earthquake & Tsunami Warning System).

[Method of Generating Pseudo Delay Profile Model]

Figure 13:
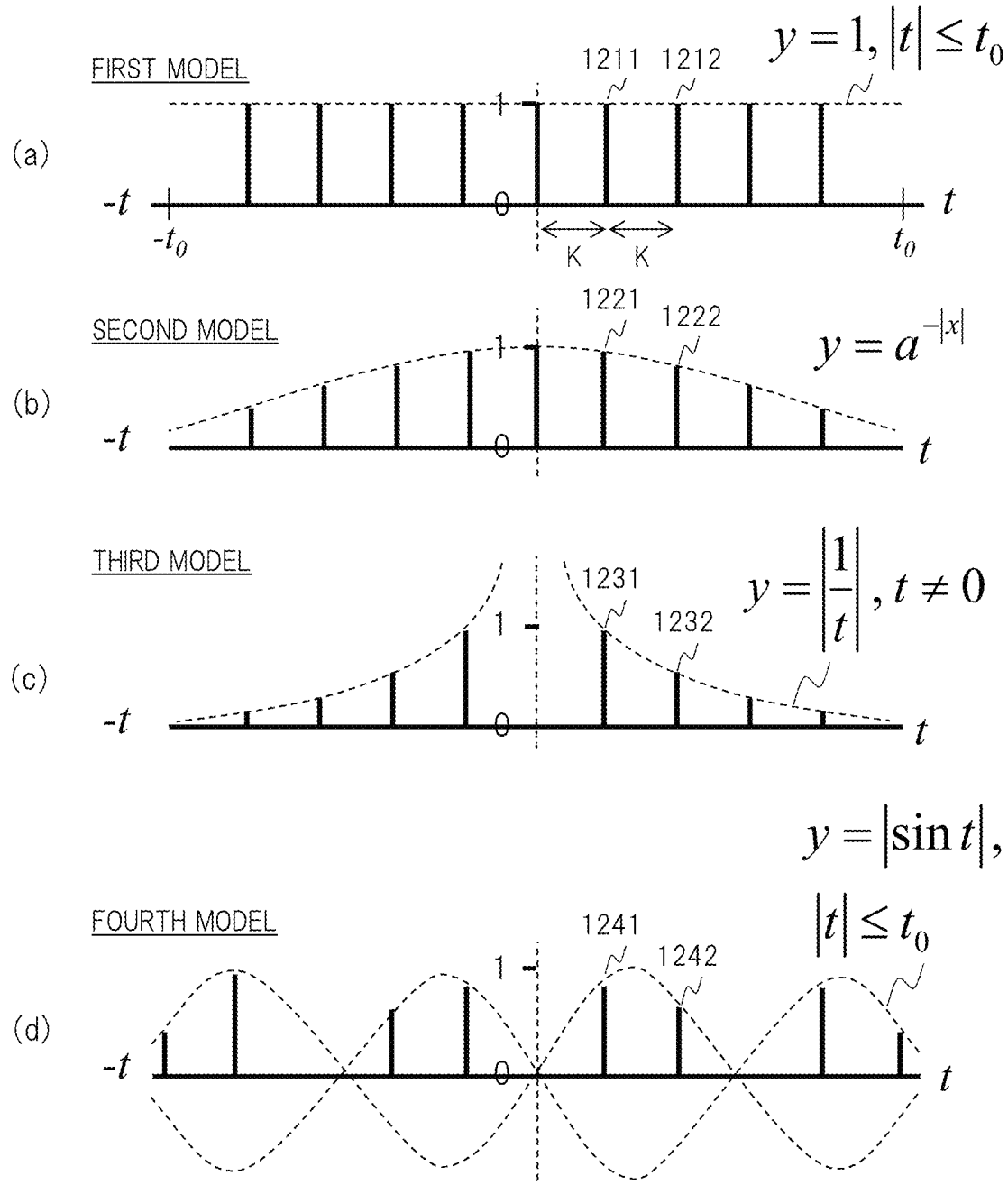
FIG. 13 is a view illustrating part 1 of a method of generating a plurality of pseudo delay profile models according to the third embodiment.

FIG. 13 illustrates a method of generating a plurality of pseudo delay profile models (and corresponding pseudo propagation channel characteristics) according to the third embodiment. In the third embodiment and the fourth embodiment (will be described later), the transmitting station 1 or the receiving station 2 generates characteristics of a plurality of pseudo propagation channels independently of characteristics of actual propagation channels between a plurality of transmitting antennas and one or more receiving antennas on the basis of delay profile models set in advance. (a), (b), (c), and (d) of FIG. 13 respectively illustrate four models whose cross-correlation is low, which are referred to as a first model to a fourth model for the sake of explanation. A horizontal axis thereof denotes a time (t) having positive and negative values, and a vertical axis thereof denotes amplitude.

A function illustrated in FIG. 13 is an example of an envelope used for generation of pseudo delay profiles according to the third embodiment. In each case, the amplitude is based on one, and portions indicated by solid lines constitute delay waves. The functions that follow this principle are functions each of which is axisymmetric to an arbitrary origin, and are a plurality of functions that are orthogonal to each other, that is, independent functions. The plurality of functions can be used as a plurality of pseudo propagation channel characteristics (and corresponding models). This is because the beam forming function causes propagation channel characteristics in an actual propagation space to be unambiguously in a nearly perfect conductor state, whereby constraints imposed on the pseudo delay profiles are almost nothing.

The first model of (a) illustrates a group of delay waves each of which has constant amplitude in a range up to time to. An envelope thereof is y=1, and amplitude of each of delay waves 1211, 1212, and the like is constant 1. The second model of (b) illustrates a group of delay waves in which an inverse number of an exponential function is an envelope ($y=a^{-|x|}$).

Amplitudes of delay waves 1221, 1222, and the like are decreasing in each of positive and negative directions. The third model of (c) illustrates a group of delay waves in which absolute values of hyperbola excluding the origin is an envelope (y=|1/t|). The fourth model of (d) illustrates a group of delay waves in which absolute values of a sinusoidal wave are an envelope (y=|sin t|).

In the example illustrated in FIG. 13, a time interval K of the group of delay waves is fixed, but in a frequency characteristic in this case, the time interval K becomes a sampling time, and electric power is concentrated in a specific frequency range. In a case where a frequency bandwidth is wide, it is necessary to arrange the group of delay waves at uneven intervals.

Figure 14:
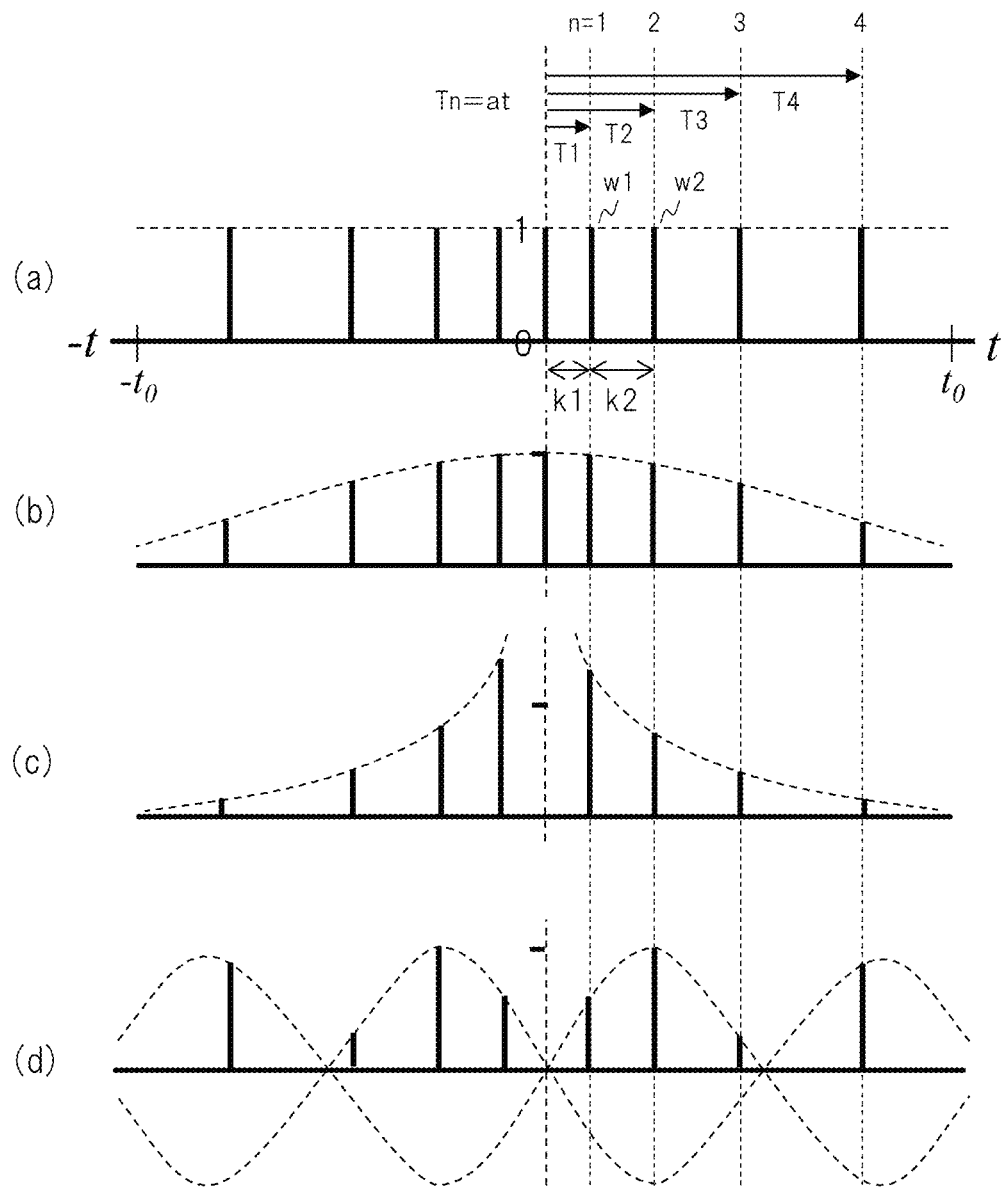
FIG. 14 is a view illustrating part 2 of the method of generating a plurality of pseudo delay profile models according to the third embodiment.

Similarly, FIG. 14 illustrates a case where time intervals of delay waves are made uneven by extending the time intervals in proportion to a time t with respect to FIG. 13. Functions of respective models are the same as those in FIG. 13. With t=0 as a reference, a delay time of each delay wave is indicated by "T=at" (a is a coefficient). For example, a delay time of a delay wave w1 is T1, and a delay time of a delay wave w2 is T2. A time interval from the reference to the delay wave w1 is k1, and a time interval from the delay wave w1 to the delay wave w2 is k2 (k1<k2).

Figure 15:
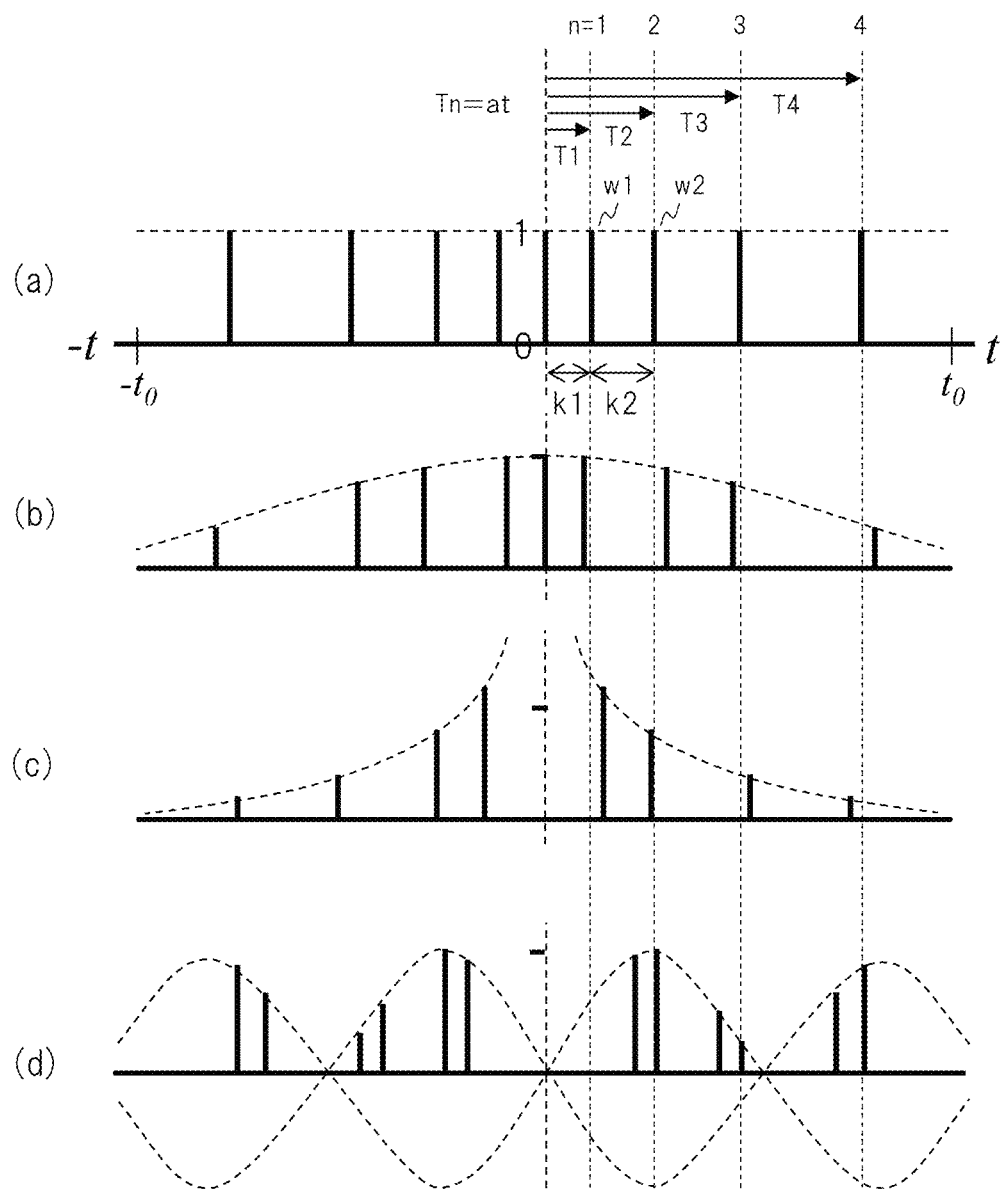
FIG. 15 is a view illustrating part 3 of the method of generating a plurality of pseudo delay profile models according to the third embodiment.

Moreover, FIG. 15 similarly illustrates a case where positions of delay waves are not aligned with each other on a time axis. (a) of FIG. 15 is the same as (a) of FIG. 14. (b), (c), and (d) of FIG. 15 are respectively different from (b), (c), and (d) of FIG. 14 in positions of delay waves on a time axis.

The cross-correlation of the example of the group of models illustrated in FIG. 14 is lower than that in case of the group of models illustrated in FIG. 13. Moreover, the cross-correlation of the example of FIG. 15 can be lowered dramatically with respect to the example of FIG. 14. However, since an upper limit of a frequency band is dominated by a portion having the shortest time interval, a limit is provided.

Each of the propagation channel characteristic managing units 304 illustrated in FIG. 11 confirms the cross-correlation between any two models of the plurality of pseudo delay profile models, and subjects each of the models to Fourier transform to confirm that it can be accommodated within a predetermined frequency bandwidth. In case of a model that does not satisfy such a predetermined condition, the corresponding propagation channel characteristic managing unit 304 discards the model, and replaces it with a model modified so as to satisfy the predetermined condition.

By the operations described above, it is possible to generate a plurality of pseudo delay profile models whose cross-correlation is low. As a result, the type and the number of the plurality of pseudo delay profile models, which are required by the respective pseudo propagation channels of the pseudo propagation channel characteristic devices 301 and the pseudo propagation channel characteristic analyzing/extracting devices 307 illustrated in FIG. 11 can be satisfied easily. However, the number is not infinite, and has an upper limit.

[Upper Limit of Number of Pseudo Delay Profile Models]

The upper limit of the number of pseudo delay profile models will be described. The upper limit of the number of pseudo delay profile models is determined by a condition that a time length of each pseudo delay profile sufficiently falls within a time interval of OFDM, that is, a Cyclic Prefix (CP). On the other hand, the minimum delay wave interval time for setting the delay waves is determined by time resolution of FFT.

Figure 16:
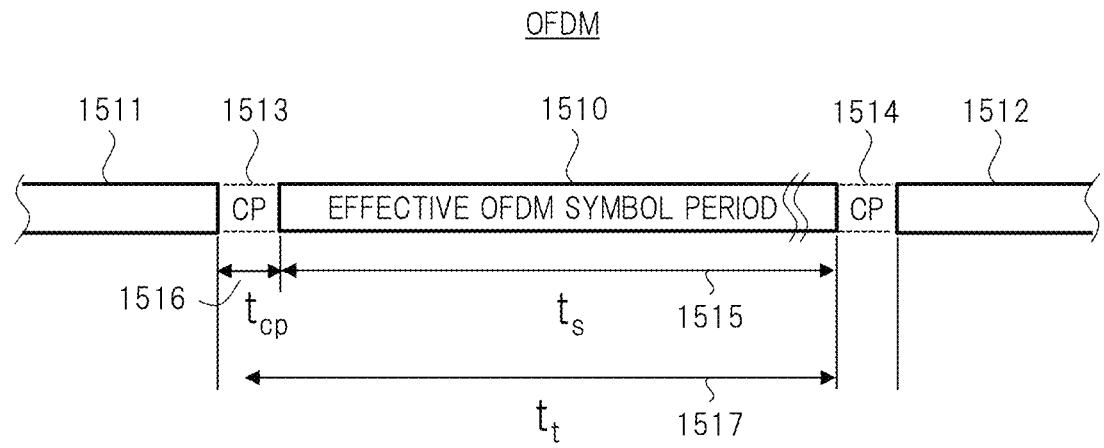
FIG. 16 is a view illustrating a frame of OFDM and a configuration of a CP according to the third embodiment.

FIG. 16 illustrates a frame structure of the OFDM in the fourth-generation mobile communication, which is the basis of the fifth-generation mobile communication, and particularly illustrates CP (in other words, a guard interval) for accommodating the delay waves. The frame structure of FIG. 16 corresponds to a frame in case of an FDD method under LTE standards. In FIG. 16, a frame 1510 is an OFDMA frame. A frame 1511 is an OFDMA frame antecedent to the frame 1510, and a frame 1512 is an OFDMA frame subsequent to the frame 1510. A CP 1513 is a CP interval for accommodating a delay wave between the antecedent frame 1511 and the frame 1510, and a CP 1514 is a CP interval for accommodating a delay wave between the frame 1510 and the subsequent frame 1512. A cycle ($t_r$) 1517 is an OFDMA frame repetition period, and is composed of a CP period ($t_{cp}$) 1516 and a frame period ($t_s$) 1515.

As described above, the CPs 1513 and 1514 are considered so that a group of delay waves arriving late with respect to a main wave can be collectively FFT integrated. In case of the LTE standards, OFDM parameters at a 5 MHz size are values shown in Table 1. A transmission bandwidth is 5 MHz, an occupied frequency bandwidth is 3.84 MHz, a subframe time interval is 0.5 ms, a subcarrier frequency interval is 15 kHz, sampling frequency is 15.36 MHz, and an FFT size is 512. Frequency resolution as an OFDMA system is composed of 3.84 MHz of the occupied frequency bandwidth and 512 of the FFT size for resolving this, that is, 15 kHz. 0.1302 µs obtained by converting this into a time domain "1/15 kHz÷512" is time resolution. In a case where the CP interval is 4.69 µs, the number of points on the time axis, which can be recognized by the time resolution, becomes 36. Note that 4 times oversampling is executed in order to measure a phase, and the number of points (described as the number of sample points in the standard specification) is thus set to 144. However, from the viewpoint of frequency measurement, the number of subcarriers of 15 kHz does not exceed 36 points. In a case where the number of waves of the delay profile of the pseudo propagation channel model required by the present invention is 6, for example, the number of combinations in which from these 36 points on the time axis, a first point is fixed and remaining 5 points are selected from 35 points, for example, becomes the number of pseudo propagation channel models. As a result, the number of pseudo propagation channel models is 38,955,840 obtained by a formula "$n=_{35}P_5=35\times 34\times 33\times 32\times 31$" in accordance with a method of calculating a permutation. Even though the models having partially the same sequence and the models having high partial correlation are deleted from this and the number of available models is reduced to 1/100, it is possible to obtain about 400,000 models. Moreover, by setting the number of waves to something other than 6, it becomes possible to further increase the number of models. From the above, according to the present method, it is clear that a sufficient large number of pseudo propagation channel models can be secured.

Further, as this method, the method of generating the models in the time domain has been described. However, by arbitrarily providing 256 points obtained by setting the number of subcarriers to be arranged on the frequency based on the number of subcarriers in the frequency domain to ½ of 512 points, for example, it is possible to set them to frequency domain models. It may be set to ⅓ or ¼ instead of ½. However, pseudo frequency selective fading is generated, and transmission efficiency is thus decreased. In this case, it also becomes "$n=_{512}P_{256}$" by a permutation, whereby it is possible to obtain the considerable number of models. However, in this case, they are converted into ones in the time domain, and ones in which a time length of a delay profile falls within the CP and cross-correlation among models is low are to be selected for practical use.

By using positional information on a plurality of points as described above, a certain pseudo delay profile model can be represented. When pseudo propagation channel characteristic information is exchanged between the transmitting station 1 and the receiving station 2, a method of describing it in CSI (channel state information: propagation channel state information) or a method of newly providing an index for this purpose and announcing it beforehand may be used. For example, the transmitting station 1 can expand the CSI to describe pseudo propagation channel characteristic information (that is, information representing the corresponding model) used for data to be transmitted (and corresponding frames) in the CSI and notify the receiving station 2 of it. The receiving station 2 refers to the pseudo propagation channel characteristic information in the CSI described above from a received signal, whereby it is possible to grasp a model to be used in analysis.

[Effects and the Like (3)]

As described above, in the third embodiment, even in a case where the MIMO function cannot be exhibited for the operation of the beam forming function, it is possible to convey a plurality of data almost simultaneously by using the pseudo propagation channel characteristics to increase the transmission speed. According to the third embodiment, it is possible to provide means for multiplying information transmission using the pseudo propagation channel characteristics in the baseband unit at the transmitting station, that is, it is possible to realize a pseudo MIMO function during the beam forming. As a result, even when the MIMO system implements the beam forming function, it is useful to increase the transmission speed against the decrease of the transmission speed due to unification of transmission information for the beam forming. Further, according to the third embodiment, as described above, it is possible to mix plural kings of data with the beam and transmit them, and various applications such as the CU splitting can be realized.

Fourth Embodiment

A transmission/reception method and a system thereof according to a fourth embodiment of the present invention will be described with reference to FIG. 17 and FIG. 18. The fourth embodiment can be said to be a modification example of the third embodiment. In the fourth embodiment, a case where the present invention is applied to beam forming from one transmitting station to a plurality of receiving station will be described.

[Outline]

It is said that a multiantenna system, which is the main role of fifth-generation mobile communication, uses an mMIMO (Massive MIMO) function for users positioned at a short distance, and uses a beam forming function for users positioned at a long distance. This is said to have a role of compensating for a decrease in received electric power at an end of a cell (wireless communication area) in increasing frequency used for speed up of communication. However, even though an emission angle of radio waves for the beam forming is narrowed, the area of a focus area formed by a beam surely increases as a distance in a radial direction thereof increases.

A size of the focus area in the beam forming will be described. A wavelength of a radio wave is λ, an interval d of antenna elements is λ/2, and the number of antennas is n. Directivity (an electric field) D(θ) of a beam of an array antenna when the array antenna is fed with the same phase and the same amplitude is generally given by the following formula F.

$$D(\theta) = \frac{\sin\left(\frac{n\pi d}{\lambda}\cos\theta\right)}{n\sin\left(\frac{\pi d}{\lambda}\cos\theta\right)}$$ Formula F A half-value width of the emission angle at which received electric power when the number of antennas is 16 becomes 50% of the maximum value is 6.45° regardless of the frequency. An arc length corresponding to the half-value width when distance 1 is 100 m becomes 11.36 m, and on a horizontal plane, an elliptical area with a minor diameter of about 11 m becomes a focus area. However, in a beam forming antenna, since a phase, a delay time, and amplitude are controlled for each antenna element, the focus becomes sharper.

Therefore, the half-value width becomes narrower. However, since there is a trade-off with suppression of side lobe, it is considered that numeral values of the array antenna are used here. Then, in a case where it is considered that a major diameter of the focus area becomes twice or more depending upon a difference of antenna heights, the elliptical area becomes about 150 m². Since the target of terminal capacity for the fifth generation is one unit per m², at least 150 terminals are accommodated in this focus area.

Currently, it is one user per one beam, but according to the method of the present invention, a plurality of users existing in the same focus can use their mobile phones by allocating a different pseudo propagation channel characteristic to each user. Further, the network can be divided, and this makes it possible for an operator and an MVNO to provide communication to each of user terminals in the same beam.

The transmission/reception method according to the fourth embodiment is a transmission/reception method of transmitting and receiving data between a transmission device with a plurality (N) of transmitting antennas and each of a plurality of reception devices with one or more receiving antennas. Here, the transmission device has a beam forming transmission function that includes the plurality (N) of transmitting antennas, a beam forming transmission circuit, and a beam control unit. The reception device has a beam forming reception function that includes the one or more receiving antenna and a beam forming reception circuit. This transmission/reception method includes a generating step, a creating step, a transmitting step, a receiving step, and an extracting step. The generating step is a step of generating, by the transmission device or one of the plurality of reception devices, characteristics of a plurality of pseudo propagation channels between the plurality (N) of transmitting antennas and the receiving antennas in a case where the plurality of reception devices is included in a focus area of a beam from the transmission device. The creating step is a step of creating one piece of data to be transmitted by the transmission device, the one piece of data being obtained by synthesizing a plurality (for example, K+L) of parallel and independent data from a plurality of outputs, the plurality of parallel and independent data being transmission targets for the plurality (for example, two) of reception devices, the plurality of parallel and independent data at least containing a first data group (for example, K pieces of data) and a second data group (for example, L pieces of data) as a plurality of data groups whose types are different from each other, the plurality of outputs being respectively obtained by characterizing the plurality of parallel and independent data by the characteristics of the plurality (K+L) of pseudo propagation channels. The transmitting step is a step of transmitting, by the transmission device, a group of radio waves constituting a beam from the plurality (N) of transmitting antennas whose propagation characteristics are controlled by the beam forming transmission function on a basis of the one piece of data to be transmitted. The receiving step is a step of receiving, by the reception device (for example, a first reception device), a signal from the group of radio waves arriving in a state of the beam by the beam forming reception function including the one or more receiving antennas. The extracting step is a step of extracting, by the reception device (the first reception device), a plurality of data corresponding to a data group (for example, the first data group) for an own reception device as a destination from the received signal on a basis of analysis of characteristics of a plurality (for example, k) of pseudo propagation channels regarding the own reception device of the characteristics of the plurality (K+L) of pseudo propagation channels. The data group for the own reception device is characterized by the characteristics of the plurality (K) of pseudo propagation channels regarding the own reception device.

[Transmission/Reception Method and System Thereof]

Figure 17:
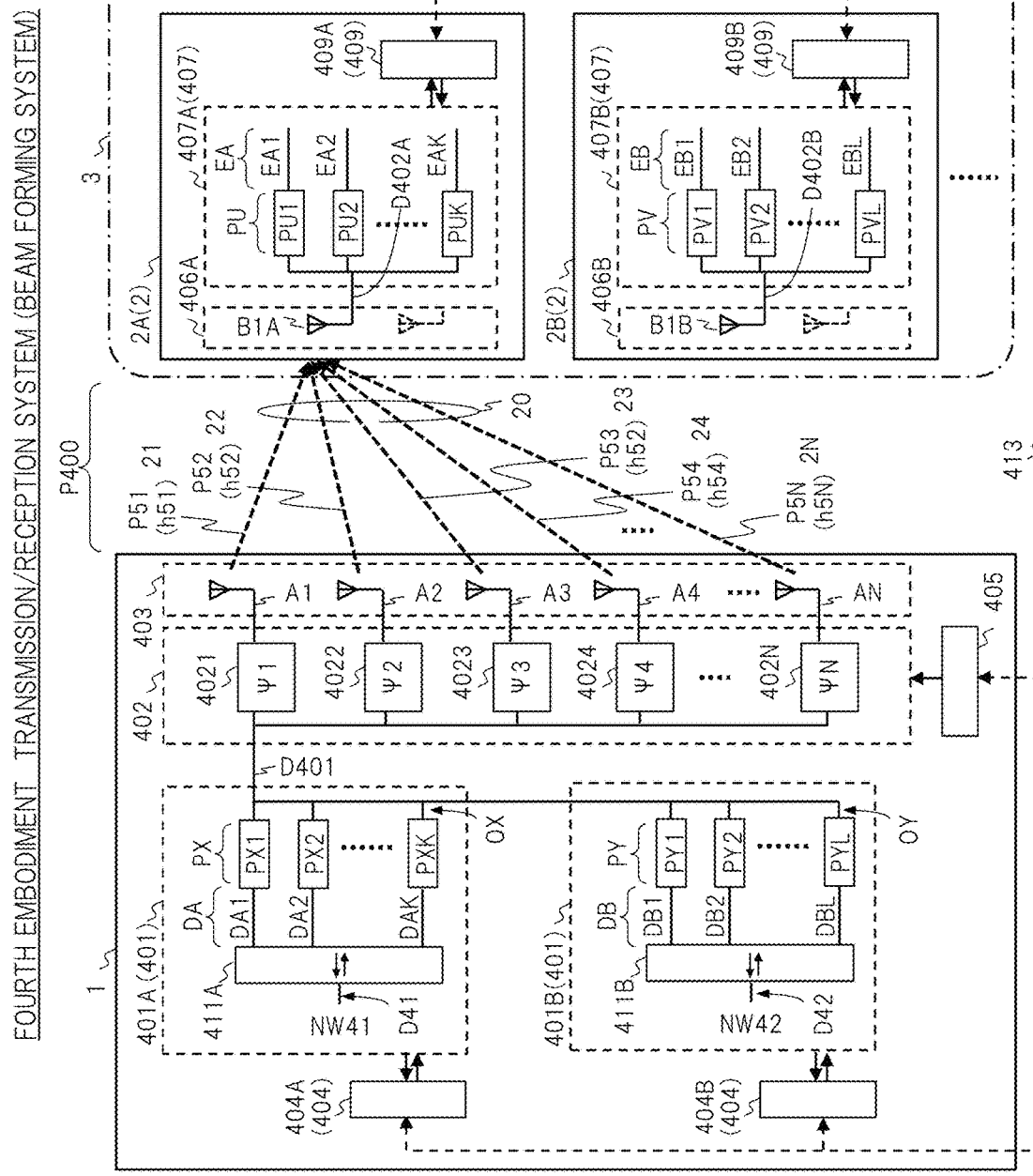
FIG. 17 is a view illustrating a configuration example of a beam forming system as a transmission/reception method and a system thereof according to a fourth embodiment of the present invention.
Figure 18:
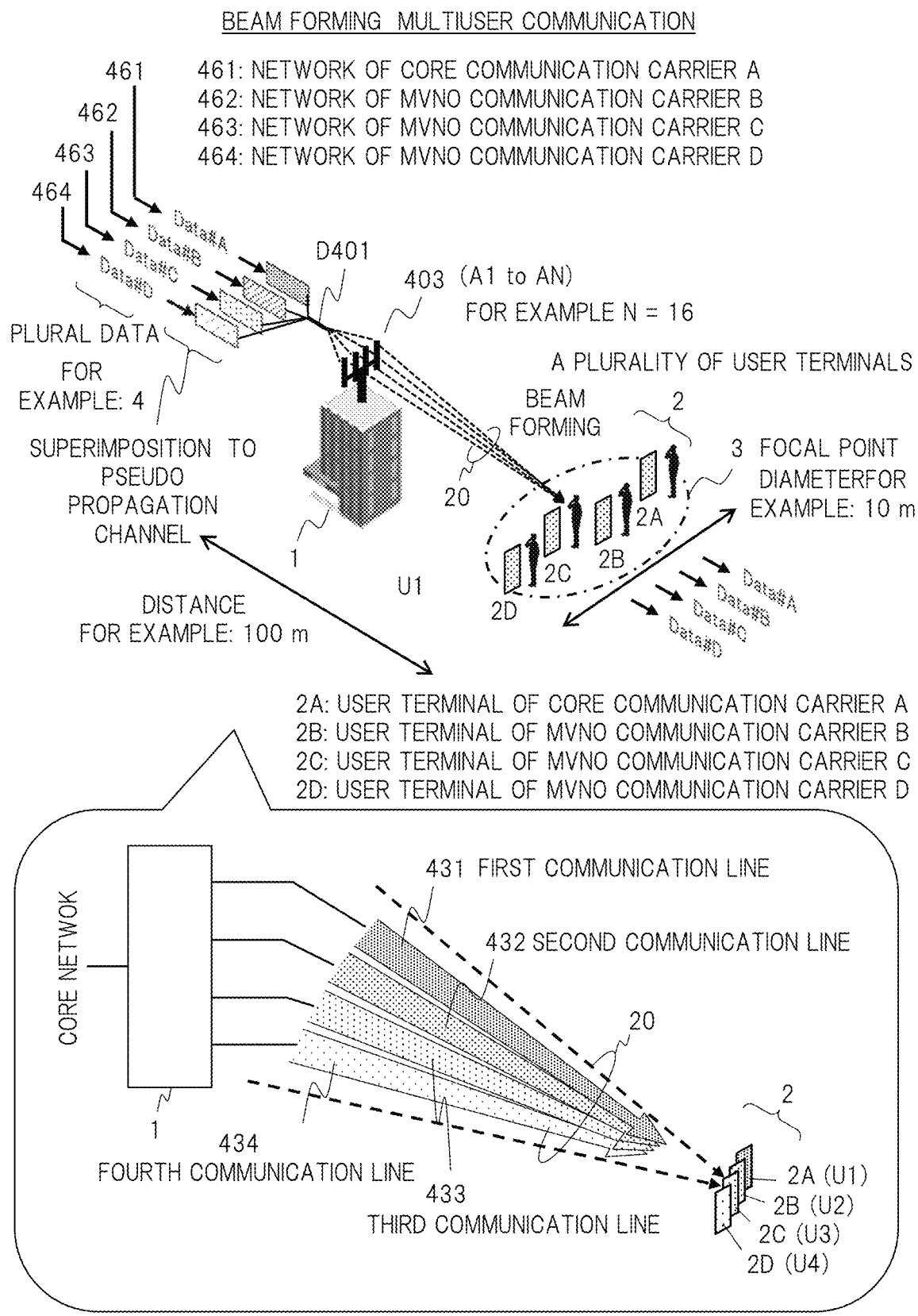
FIG. 18 is a view illustrating a usage example according to the fourth embodiment.

FIG. 17 illustrates a configuration of a beam forming system as a transmission/reception method and a system thereof according to the fourth embodiment. In this configuration, as portions different from those in the configuration of the third embodiment (FIG. 11), there are a configuration in which a plurality of receiving stations 2 (user terminals) exists within a focus of a beam (or a focus area) 3, and a configuration in which there is a degree of freedom to cause a communication path NW41 and a communication path NW42 at a transmitting station 1 to function independently. For example, the transmitting station 1 is a transmission device such as a wireless base station, and receiving stations 2A and 2B are reception devices such as user terminals. For example, the receiving station 2A is referred to as a first user terminal, and the receiving station 2B is referred to as a second user terminal. The group of reception devices exist in the focus (or the focus area) 3 by beam forming together.

The transmitting station 1 includes a plurality of pseudo propagation channel characteristics devices 401, a beam forming control circuit 402, a transmitting antenna unit 403, one or more propagation channel characteristic managing units 404, a beam control unit 405, and the like in a baseband unit. The plurality of pseudo propagation channel characteristics devices 401 has a pseudo propagation channel characteristic device 401A and a pseudo propagation channel characteristic device 401B as two pseudo propagation channel characteristic devices, for example. The propagation channel characteristic managing units 404 include a propagation channel characteristic managing unit 404A and a propagation channel characteristic managing unit 404B as two propagation channel characteristic managing units, for example. The pseudo propagation channel characteristic device 401A is a first characteristic device, and includes a network terminator 411A configured to supply a plurality (K) of parallel and independent data DA1, DA2, . . . , and DAK, which are a first transmission data group DA as a transmission target, and a plurality (K) of pseudo propagation channels PX1, PX2, . . . , and PXK corresponding to the number of data. The pseudo propagation channel characteristic device 401B is a second characteristic device, and includes a network terminator 411B configured to supply a plurality (L) of parallel and independent data DB1, DB2, . . . , and DBL, which are a first transmission data group DB as a transmission target, and a plurality (L) of pseudo propagation channels PY1, PY2, . . . , and PYL corresponding to the number of data. The network terminator 411A of the pseudo propagation channel characteristic device 401A has the communication path NW41 as an input/output, and the network terminator 411B of the pseudo propagation channel characteristic device 401B has the communication path NW42 as an input/output. Note that data can be outputted from the network terminator 411A to the communication path NW41. Note that the numbers K and L according to the fourth embodiment are different concepts from the numbers I and J according to the third embodiment.

The receiving station 2A includes a receiving antenna unit 406A including one or more receiving antennas, and one or more pseudo propagation channel characteristic analyzing/extracting devices 407A in a baseband unit. Further, the receiving station 2A also includes a propagation channel characteristic managing unit 409A. The receiving station 2B includes a receiving antenna unit 406B including one or more receiving antennas, and one or more pseudo propagation channel characteristic analyzing/extracting devices 407B in a baseband unit. Further, the receiving station 2B also includes a propagation channel characteristic managing unit 409B. The receiving antenna unit 406A includes a receiving antenna B1A, for example. The receiving antenna unit 406B includes a receiving antenna B1B, for example. The pseudo propagation channel characteristic analyzing/ extracting device 407A is a first extracting device, and includes extracting circuits PU1, PU2, . . . , and PUK as a plurality (K) of pseudo propagation channel characteristic analyzing/extracting units (extracting circuits) PU corresponding to the first characteristic device at the transmitting side. The pseudo propagation channel characteristic analyzing/extracting devices 407B is a second extracting device, and includes extracting circuits PV1, PV2, . . . , and PVL as a plurality (L) of pseudo propagation channel characteristic analyzing/extracting units (extracting circuits) PV corresponding to the second characteristic device at the transmitting side.

In FIG. 17, at the transmitting station 1 side, data to be transmitted are respectively supplied from the communication path NW41 and the communication path NW42 to the network terminator 411A of the pseudo propagation channel characteristic device 401A and the network terminator 411B of the pseudo propagation channel characteristic device 401B. The network terminator 411A obtains the plurality (K) of parallel and independent data DA1 to DAK from data D41 inputted from the communication path NW41 as the first transmission data group DA. The network terminator 411B obtains the plurality (L) of parallel and independent data DB1 to DBL from data D42 inputted from the communication path NW42 as the second transmission data group DB.

A plurality of pseudo delay profile models whose cross-correlation is low is set from the propagation channel characteristic managing unit 404A to the plurality (K) of pseudo propagation channels PX (PX1 to PXK) of the pseudo propagation channel characteristic device 401A as individual models. Similarly, a plurality of pseudo delay profile models whose cross-correlation is low is set from the propagation channel characteristic managing unit 404B to the plurality (L) of pseudo propagation channels PY (PY1 to PYL) of the pseudo propagation channel characteristic device 401B as individual models. Even in the whole of the pseudo propagation channels PX and the pseudo propagation channels PY, a plurality of models whose cross-correlation is sufficiently low is set as characteristics of a plurality of pseudo propagation channels.

The first transmission data group DA in the pseudo propagation channel characteristic device 401A is respectively characterized by transfer functions had by the plurality (K) of pseudo propagation channels PX (PX1 to PXK) corresponding to the number of data, whereby the first transmission data group DA becomes outputs (output signals) OX. For example, the pseudo propagation channel PX1 causes a first model to act the data DA1.

Similarly, the second transmission data group DB in the pseudo propagation channel characteristic device 401B is respectively characterized by transfer functions had by the plurality (L) of pseudo propagation channels PY (PY1 to PYL) corresponding to the number of data, whereby the second transmission data group DB becomes outputs (output signals) OY. The pseudo propagation channel characteristic devices 401 (401A and 401B) synthesize the plurality (K, L) of outputs OX and OY into one output (output signal) D401. The one output signal D401 is supplied to the beam forming control circuit 402.

As well as the third embodiment, the beam forming control circuit 402 causes circuits 4021, 4022, . . . , and 402N, which are beam forming circuits, to execute controls such as amplitude phase adjustment (processes of functions $\Psi 1$ to $\Psi N$) for the one output signal D401 on the basis of a control from the beam control unit 405 so as to correspond to respective antenna elements (A1 to AN) of the transmitting antenna unit 403, and supplies respective signals after control to the antenna elements (A1 to AN).

The transmitting antenna unit 403 has a similar configuration to that according to the third embodiment. The transmitting station 1 transmits a group of radio waves 20 constituting beams from the transmitting antenna unit 403 on the basis of the one output signal D401 by a beam forming transmission function including the transmitting antenna unit 403 as a result of a beam forming control. A main beam of the group of radio waves 20 forms the focus (or the focus area) 3 corresponding to a reception point at the receiving side. The main beam reaches an antenna B1A of the receiving antenna unit 406A in the receiving station 2A located in the focus 3 and an antenna B1B of the receiving antenna unit 406B in the receiving station 2B located in the focus 3, and focuses thereon. Note that in FIG. 17, a state where the group of radio waves 20 focuses on the antenna B1A in the receiving station 2A as the focus 3 is particularly illustrated, but the antenna B1B in the receiving station 2B is included in the focus 3 at the same time. In the present embodiment, the two user terminals (2A, 2B) exist in a spatial area corresponding to the focus 3. However, the present invention is not limited to this, three or more user terminals may exist therein.

The receiving antenna unit 406 of each of the receiving stations 2 has the similar configuration to that according to the third embodiment. The receiving station 2A receives a signal D402A from the group of radio waves 20 by the beam forming reception function including the receiving antenna unit 406A. The receiving station 2B receives a signal D402B from the same the group of radio waves 20 by the beam forming reception function including the receiving antenna unit 406B. The signal D402A from the antenna B1A is inputted into the extracting circuits PU (PU1 to PUK) as the plurality (K) of pseudo propagation channel characteristic analyzing/extracting units of the pseudo propagation channel characteristic analyzing/extracting device 407A.

The signal D402B from the antenna B1B is inputted into the extracting circuits PV (PV1 to PVL) as the plurality (L) of pseudo propagation channel characteristic analyzing/ extracting units of the pseudo propagation channel characteristic analyzing/extracting devices 407B. The number (K and L) of extracting circuits at the receiving side corresponds to the number of data and the number of pseudo propagation channels at the transmitting side. The number K and the number L may be the same as each other, or may be different from each other.

A plurality (K) of pseudo delay profile models, which are the same replicas as the characteristics of the plurality (K) of pseudo propagation channels used by the pseudo propagation channel characteristic device 401A at the transmitting side, is set from the propagation channel characteristic managing unit 409A to the plurality of extracting circuits PU of the pseudo propagation channel characteristic analyzing/ extracting device 407A. A plurality (L) of pseudo delay profile models, which are the same replicas as the characteristics of the plurality (L) of pseudo propagation channels used by the pseudo propagation channel characteristic device 401B at the transmitting side, is set from the propagation channel characteristic managing unit 409B to the plurality of extracting circuits PV of the pseudo propagation channel characteristic analyzing/extracting devices 407B.

Each of the extracting circuits PU (PU1 to PUK) of the pseudo propagation channel characteristic analyzing/extracting device 407A executes a cross-correlation calculation between the received signal D402A and the corresponding one of the plurality (K) of pseudo delay profile models, thereby extracting the data characterized by the pseudo propagation channel characteristic. For example, the extracting circuit PU1 extracts the data EA1 from the received signal D402A by analysis using the first model. As a result, the extracting circuits PU respectively obtain a first received data group EA (data EA1, EA2, . . . , and EAK) that have the content corresponding to the first transmission data group DA. Similarly, each of the extracting circuits PV (PV1 to PVL) of the pseudo propagation channel characteristic analyzing/extracting devices 407B executes a cross-correlation calculation between the received signal D402B and the corresponding one of the plurality (L) of pseudo delay profile models, thereby extracting the data characterized by the pseudo propagation channel characteristic. As a result, the extracting circuits PV (PV1 to PVL) respectively obtain a second received data group EB (data EB1, EB2, . . . , and EBL) that have the content corresponding to the second transmission data group DB.

The beam control unit 405 of the transmitting station 1 side obtains measurement information (that is, information on frequency characteristics or delay profiles) on characteristics of an actual propagation channel P400 through a radio line 413. The measurement information is obtained by at least one of the propagation channel characteristic managing units 409 (409A, 409B) at the receiving station 2 side by an SRS signal. As well as the third embodiment, this radio line 413 is a line in which signals are transmitted from the receiving station 2 side to the transmitting station 1 side through the actual propagation channel P400, but it is intentionally illustrated separately from the actual propagation channel P400. The beam control unit 405 controls the beam forming control circuit 402 on the basis of the characteristics of the actual propagation channel P400. The beam forming control circuit 402 specifies positions of the receiving stations 2, which are communication targets, by a pilot signal or the SRS signal from the receiving stations 2 (2A, 2B) that are the communication targets. The beam forming control circuit 402 gives control information on amplitude and a phase to the plurality (N) of beam forming circuits (circuits 4021 to 402N) so that the main beam focuses on the receiving station 2 (for example, two of the receiving station 2A and the receiving station 2B) which are the communication targets.

As well as the third embodiment, the propagation channel characteristic managing units 404 (404A, 404B) store the plurality of pseudo delay profile models obtained by a method of generating pseudo propagation channel models in a DB as a storage. For example, the pseudo propagation channel characteristic device 401A refers to the model in the DB of the propagation channel characteristic managing units 404A to respectively set the models to the pseudo propagation channels PX. The models in the DB of the propagation channel characteristic managing unit 404A and the models in the DB of the propagation channel characteristic managing unit 404B are managed so as not to overlap with each other or have high cross-correlation.

As described above, the transmitting station 1 individually characterizes the separate data (DA1 to DAK, DB1 to DBL) for the plurality (for example, two) of receiving station 2 by the pseudo propagation channels using the plurality (K+L) of models whose cross-correlation is low in the pseudo propagation channel characteristic devices 401 (401A and 401B), and obtains the one output signal D401 by synthesizing them. The one output signal D401 coincides with an input condition of the beam forming function.

The transmitting station 1 emits the group of radio waves 20 from the plurality of transmitting antennas by the beam forming function on the basis of the output signal D401. In the fourth embodiment, since two communication lines can be configured in the beams at this time, for example, it is possible to mix the two transmission data group (DA, DB) corresponding to the receiving station 2A and the receiving station 2B as two transmission targets (destinations) at the same time. The focus of the beams reaches the antenna B1A of the receiving station 2A, which is one destination, and also reaches the antenna B1B of the receiving station 2B, which is the other destination. The receiving station 2A can separate and extract a plurality (K) of data for the own receiving station 2A as the destination from such beams in the pseudo propagation channel characteristic analyzing/extracting device 407A by using a plurality (K) of models that is the same as that at the transmitting side to obtain the first received data group EA. Similarly, the receiving station 2B can separate and extract a plurality (L) of data for the own receiving station 2B as the destination from the same beam in the pseudo propagation channel characteristic analyzing/extracting devices 407B by using a plurality (L) of models that is different from that at the receiving station 2A to obtain the second received data group EB.

In the fourth embodiment, in a case where the transmitting station 1 side handles models of a plurality (for example, K+L) of pseudo propagation channel characteristics in the entire pseudo propagation channel characteristic devices 401 (401A and 401B), each receiving station 2 of a plurality (for example, two) of receiving stations 2 may handle a smaller number of models than the models at the transmitting side in the pseudo propagation channel characteristic analyzing/extracting device 407 (407A and 407B). For example, the receiving station 2A handles the plurality (K) of models regarding for the own receiving station 2A. For example, the receiving station 2A executes analysis from the received signal by the beam forming in the pseudo propagation channel characteristic analyzing/extracting device 407A using the plurality (K) of models regarding for the own receiving station 2A, and extracts the data group (EA) for the own reception device of the plurality (K+L) of data carried in the received signal. The receiving station 2A does not have the plurality (L) of models regarding the other receiving station 2B, and does not extract the data group (EB) for the other receiving station 2B as the destination. This is the same when viewed from the receiving station 2B.

Note that in a case where the receiving station 2 side generates the models of the pseudo propagation channel characteristics at the time of communication with the plurality of receiving stations 2 as described above, an arbitrary one the receiving station 2 of the plurality of receiving stations 2 included in the focus area 3 of the beams may generate them.

Further, as well as the third embodiment, in a case where the receiving stations 2 (2A, 2B) is configured so as to provide a receiving diversity effect by setting the number of antennas in each of the receiving stations 2 (2A, 2B) to two or more, it is possible to further improve reliability of communication easily.

Usage Example

A concrete usage example using the transmission/reception method and the system thereof according to the fourth embodiment and effects thereof will be described with reference to FIG. 18. FIG. 18 illustrates realization of multiuser communication (in other words, a multiaccess method) at the time of beam forming as a usage example of the beam forming function in the transmission/reception method and the system thereof according to the fourth embodiment. FIG. 18 illustrates a case where receiving stations 2A, 2B, 2C, and 2D, which are four user terminals of four users (or subscribers), exist in a focus area 3 by beam forming of a transmitting station 1, which is one base station, together. Moreover, FIG. 18 illustrates a case where these four users include a plurality of MVNO (virtual communication carrier) users other than a user of a core communication carrier A. It is assumed that the MVNO rents a network from the core communication carrier A that manages this base station (the transmitting station 1) to provide services. In the present embodiment, the receiving station 2A is a user terminal of a user U1 of the core communication carrier A, the receiving station 2B is a user terminal of a user U2 of a MVNO communication carrier B, the receiving station 2C is a user terminal of a user U3 of a MVNO communication carrier C, and the receiving station 2D is a user terminal of a user U4 of a MVNO communication carrier D. As a plurality of data of a transmission target of the transmitting station 1, for example, Data #A are data for the user terminal 2A as a destination from a network 461 of the core communication carrier A, Data #B are data for the user terminal 2B as a destination from a network 462 of the MVNO communication carrier B, Data #C are data for the user terminal 2C as a destination from a network 463 of the MVNO communication carrier C, and Data #D are data for the user terminal 2D as a destination from a network 464 of the MVNO communication carrier D.

In such a case, coexistence of a network is required, such that it is necessary that a communication network is connected to a plurality of HSSs (Home Subscriber Server). According to the fourth embodiment, it is possible to provide a beam forming function capable of connecting a plurality of different communication networks to a plurality of user terminals at the same time, and this makes it possible to realize a use case as illustrated in FIG. 18, for example. A lower side of FIG. 18 illustrates an image of the concept that a plurality of communication lines (431 to 434) corresponding to multiaccess to a plurality of user terminals in beam forming is mixed.

As a usage form similar to the above, it is possible to address initial communication processing in the fifth-generation mobile communication, that is, ATTACH processing separation in which random communication of PBCH (physical broadcast channel) reception and corresponding PRACH (physical random access channel) transmission, which are carried out by a user who turned on the power of a mobile terminal does not affect communication speed of the other users for whom communication has been established. By the beam forming described above, it is possible to provide an independent line for separating a PBCH signal for downlink essential for ATTACH processing and a PRACH signal for corresponding uplink from the other users, and it also becomes possible to provide a communication frame for efficient ATTACH on this independent line.

Note that the configuration at the time of beam forming transmission from the transmitting station 1 to the receiving station 2 has been described in the third embodiment and the fourth embodiment. However, the beam forming is a technique for controlling directivity of antennas, and there is no difference between transmission and reception. Further, even in a case where the radio waves travel on a propagation channel in an opposite direction, the radio waves act in the same manner as the propagation channel characteristics. From this, it is clear that the similar effects can be obtained even in a configuration in which the transmitting side and the receiving side are exchanged in the third embodiment and the fourth embodiment (for example, a configuration to transmit data from the user terminal to the base station).

[Effects and the Like (4)]

As described above, according to the fourth embodiment, it is possible to mix plural types of data in a beam and transmit them, and various kinds of applications such as multiuser communication can thus be realized. According to the fourth embodiment, it is possible to address a limitation of the focus area of the beam forming and multiuser environment. In conventional beam forming, there is a limit to making a focus area 3 smaller, and it is difficult to focus on a single receiving station under environment where users are gathered at high density. On the other hand, according to the fourth embodiment, it becomes possible to access the plurality of receiving stations 2 within the focus area 3 at the same time. For example, the transmitting station 1 (the propagation channel characteristic managing units 404) prepares in advance a plurality of models according to the number of receiving stations, which is assumed to exist within the focus area 3 at the same time, and sets a different model to each of the receiving stations 2 (the propagation channel characteristic managing units 409). This makes it possible to multiaccess as described above.

In the third embodiment and the fourth embodiment, the concept of transmission using characteristics of a plurality of pseudo propagation channels is newly applied to the conventional beam forming function that presupposes a state of a single communication line to realize a state of a plurality of communication lines. As described above, this makes it possible to realize various applications such as the sophistication of a network function, for example, the CU splitting according to the third embodiment and a new multiaccess method according to the fourth embodiment, and great effects thereof. Further, in the third and fourth embodiments, for example, with respect to the portions of the beam forming transmission function (302, 303, 305) and the portions of the beam forming reception function (306, 307) illustrated in FIG. 11, there is also an advantage of using the existing beam forming technique as it is.

In the conventional beam forming function, there is a restriction of input and transmission of single data. On the other hand, in the third and fourth embodiments, by newly applying the concept of the characteristics of the plurality of pseudo propagation channels, it is possible to realize simultaneous parallel transmission of a plurality of data by the beam forming, in other words, the state of the plurality of communication lines. The conventional mMIMO (Massive MIMO) is a way of thinking for a person skilled in the art to use the MIMO and the beam forming properly in accordance with use applications or the like, and is a way of thinking to use the MIMO in a case where a plurality of propagation channels is required, or use the beam forming in a case where transmission to a specific terminal is required.

On the other hand, in the third and fourth embodiments, a new problem in the fact that the beam forming is a single propagation channel is found, and a plurality of communication lines and separate parallelization within the beam forming are realized as described above.

Further, in the third and fourth embodiments, the characteristics of the plurality of pseudo propagation channels to be used can be a plurality of models generated independently of the characteristics of the actual propagation channels, and it is no need to use measured values of the characteristics of the actual propagation channels with respect to the plurality of models. The inventor of the present invention has focused on a frequency selective fading element reducing function of the actual propagation channel to which a control circuit of the beam forming function brings, and in the third and fourth embodiments, the method of generating the characteristics of the pseudo propagation channels that does not require the characteristics of the actual propagation channels has been described. This generating method makes almost best use of information entropy had by a physical space formed by the permissible frequency domain and the permissible time domain, and generates a plurality of arbitrary pseudo propagation channels models (as a specific example, delay profile models with a time as a parameter) whose cross-correlation is sufficiently low. In the conventional beam forming function, in order for a beam to focus on a reception point, the transmitting station side executes an amplitude/phase control on the basis of the characteristics of the actual propagation channels so that frequency characteristics of the propagation channels become good. In the characteristics of the propagation channels measured by the receiving station side after this control, the frequency characteristic is flat, and this is weak as the characteristic. Therefore, it is not suitable for generation of the characteristics of the pseudo propagation channels. For this reason, in the third and fourth embodiments, the models generated independently of the characteristics of the actual propagation channels are used as the characteristics of the pseudo propagation channels.

Modification Example—Proper Use of Models

The following is also possible as a modification example of the third embodiment and the fourth embodiment. The transmission target data described above have first data (for example, the first transmission data group) and second data (for example, the second transmission data group) as at least two kinds of data as different types of data from the viewpoint of necessary speed and reliability. The transmitting station 1 and the receiving station 2 control to use a first group of a plurality of pseudo propagation channels among characteristics of a plurality of pseudo propagation channels when a beam is transmitted and received for a first communication line for transmitting first data, and use a second group of another plurality of pseudo propagation channels for a second communication line for transmitting second data. As described above (FIG. 13 and the like), a plurality of models may have a high or low degree of cross-correlation between models. In this modification example, the characteristics of the plurality of pseudo propagation channels (and the plurality of corresponding models) are classified into a first group and a second group whose cross-correlation is higher than that of the first group in accordance with the degree of cross-correlation, for example. In a case where first data are a type of data (for example, control plane data) that requires higher reliability than that of second data, the transmitting station 1 and the receiving station 2 control to assign the first group into the first data, and assign the second group into the second data. As a result, transmission of the first data can secure higher reliability than transmission of the second data.

Modification Example—Host Control

Figure 19:
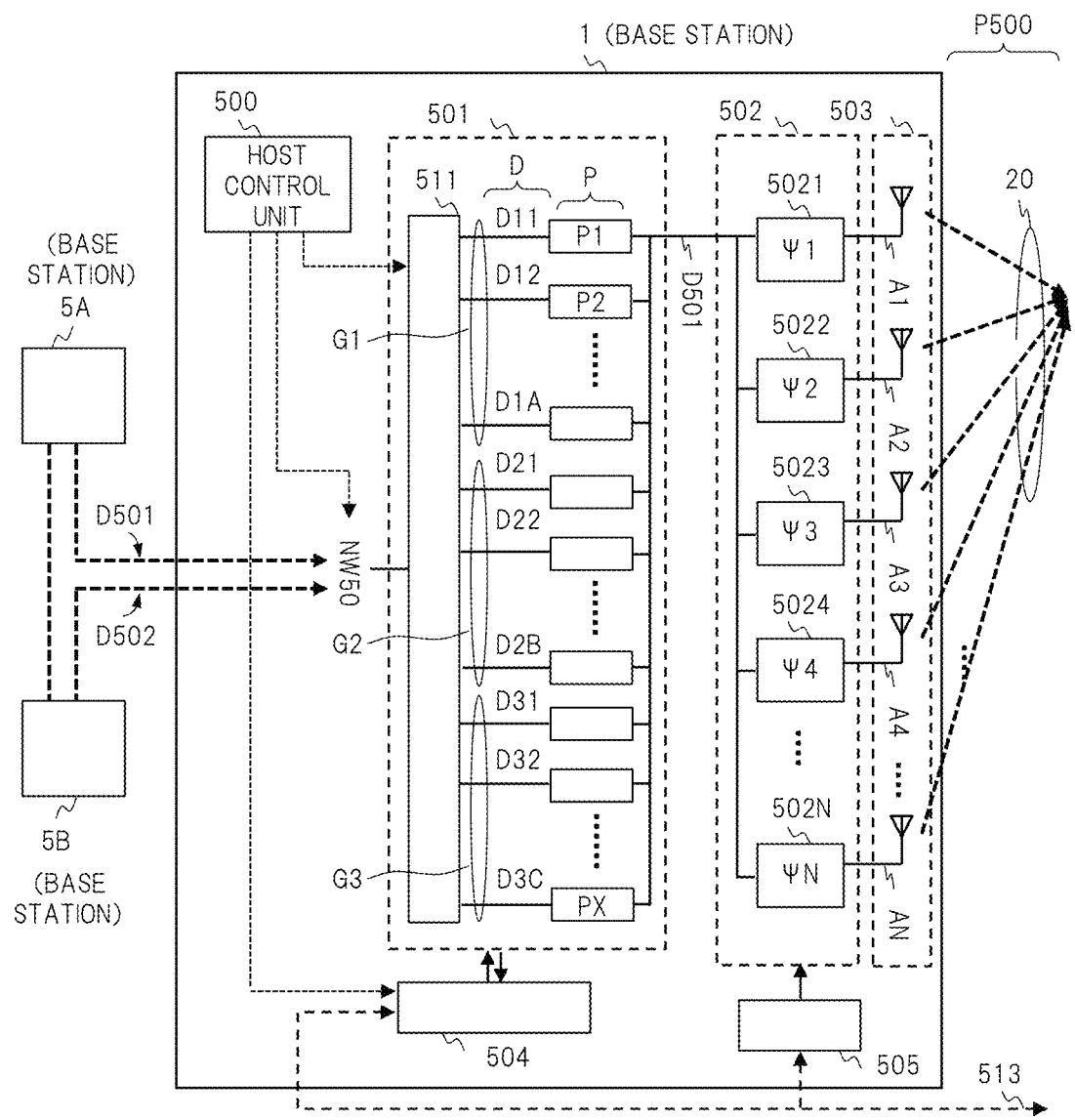
FIG. 19 is a view illustrating a configuration of a modification example according to the third and fourth embodiments.

As another modification example of the third embodiment and the fourth embodiment, the following is further possible. FIG. 19 illustrates a configuration of the modification example, but illustration of a receiving station 2 will be omitted. A transmitting station 1 and the receiving station 2 can execute setting and control such as switching and assignment so as to use a plurality of communication lines at the time of beam forming in accordance with use application (for example, the CU splitting or the multiaccess communication described above) by a host control. In other words, circuits with a versatile configuration (the pseudo propagation channel characteristic device described above) can be included in the transmitting station 1 and the receiving station 2 so that the circuits can be used for various kinds of use applications, and the communication line or the model described above can be set to the circuits in accordance with the use application by a control from an upper layer. The host control may be a control by an upper layer in the transmitting station 1, for example, a processor such as a CPU or a dedicated circuit inside or outside a baseband unit, for example, or may be a control from an apparatus such as another base station outside the transmitting station 1.

In the configuration example illustrated in FIG. 19, a pseudo propagation channel characteristic device 501 includes a versatile distributor 511 and a plurality (X) of versatile pseudo propagation channels (P1 to PX) so that it can be used for general purposes, in other words, it can be used for a plurality of use applications. One or more communication paths, for example, one communication path NW50 by an optical fiber is connected to the distributor 511. The communication path NW50 is a communication path capable of transmitting a plurality of data in parallel or multiple times. A host control unit 500 executes setting or control for the communication path NW50, the distributor 511, and a pseudo propagation channel characteristic managing unit 504 in accordance with a classification (or a group) of transmission data group depending upon intended use application. The distributor 511 distributes input data from the communication path NW50 into a plurality of data groups corresponding to a plurality of groups in accordance with a control. For example, a case where the input data are distributed into a group G1 (data D11 to D1A) in which the number of data is A, a group G2 (data D21 to D2B) in which the number of data is B, and a group G3 (data D31 to D3C) in which the number of data is C will be described.

In the example illustrated in FIG. 19, a base station 5A and a base station 5B, which are other external base station (or switching station), is wirelessly connected to a base station that is the transmitting station 1. The transmitting station 1 includes the host control unit 500. As a first example, the base station 5A transmits data D501 to the transmitting station 1 through wireless communication. On the basis of the data D501 received from the base station 5A, the host control unit 500 of the transmitting station 1 executes data transmission by CU splitting described in the third embodiment, for example, for the receiving station 2 by using beam forming function. At that time, as described above, the host control unit 500 executes setting and control for the plurality (X) of pseudo propagation channels (P1 to PX) so that a first communication line and a second communication line to be superimposed on beams are used. Specifically, the host control unit 500 controls the pseudo propagation channel characteristic managing unit 504 by a control signal to respectively set a plurality (A) of models for control plane data to the A pseudo propagation channels of the group G1 and respectively set a plurality (B) of models for user plane data to the B pseudo propagation channels of the other group G2, for example. Then, on the basis of the data D501, the host control unit 500 transmits the control plane data and the user plane data through the communication path NW50 to control the distributor 511 to distribute the data to the respective groups of pseudo propagation channels. As a result, similarly to the mechanism described above, the control plane data of the first communication line and the user plane data of the second communication line can be mixed and transmitted from the transmitting station 1 onto the beams (the group of radio waves 20). In a case where use applications are changed, for example, in a case where multiaccess communication is executed, the host control unit 500 controls in the similar manner as described above so as to switch the settings for the plurality of pseudo propagation channels of the pseudo propagation channel characteristic device 501.

A second example is as follows. A base station 5A is a narrow-area base station, and a base station 5B is a wide-area base station (or a switching station). The base station 5A transmits control plane data as data D501 to a transmitting station 1. The base station 5B transmits user plane data as data D502 to the transmitting station 1. The transmitting station 1 controls so as to transmit the data D501 from the base station 5A by a first communication path in the communication path NW50 to use a first communication line in the beams, and controls so as to transmit the data D502 from the base station 5B by a second communication path in the communication path NW50 to use a second communication line in the beams. Similarly, at the time of multiaccess communication as described in the fourth embodiment, the similar control can also be executed in a case where the base station 5A transmits the data D501 for a user of a first communication carrier to the transmitting station 1, and the base station 5B transmits the data D502 for a user of a second communication carrier to the transmitting station 1.

The transmitting station 1 includes a plurality (X) of pseudo propagation channels as versatile circuits regarding the pseudo propagation channel characteristic device 501. Depending upon the use application, the number of data of a transmission data group (a plurality of parallel and independent data) can vary (for example, the numbers of data of the respective groups are A, B, and C). Therefore, the host control unit 500 determines the number of data to be used in accordance with the use application, and executes setting such as assignment to versatile circuits. For example, at the time of a first use application, to "X" pseudo propagation channels, a first group G1 and a first communication line for transmitting A pieces of first kind of data is set, and a second group G2 and a second communication line for transmitting B pieces of second kind of data are set.

Next, at the time of a second use application, the number of data (A, B) described above is changed, a plurality of groups and a plurality of communication lines are set to the "X" pseudo propagation channels. Moreover, in a case where the number (X) of parallel pseudo propagation channels is large, they can be used for two or more use applications at the same time. Further, similarly to the above, the receiving station 2 may be include a corresponding host control unit. The host control unit in the receiving station 2 controls the plurality of pseudo propagation channel characteristic analyzing/extracting device 307 and the like illustrated in FIG. 11 in accordance with the use application, for example. The host control unit controls so as to acquire control plane data as data D33 from the communication path NW33, acquire user plane data as data D34 from the communication path NW34, and pass the respective acquired data to a predetermined destination, for example.

[Supplement-Pseudo Propagation Channel]

Figure 20:
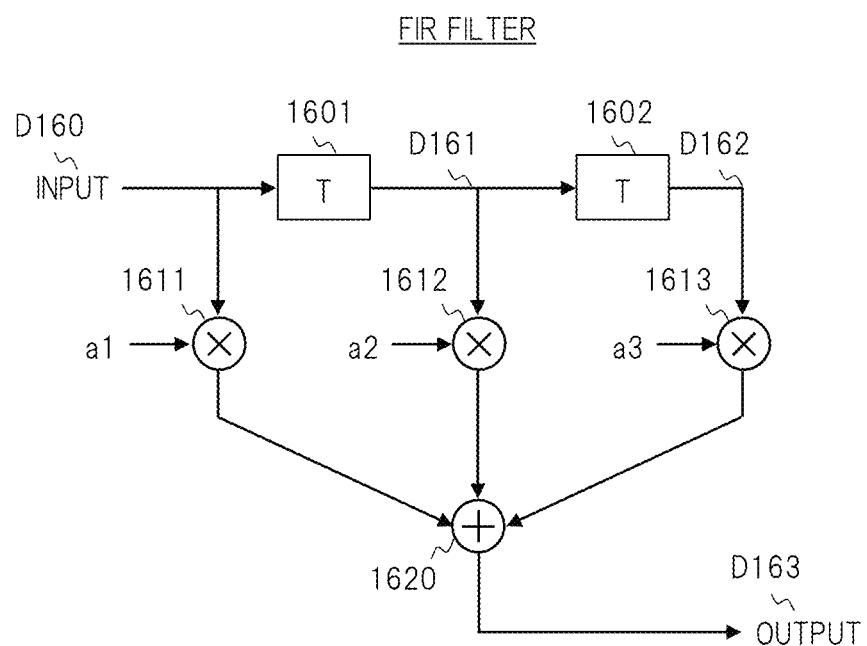
FIG. 20 is a view illustrating a configuration example of an FIR filter of a pseudo propagation channel as a supplement to the embodiments.

FIG. 20 illustrates an implementation example of pseudo propagation channels in the pseudo propagation channel characteristic device 101 illustrated in FIG. 1 as a supplement for each embodiment. The pseudo propagation channels illustrated in FIG. 20 is a configuration example implemented by a FIR (Finite Impulse Response) filter. A filter circuit as illustrated in FIG. 20 can be configured on the basis of information on the pseudo delay profile models in FIG. 13 described above. In FIG. 13, the number of main wave and delay waves is 9. However, here, for explanation, a case of three waves including one main wave and two delay waves will be described. In the FIR filter circuit illustrated in FIG. 20, an input D160 is multiplied by a first coefficient input a1 in a first multiplier 1611. Further, the input D160 is subjected to a predetermined delay in a first delay device 1601 to become a first delay signal D161. The first delay signal D161 is multiplied by a second coefficient input a2 in a second multiplier 1612, and is subjected to a delay in a second delay device 1602 to become a second delay signal D162. The second delay signal D162 is multiplied by a third coefficient input a3 in a third multiplier 1613. Outputs of all the multipliers are added in an adder 1620 to become an output D163. Note that the FIR filter can be expressed by "$H(z)=1+\frac{1}{2}z+\frac{1}{4}z^2$" using Z-transform. The "$H(z)$" is a propagation channel characteristic function. The "$z$" is expressed by "$z=e^{j\omega T}$". The "T" is a unit delay time. The "$\omega$" is angular frequency. As described above, the pseudo propagation channel can be implemented by an electronic circuit, and sufficiently high-speed processing is possible.

APPENDIX

As described above, the present invention has been described specifically on the basis of the embodiments. However, the present invention is not limited to the embodiments described above, and various modifications are possible without departing from the concept. Further, in the above description, an example in which the base station side transmits the SRS signal and the terminal side measures the characteristics of the actual propagation channels has been described. However, this is mainly the case of the FDD. In case of the TDD, the uplink and downlink frequencies are the same. Therefore, the terminal side can transmit the SRS signal, and the base station side can receive it. This makes it possible to eliminate the need to provide the CSI (Channel State Information). Further, in the above description, the configuration in which the side having multiantenna for the beam forming function executes transmission has been adopted. However, a configuration in which the side having the multiantenna executes reception is also possible similarly, and the transmission/reception configuration described above can be replaced.

Further, in the embodiments, all the structural positions of the FFT or an IFFT that executes data conversion from the frequency domain to the time domain and data conversion from the time domain to the frequency domain are not necessarily demonstrated. This is because it is common for the FFT and the like to be frequently used by providing them as a specific DSP (digital signal processor) or a subroutine on software in terms of implementation. This is also because, in a TDD/TDMA method used in a wireless LAN or the like, there is an example in which both the IFFT at the transmitting side and the FFT at the receiving side are used.

Note that in the method of facilitating communication to a plurality of networks or a plurality of terminals demonstrated in the third embodiment or the fourth embodiment described above, a configuration in which a single network and a single terminal are used to increase the communication speed is also easily possible.

Moreover, the example of the wireless communication has been described in the third embodiment or the fourth embodiment. However, even in an optical fiber communication having one propagation channel, a configuration in which the communication using characteristics of pseudo propagation channels in the same frequency band, that is, wavelength band is multiplexed is easily possible. Namely, a configuration in which the beam forming propagation channels described above are replaced by an optical fiber is easily possible. Further, a configuration in which they are replaced by electric conductor communication paths is also easily possible.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A transmission/reception method of transmitting and receiving data between a transmission device with a plurality of transmitting antennas and a reception device with a receiving antenna, the transmission/reception method comprising:
    a generating step of generating, by the transmission device or the reception device, characteristics of a plurality of pseudo propagation channels on a basis of characteristics of a plurality of actual propagation channels between the plurality of transmitting antennas and the receiving antenna, the characteristics of the plurality of pseudo propagation channels being characteristics similar to frequency characteristics to an extent that the frequency characteristic can be approximated with respect to the characteristics of the plurality of actual propagation channels;
    a transmitting step of creating, by the transmission device, one or more data to be transmitted by respectively reflecting the characteristics of the plurality of pseudo propagation channels to a plurality of parallel and independent data, and transmitting the one or more data from the plurality of transmitting antennas as radio waves; and
    a receiving step of extracting, by the reception device, the plurality of parallel and independent data from one or more received data received as the radio waves by the receiving antenna on a basis of the characteristics of the plurality of pseudo propagation channels,
    wherein the transmission device has a MIMO transmission function,
    wherein the reception device includes a plurality of receiving antennas as the receiving antenna, and has a MIMO reception function,
    wherein the generating step is a step of generating, by the transmission device or the reception device, the characteristics of the plurality of pseudo propagation channels on the basis of the characteristics of the plurality of actual propagation channels including propagation channels on diagonal lines between the plurality of transmitting antennas and the plurality of receiving antennas,
    wherein the propagation channels on the diagonal lines are propagation channels other than propagation channels each of which faces one-to-one between the plurality of transmitting antennas and the plurality of receiving antennas,
    wherein the transmitting step is a step of creating, by the transmission device, a plurality of parallel and independent data to be transmitted by respectively reflecting the characteristics of the plurality of pseudo propagation channels to the plurality of data, and transmitting the plurality of parallel and independent data from the plurality of transmitting antennas as the radio waves by using the MIMO transmission function, and
    wherein the receiving step is a step of creating, by the reception device, a plurality of received data from signals received as the radio waves by the plurality of receiving antennas by using the MIMO reception function, and extracting the plurality of parallel and independent data on the basis of the characteristics of the plurality of pseudo propagation channels from the plurality of received data.

2. The transmission/reception method according to claim 1,
    wherein the transmitting step includes a step of creating, by the transmission device, a sum signal and a difference signal from two data to be transmitted from the plurality of parallel and independent data created using the MIMO transmission function, and transmitting the sum signal and the difference signal from two transmitting antennas of the plurality of transmitting antennas as the radio waves,
    wherein, in a case where the two data to be transmitted are SA1 and SA2, the sum signal is a signal obtained by sum of SA1 and SA2, and the difference signal is a signal obtained by a difference between SA1 and SA2, and
    wherein the receiving step includes a step of extracting, by the reception device, the sum signal and the difference signal in two received data of the plurality of received data from signals received as the radio waves by two receiving antennas of the plurality of receiving antennas by using the MIMO reception function.

3. The transmission/reception method according to claim 1,
    wherein the characteristics of the plurality of pseudo propagation channels have lower cross-correlation than cross-correlation of the characteristics of the plurality of actual propagation channels.

4. The transmission/reception method according to claim 1,
    wherein the characteristics of the plurality of pseudo propagation channels are characteristics that are modified by modeling characteristic portions using measurement results of the characteristics of the plurality of actual propagation channels and reducing cross-correlation between models.

5. The transmission/reception method according to claim 1,
    wherein information on the characteristics of the plurality of pseudo propagation channels has a length that can be accommodated in an interval length of a guard interval between communication frames.

6. A transmission/reception method of transmitting and receiving data between a transmission device with a plurality of transmitting antennas and a reception device with one or more receiving antennas, the transmission device having a beam forming transmission function including the plurality of transmitting antennas, the reception device having a beam forming reception function having the one or more receiving antenna, the transmission/reception method comprising:
- a generating step of generating, by the transmission device or the reception device, characteristics of a plurality of pseudo propagation channels between the plurality of transmitting antennas and the one or more receiving antennas;
- a creating step of creating one piece of data to be transmitted by the transmission device, the one piece of data being obtained by synthesizing a plurality of parallel and independent data from a plurality of outputs, the plurality of parallel and independent data being transmission targets, the plurality of parallel and independent data at least containing a first data group and a second data group as a plurality of data groups whose types are different from each other, the plurality of outputs being respectively obtained by characterizing the plurality of parallel and independent data by the characteristics of the plurality of pseudo propagation channels;
- a transmitting step of transmitting, by the transmission device, a group of radio waves constituting a beam from the plurality of transmitting antennas by the beam forming transmission function on a basis of the one piece of data to be transmitted;
- a receiving step of receiving, by the reception device, a signal from the group of radio waves arriving in a state of the beam by the beam forming reception function including the one or more receiving antennas; and
- an extracting step of extracting, by the reception device, a plurality of data corresponding to the plurality of parallel and independent data from the received signal on a basis of analysis of the characteristics of the plurality of pseudo propagation channels, the plurality of parallel and independent data characterized by the characteristics of the plurality of pseudo propagation channels containing the plurality of data groups whose types are different from each other,
- wherein the plurality of data groups whose types are different from each other is a data group in one selected from different planes on a protocol stack, different bearers, different channels, different slices, different bandwidth control service types, or communication with different degrees of urgency, or is a data group of a control/management signal and an application signal.

7. The transmission/reception method according to claim 6,
wherein the generating step is a step of generating, by the transmission device or the reception device, the characteristics of the plurality of pseudo propagation channels on a basis of delay profile models set in advance independently of the characteristics of the actual propagation channels between the plurality of transmitting antennas and the one or more receiving antennas.

8. The transmission/reception method according to claim 7,
wherein the generating step is a step of generating, by the transmission device or the reception device, a plurality of models in each of which as the delay profile of the plurality of pseudo propagation channels, a main wave is arranged symmetrically with respect to an axis, the main wave and a plurality of delay waves are arranged at any of equal time intervals, time intervals in which differences are provided from the main wave on a time axis by a function, or substantially random time intervals, and intensity of each wave of the main wave and the plurality of delay waves is managed by envelopes of a plurality of time-axis symmetric function.

9. The transmission/reception method according to claim 6,
wherein the characteristics of the plurality of pseudo propagation channels are classified into a first group and a second group having a higher cross-correlation than that of the first group in accordance with a degree of cross-correlation, and
wherein, in a case where the first data group is a type of data that requires higher reliability than that of the second data group, it is controlled so that the first group is assigned to the first data group and the second group is assigned to the second data group.

10. A transmission/reception method of transmitting and receiving data between a transmission device and each of a plurality of reception devices, the transmission device including a plurality of transmitting antennas, each of the reception devices including one or more receiving antennas,
wherein the transmission device has a beam forming transmission function including the plurality of transmitting antennas,
wherein the reception device has a beam forming reception function including the receiving antennas,
in a case where the plurality of reception devices is included in a focus area of a beam from the transmission device, the transmission/reception method comprising:
- a generating step of generating, by the transmission device or one of the plurality of reception devices, characteristics of a plurality of pseudo propagation channels between the plurality of transmitting antennas and the receiving antennas;
- a creating step of creating one piece of data to be transmitted by the transmission device, the one piece of data being obtained by synthesizing a plurality of parallel and independent data from a plurality of outputs, the plurality of parallel and independent data being transmission targets for the plurality of reception devices, the plurality of parallel and independent data at least containing a first data group and a second data group as a plurality of data groups whose types are different from each other, the plurality of outputs being respectively obtained by characterizing the plurality of parallel and independent data by the characteristics of the plurality of pseudo propagation channels;
- a transmitting step of transmitting, by the transmission device, a group of radio waves constituting a beam from the plurality of transmitting antennas by the beam forming transmission function on a basis of the one piece of data to be transmitted;
- a receiving step of receiving, by the reception device, a signal from the group of radio waves arriving in a state of the beam by the beam forming reception function including the one or more receiving antennas; and
- an extracting step of extracting, by the reception device, a plurality of data corresponding to a data group for an own reception device as a destination from the received signal on a basis of analysis of characteristics of a plurality of pseudo propagation channels regarding the own reception device of the characteristics of the plurality of pseudo propagation channels, the characteristics of the plurality of pseudo propagation channels regarding the own reception device being reflected to the data group for the own reception device.

11. A transmission/reception system for transmitting and receiving data between a transmission device with a plurality of transmitting antennas and a reception device with a receiving antenna,
   wherein the transmission device or the reception device generates characteristics of a plurality of pseudo propagation channels on a basis of characteristics of a plurality of actual propagation channels between the plurality of transmitting antennas and the receiving antenna, the characteristics of the plurality of pseudo propagation channels being characteristics similar to frequency characteristics to an extent that the frequency characteristic can be approximated with respect to the characteristics of the plurality of actual propagation channels,
   wherein the transmission device creates one or more data to be transmitted by reflecting the characteristics of the plurality of pseudo propagation channels to a plurality of parallel and independent data, and transmits the one or more data from the plurality of transmitting antennas as radio waves,
   wherein the reception device extracts the plurality of parallel and independent data from one or more received data received as the radio waves by the receiving antenna on a basis of the characteristics of the plurality of pseudo propagation channels,
   wherein the transmission device has a MIMO transmission function,
   wherein the reception device includes a plurality of receiving antennas as the receiving antenna, and has a MIMO reception function,
   wherein the transmission device or the reception device generates the characteristics of the plurality of pseudo propagation channels on the basis of the characteristics of the plurality of actual propagation channels including propagation channels on diagonal lines between the plurality of transmitting antennas and the plurality of receiving antennas,
   wherein the propagation channels on the diagonal lines are propagation channels other than propagation channels each of which faces one-to-one between the plurality of transmitting antennas and the plurality of receiving antennas,
   wherein the transmission device creates a plurality of parallel and independent data to be transmitted by reflecting the characteristics of the plurality of pseudo propagation channels to the plurality of data, and transmits the plurality of parallel and independent data from the plurality of transmitting antennas as radio waves by using the MIMO transmission function,
   wherein the reception device creates a plurality of received data from signals received as the radio waves by the plurality of receiving antennas by using the MIMO reception function, and extracting the plurality of data on the basis of the characteristics of the plurality of pseudo propagation channels from the plurality of received data.

12. The transmission/reception system according to claim 11,
   wherein the transmission device is configured to create a sum signal and a difference signal from two data to be transmitted from the plurality of parallel and independent data created using the MIMO transmission function, and transmit the sum signal and the difference signal from two transmitting antennas of the plurality of transmitting antennas as the radio waves,
   wherein, in a case where the two data to be transmitted are SA1 and SA2, the sum signal is a signal obtained by sum of SA1 and SA2, and the difference signal is a signal obtained by a difference between SA1 and SA2, and
   wherein the reception device is configured to extract the sum signal and the difference signal in two received data of the plurality of received data from signals received as the radio waves by two receiving antennas of the plurality of receiving antennas by using the MIMO reception function.

13. A transmission/reception system for transmitting and receiving data between a transmission device with a plurality of transmitting antennas and a reception device with one or more receiving antennas,
   wherein the transmission device has a beam forming transmission function including the plurality of transmitting antennas,
   wherein the reception device has a beam forming reception function having the one or more receiving antenna,
   wherein the transmission device or the reception device is configured to generate characteristics of a plurality of pseudo propagation channels between the plurality of transmitting antennas and the one or more receiving antennas,
   wherein the transmission device is configured to create one piece of data to be transmitted, the one piece of data being obtained by synthesizing a plurality of parallel and independent data from a plurality of outputs, the plurality of parallel and independent data being transmission targets, the plurality of parallel and independent data at least containing a first data group and a second data group as a plurality of data groups whose types are different from each other, the plurality of outputs being respectively obtained by characterizing the plurality of parallel and independent data by the characteristics of the plurality of pseudo propagation channels,
   wherein the transmission device is configured to transmit a group of radio waves constituting a beam from the plurality of transmitting antennas by the beam forming transmission function on a basis of the one piece of data to be transmitted,
   wherein the reception device is configured to receive a signal from the group of radio waves arriving in a state of the beam by the beam forming reception function including the one or more receiving antennas,
   wherein the reception device is configured to extract a plurality of data corresponding to the plurality of parallel and independent data from the received signal on a basis of analysis of the characteristics of the plurality of pseudo propagation channels, the plurality of parallel and independent data characterized by the characteristics of the plurality of pseudo propagation channels containing the plurality of data groups whose types are different from each other, and
   wherein the plurality of data groups whose types are different from each other is a data group in one selected from different planes on a protocol stack, different bearers, different channels, different slices, different bandwidth control service types, or communication with different degrees of urgency, or is a data group of a control/management signal and an application signal.

14. A transmission/reception system for transmitting and receiving data between a transmission device with a plurality of transmitting antennas and each reception device of a plurality of reception devices, each of the reception devices having one or more receiving antennas, wherein the transmission device has a beam forming transmission function including the plurality of transmitting antennas, wherein each of the reception devices has a beam forming reception function including the receiving antennas, and wherein, in a case where the plurality of reception devices is included in a focus area of a beam from the transmission device, the transmission device or one of the plurality of reception devices is configured to generate characteristics of a plurality of pseudo propagation channels between the plurality of transmitting antennas and the receiving antennas, the transmission device is configured to create one piece of data to be transmitted, the one piece of data being obtained by synthesizing a plurality of parallel and independent data from a plurality of outputs, the plurality of parallel and independent data being transmission targets for the plurality of reception devices, the plurality of parallel and independent data at least containing a first data group and a second data group as a plurality of data groups whose types are different from each other, the plurality of outputs being respectively obtained by characterizing the plurality of parallel and independent data by the characteristics of the plurality of pseudo propagation channels, the transmission device is configured to transmit a group of radio waves constituting a beam from the plurality of transmitting antennas by the beam forming transmission function on a basis of the one piece of data to be transmitted, the reception device is configured to receive a signal from the group of radio waves arriving in a state of the beam by the beam forming reception function including the one or more receiving antennas, and the reception device is configured to extract a plurality of data corresponding to a data group for an own reception device as a destination from the received signal on a basis of analysis of characteristics of a plurality of pseudo propagation channels regarding the own reception device of the characteristics of the plurality of pseudo propagation channels, the data group for the own reception device being characterized by the characteristics of the plurality of pseudo propagation channels regarding the own reception device.

\* \* \* \* \*